(12) United States Patent
Weverka et al.

(10) Patent No.: US 7,356,258 B1
(45) Date of Patent: Apr. 8, 2008

(54) OPTICAL INTERCONNECTION FOR TRAFFIC BETWEEN A PAIR OF DWDM RINGS

(75) Inventors: Robert T. Weverka, Boulder, CO (US); S. Christopher Alaimo, Boulder, CO (US); Dirk Barthel, Westminster, CO (US); Edward Bortolini, Nederland, CO (US); Rainer Robert Iraschko, Calgary (CA); George David Morley, Calgary (CA); Demetrios Stamatelakis, Calgary (CA)

(73) Assignee: Network Photonics, Inc., Boulder, CO (US)

( * ) Notice: Subject to any disclaimer, the term of this patent is extended or adjusted under 35 U.S.C. 154(b) by 559 days.

(21) Appl. No.: 10/306,826

(22) Filed: Nov. 26, 2002

(51) Int. Cl.
*H04B 10/00* (2006.01)
(52) U.S. Cl. .......................................... 398/59; 398/83
(58) Field of Classification Search ................ 398/2–5, 398/59, 83
See application file for complete search history.

(56) References Cited

U.S. PATENT DOCUMENTS

| | | | | |
|---|---|---|---|---|
| 5,909,175 A | * | 6/1999 | Yamasaki et al. | 340/506 |
| 6,038,678 A | * | 3/2000 | Fukushima et al. | 714/4 |
| 6,973,048 B2 | * | 12/2005 | Pitio | 370/258 |
| 6,973,267 B1 | * | 12/2005 | Arecco et al. | 398/4 |
| 6,983,108 B2 | * | 1/2006 | Sugawara et al. | 398/45 |

* cited by examiner

*Primary Examiner*—Agustin Bello
(74) *Attorney, Agent, or Firm*—Townsend and Townsend and Crew LLP

(57) ABSTRACT

Apparatus for diversely routing optical wavelengths across a point-to-point subnetwork. An optical network includes a first optical ring having at least first, second, and third nodes adjacently positioned; a second optical ring having at least fourth, fifth, and sixth nodes adjacently positioned, pairs of optical fibers link the adjacent nodes; a point-to-point subnetwork having at least first, second, third, and fourth optical fibers optically coupling the first and second optical rings. The first node is configured to route working bands across the first optical fiber to the fifth node and to route a copy of the working bands to the second node. The second node is configured to route either the copy of the working bands or a select subset of the copy of the working bands across the third optical fiber to the fourth node.

60 Claims, 45 Drawing Sheets

OPTICAL INTERCONNECTION FOR TRAFFIC BETWEEN A PAIR OF DWDM RINGS

BACKGROUND OF THE INVENTION

This application relates generally to fiber-optic communications and more specifically to techniques for subnetwork protection in optical networks, for example, by deploying diverse routing of optical wavelengths during fiber optic or other equipment failure.

Fiber optics have become the backbone of long-haul telecommunications and as the demand for communication bandwidth has increased, fiber-optic systems have entered the metropolitan and regional telecommunications arena. Fiber-optic networks can provide the enormous bandwidth demanded by the Internet, television, and tele-video. For example, optical fibers exhibit relatively low loss in the wavelength region of 850-1675 nanometers. This particular region provides a bandwidth of about 170,000 GHz, sufficient for approximately 29 million television channels (6 MHz per channel). Although, such density is not practical to achieve, nonetheless a strong impetus is provided for the creation of all optical telecommunication networks.

Fiber-optic telecommunications networks are currently deploying a relatively new technology called dense wavelength division multiplexing (DWDM). In DWDM, several communication channels are superimposed on respective closely spaced carrier wavelengths, which are then combined (multiplexed) onto a single fiber. Today DWDM systems employ up to 80 channels, with more promised for the future.

Fiber-optic telecommunication networks deploying DWDM route optical wavelengths between users through a large variety of optical and opto-electronic devices and in a variety of standard formats. In routing optical channels between users, optical wavelengths are added to a network from a user and dropped (i.e., diverted) from the network to other users. Systems that perform these adding and dropping functions are called optical add-drop multiplexers (OADMs). OADMs can also perform adding and/or dropping functions between networks. Other routing functions may be performed, for example, by optical cross connects. One variety of optical cross connect called wavelength-selective cross connects (WSXC) can route selected subsets of optical channels onto a given path while routing other selected subsets to other paths. Several other devices such as drop-and-repeats (also known as drop-and-continues), amplifiers, and regenerators, as well as numerous other devices are used in optical networking to ensure channels are properly routed between users and to ensure that channels maintain a high level of integrity as they traverse various networks, subnetworks, and components.

The most widely adopted standard formats for optical communications include the Synchronous Optical Network (SONET) and Synchronous Digital Hierarchy (SDH) formats. SONET is the standard adopted for North America and SDH is the international counterpart. The SONET/SDH standards specify optical frequency domains, standard data rates, topological structures for optical networks, as well as other standards for communication such as data transmission formats and the like. Standard frequency domains include those set by the International Telecommunications Union (ITU) as well as other frequency bands yet to be adapted by the ITU. Standard data modulation rates vary from the lower OC-1 data rate of 51.84 Mbit/s to the much higher OC-768 rate of 40 Gbit/s, rates in between are also specified. The lower rates were chosen to handle existing electronic telecommunication signal rates while the higher rate of 40 Gbit/s is not yet commonly used.

One of the network topologies specified by the SONET/SDH standards is that of a ring. This standard differs from older topologies commonly used for electronic telecommunications and regional optical networks, which typically used hub-and-spoke and/or branching systems. SONET/SDH ring topologies are currently used in several communication domains, for example, in the access/regional and metro domains SONET/SDH standards provide extensive protection schemes for ring failures. Protection is typically implemented in a redundant ring, often referred to as a protection ring. Protection rings are typically diversely routed from working rings. Diverse routing provides protection, for example, from the errant backhoe breaking both the working and protection ring in a single scoop of its bucket. Upon the breaking of a working ring, optical wavelengths may be diverted from the working ring to the protection ring. Various diverting mechanisms include line switching, path switching and the like.

While SONET/SDH standards provide protection schemes for a wide range of failures, industry has yet to provide solutions to implements all aspects of the protection schemes. Accordingly, industry continues to strive to develop solutions to implement the protection schemes specified by the SONET/SDH standards. For example, industry continues to strive to provide solutions for failures in multiple domains (e.g., metro network and ultra-long-haul subnetwork) that may leave a network without diverse routing and thus leave users without service. Consequently, new apparatus are needed to ensure communication does not stop in the event of failures in multiple network domains.

BRIEF SUMMARY OF THE INVENTION

The present invention provides apparatus for diversely routing optical wavelengths to provide uninterrupted communications across a point-to-point subnetwork optically linking DWDM rings in the event of a failure in the subnetwork, rings, or other equipment. In some embodiments the DWDM rings include OADMs configured to diversely route optical wavelengths across the point-to-point subnetwork and to provide protection switching.

In accordance with an aspect of the present invention, an optical network for optical communications comprises a first optical ring having at least first, second, and third nodes adjacently positioned, and pairs of optical fibers optically linking the adjacent nodes; a second optical ring having at least fourth, fifth, and sixth nodes adjacently positioned, and pairs of optical fibers optically linking the adjacent nodes; a point-to-point subnetwork having at least first, second, third, and fourth optical fibers optically coupling the first and second optical rings. The first node is configured to route working bands across the first optical fiber to the fifth node and is configured to route a copy of the working bands to the second node. The second node is configured to route either the copy of the working bands or a select subset of the copy of the working bands across the third optical fiber to the fourth node.

In some embodiments, the first, second, fifth, and fourth nodes include first, second, third, and fourth optical add-drop multiplexers (OADMs), respectively. The first OADM is configured to receive the working bands from one of the optical fiber linking the third node and first OADM. The fourth OADM is configured to route working bands received from the second OADM to the third OADM.

In accordance with another aspect of the present invention, an optical network for optical communications comprises a first optical ring having at least first and second nodes adjacently positioned, and pairs of optical fibers between the adjacent nodes; a second optical ring having at least third, fourth, and fifth nodes adjacently positioned, and pairs of optical fibers between the adjacent nodes; a point-to-point subnetwork having at least first, second, third, and fourth optical fibers optically coupling the first and second optical rings. The first node is configured to route working bands across the first optical fiber to the third node and is configured to route a copy of the working bands across the third optical fiber to the fourth node. The fourth node is configured to route the copy of working bands to the third node. In the event the third node does not receive the working bands from the first optical fiber due to failure of the first optical fiber, the third node routes the copy of working bands received from the fourth node to one of the optical fibers linking the third and fifth nodes, otherwise the third node routes the working bands received from the first optical fiber to one of the optical fibers linking the third and fifth nodes.

In some embodiments, the first node receives the working bands from one of the optical fibers linking the first and second nodes. The first, third, and fourth nodes include first, second, and third optical add-drop multiplexers (OADMs), respectively.

In accordance with another aspect of the present invention, an optical network for optical communications comprises a first optical ring having at least first and second nodes adjacently positioned, and pairs of optical fibers between the adjacent nodes; a second optical ring having at least third, fourth, and fifth nodes adjacently positioned, and pairs of optical fibers between the adjacent nodes; a point-to-point subnetwork having at least first, second, third, and fourth optical fibers optically coupling the first and second optical rings. The first node is configured to receive working bands from one of the optical fiber linking the first and second nodes and receive protection bands from another of the optical fibers linking the first and second nodes. The first node is configured to route either the working bands or the protection bands across the first optical fiber to the third node and a copy of the working bands or a copy of the protection bands across the third optical fiber to the fourth node. The fourth node is configured to route received bands to the third node. In the event the third node does not receive bands from the first optical fiber due to failure of the first optical fiber, the third node routes bands received from the fourth node to one of the optical fibers linking the third and fifth nodes, otherwise the third node routes bands received from the first optical fiber to one of the optical fibers linking the third and fifth nodes.

In some embodiments, the first node includes a first OADM and first, second, third, and fourth transponder cards optically coupled to the first OADM.

In accordance with another aspect of the invention, an optical add-drop multiplexer (OADM) comprises first, second, third, fourth, fifth, and sixth input ports for receiving optical wavelengths; first, second, third, and fourth output ports for routing optical wavelengths from the OADM; a first switch configured to receive optical wavelengths from the first and second input ports, each optical wavelength received by the first switch being either selectively terminated, or selectively directed to the first and second output ports, or selectively directed to the first output port, or selectively directed to the second output port, so that optical wavelengths having the same frequency are not coincidentally directed to the same output port; a second switch configured to receive optical wavelengths from first, third, and fourth input ports, each optical wavelength received by the second switch being either selectively terminated or directed to the third output port, so that optical wavelengths having the same frequency are not coincidentally directed to the third output port; and a third switch configured to receive optical wavelengths from the second, fifth, and sixth input ports, each optical wavelength received by the second switch being either selectively terminated or directed to the fourth output port, so that optical wavelengths having the same frequency are not coincidentally directed to the fourth output port.

In some embodiments, the OADM further comprises a first splitter coupled between the first input port and the first and second switches. The first splitter is configured to receive optical wavelengths from the first input port and to direct copies of the optical wavelengths to the first and second switches. A second splitter coupled between the second input port and the first and third switches is configured to receive optical wavelengths from the second input port and to direct copies of the optical wavelengths to the first and third switches.

In accordance with another aspect of the invention, an optical add-drop multiplexer (OADM) comprises first, second, third, fourth, and fifth input ports for receiving optical wavelengths; first, second, and third output ports for routing optical wavelengths from the OADM; a first switch for receiving optical wavelengths from the first and second input ports, each optical wavelength received by the first switch being either selectively terminated, or selectively directed to the first output port, so that optical wavelengths having the same frequency are not coincidentally directed to the first output port; a second switch for receiving optical wavelengths from first and fourth input ports, each optical wavelength received by the second switch being either selectively terminated or directed to the second output port, so that optical wavelengths having the same frequency are not coincidentally directed to the second output port; and a third switch for receiving optical wavelengths from the second, third, and fifth input ports, each optical wavelength received by the third switch being either selectively terminated or directed to the third output port, so that optical wavelengths having the same frequency are not coincidentally directed to the third output port.

In some embodiments, the OADM further comprises a first splitter coupled between the first input port and the first and second switches. The first splitter is configured to receive optical wavelengths from the first input port and to direct copies of the optical wavelengths to the first and second switches. A second splitter coupled between the second input port and the first and third switches is configured to receive optical wavelengths from the second input port and to direct copies of the optical wavelengths to the first and third switches.

In accordance with another aspect of the invention, an optical add-drop multiplexer comprises a first input port for receiving a first set of optical wavelengths; a second input port for receiving a second set of optical wavelengths; a first output port for transmitting optical wavelengths; means for routing either the first set of optical wavelengths, the second set of optical wavelengths, or a combination of the first and second sets of optical wavelengths to the first output port; a third input port for receiving a third set of optical wavelengths; a fourth input port for receiving a fourth set of optical wavelengths; a second output port for transmitting optical wavelengths; and means for routing either the third set of optical wavelengths, the fourth set of optical wavelengths, or a combination of the third and fourth sets of optical wavelengths to the first output port.

A further understanding of the nature and advantages of the present invention may be realized by reference to the remaining portions of the specification and the drawings.

DETAILED DESCRIPTION OF THE INVENTION

Introduction

The following description sets forth apparatus for subnetwork protection in optical networks according to the invention. Embodiments of the invention can be applied to optical networks having multiple domains, such as an optical network having metro domains coupled to an ultra-long-haul (ULH) domain, to achieve the goals of optical networking systems.

The general functionality of the invention is to diversely route a plurality of optical wavelengths or a subset of a plurality of optical wavelengths in the event of a failure or failures in an optical network. Most of the discussion is with reference to failures in multiple domains of an optical network. The invention also includes embodiments for diversely routing optical wavelengths for failures in a single domain of an optical network. To diversely route optical wavelengths around failures in an optical network, the present invention provides optical add-drop multiplexers (OADMs) placed in a dual-node interconnect configuration for use with optically coupled DWDM rings.

Figure 1A:
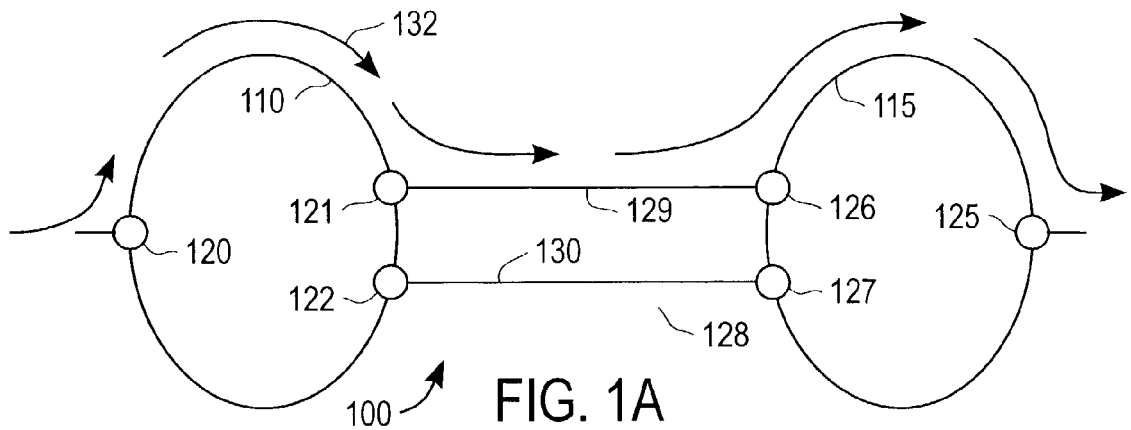
FIG. 1A is a schematic of a prior art optical network during normal operation.

FIG. 1A is a schematic view of a prior art optical network 100. The general functionality of optical network 100 is to provide a communications infrastructure for optical-based communications. Optical network 100 includes DWDM rings 110 and 115, each comprising one or more pairs of optical fibers. Typical DWDM rings have one or two pairs of optical fibers, but more than two pairs may be of use. DWDM rings typically provide communication service for metropolitan areas by linking end user sites and/or smaller networks.

Optical network 100 includes optical add-drop multiplexers (OADMs) 120, 121, and 122 optically coupled to DWDM ring 110, and OADMs 125, 126, and 127 optically coupled to DWDM ring 115. The OADMs add and drop optical wavelengths to and from the DWDM rings and direct wavelengths around the rings to other optical devices (e.g., another OADM).

Optical network 100 further includes a point-to-point subnetwork (e.g., ULH subnetwork) 128 that has a pair of point-to-point spans 129 and 130, each including one or more optical fibers. The subnetwork provides communication pathways between the DWDM rings. Point-to-point subnetworks, such as ULH subnetworks, typically couple DWDM rings across relatively long spans, for example, transcontinental and/or transoceanic spans. The figure shows a typical routing path 132 of optical wavelengths between DWDM rings 110 and 115 across subnetwork 128.

DWDM rings generally provide protection switching should an optical fiber of a ring fail. Various SONET/SDH ring and switching protocols include, for example, unidirectional path-switched rings (UPSRs), bidirectional line switched rings (BLSRs), and optical multiplexed section shared protection rings (OMS-SPRINGs) among others. Each of these protection schemes is well known by those of skill in the art but will be briefly described for completeness of the discussion. In a line-switched network (e.g., BLSR), optical wavelengths are carried on a working fiber until the fiber fails, at which point the wavelengths are switched to a protection fiber restoring communications. In a path-switched network (e.g., O-UPSR), copies of optical wavelengths are carried on both working and protection fibers. Both fibers are typically monitored by appropriate hardware for signal integrity (including signal absence) and the better of the two copies is selected for communications. In a shared protection network, such as an OMS-SPRING, working traffic is carried on both the working and protection fibers. Typically each direction of a shared protection ring carries half of the working traffic with the remaining capacity allocated for protection traffic. If one of the working or protection fibers fails, working traffic is routed onto the other fiber and occupies the channels allocated for protection traffic.

Figure 1B:
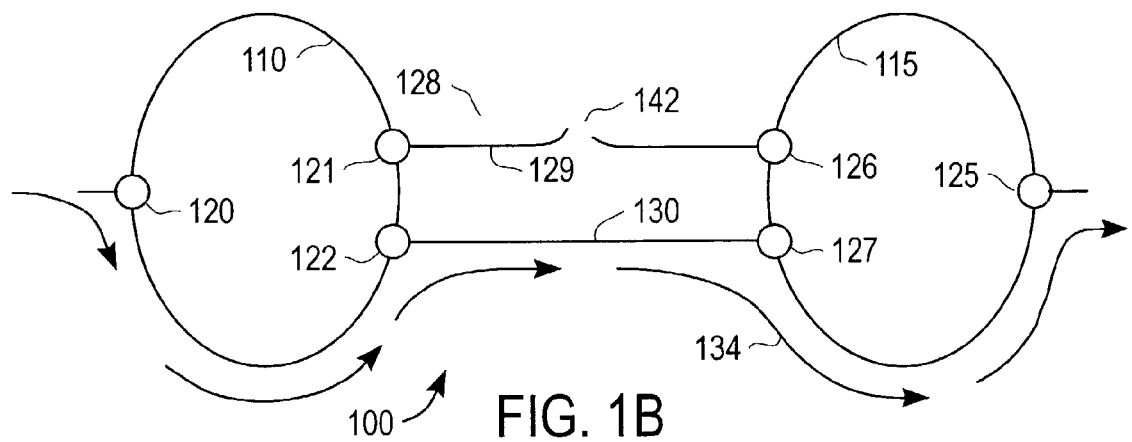
FIG. 1B is a schematic of the prior art optical network having a fault in a point-to-point span.

DWDM rings, such as those of optical network 100, whether implementing O-UPSR, or another standard, provide limited protection (i.e., rerouting) of optical signals should a point-to-point span fail or an OADM coupled to a point-to-point span fail. FIG. 1B shows optical network 100 having a failure 142 in point-to-point span 129. In the event of such a failure, the optical wavelengths, instead of being routed along path 132, are rerouted onto a switched path 134. While rerouting the optical wavelengths onto the switched path provides protection for a failed point-to-point span, a point-to-point span failure in conjunction with a DWDM ring failure may result in limited or no available rerouting.

Figure 1C:
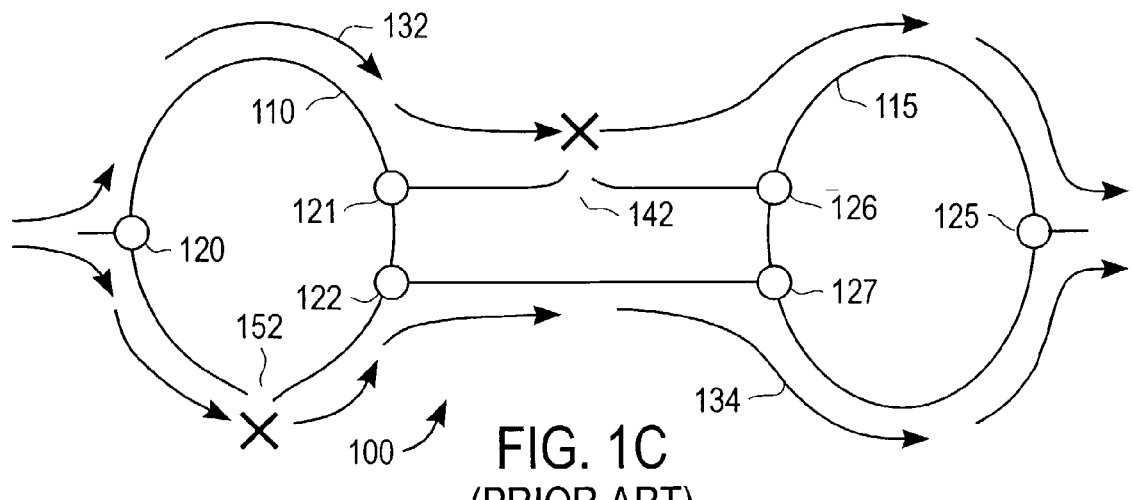
FIG. 1C is a schematic of the prior art optical network having faults in a point-to-point span and in a DWDM ring.

FIG. 1C is a schematic of optical network 100 having two fiber failures: a first failure 142 in span 129 and a second failure 152 in DWDM ring 110. The first failure 142 is along given path 132 and the second failure 152 is along the switched path 134. As discussed above, optical wavelengths on given path 132 are rerouted to the switched path 134 when a point-to-point spans fails. However, the switched path 134 includes the portion of DWDM ring 110 having failure 152. The failure in the switched path may leave optical network 100 without protection across the subnetwork. Accordingly, communications across such a failed network may be stopped. The present invention addresses such problems as well as others.

Optical Network Providing Multiplexed Subnetwork Protection

Figure 2A:
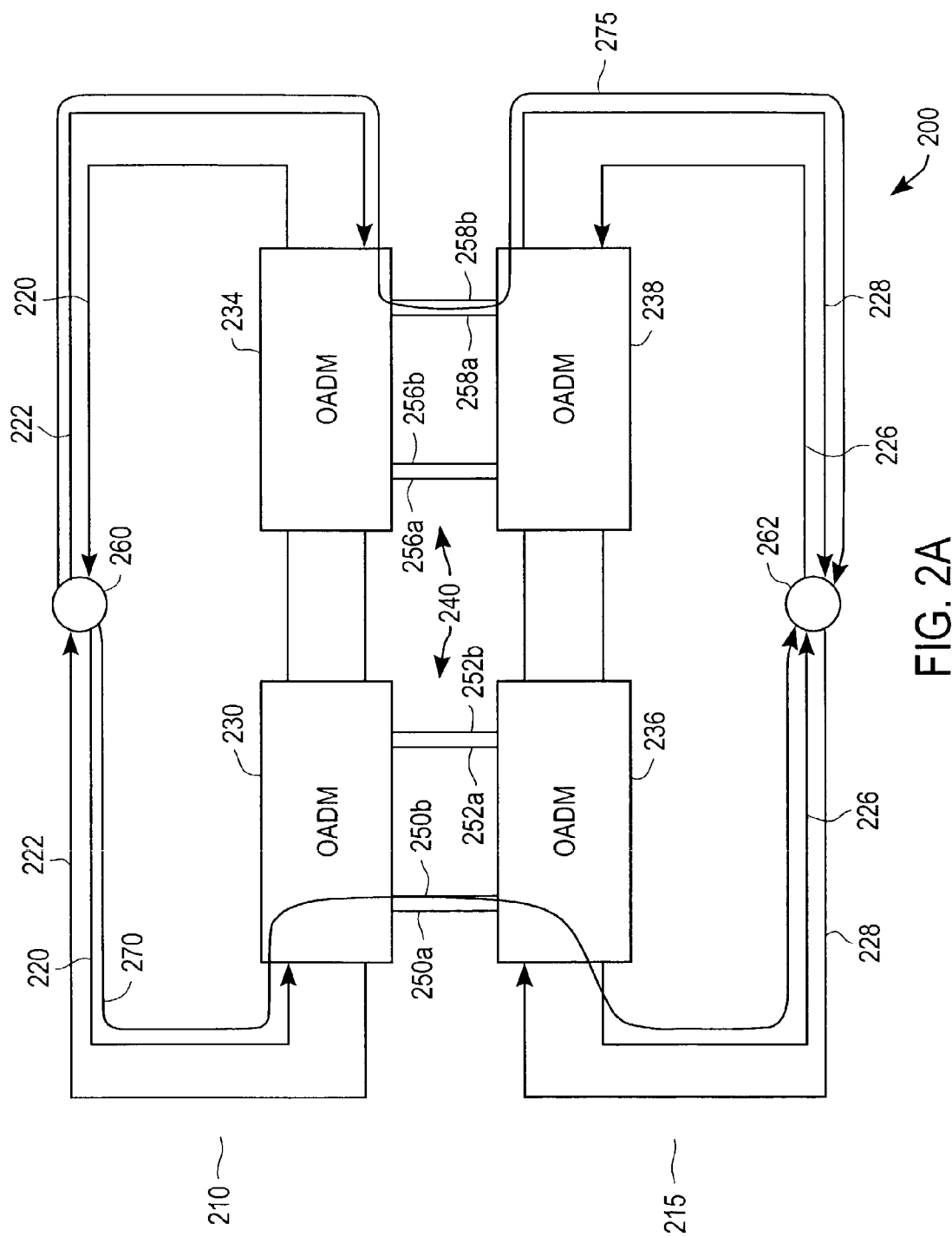
FIGS. 2A-2E are schematics of an optical network providing subnetwork protection according to an embodiment of the present invention.

FIG. 2A is a schematic of an optical network 200 providing subnetwork protection according to an embodiment of the present invention. Optical network 200 includes first and second DWDM rings 210 and 215 that further include optical fibers 220 and 222, and optical fibers 226 and 228, respectively. The first and second DWDM rings 210 and 215 may have a shared-protection network standard, such as an OMS-SPRING network, or a path-switched network standard, such as an optical-unidirectional-path-switched ring (O-UPSR) network, or other network standard. It is noted that while optical networks 100 and 200 have similar structures, for convenience, optical network 200 is shown in FIG. 2A rotated 90° from optical network 100 as shown in FIG. 1A.

Optical network 200 further includes first and second optical add-drop multiplexers (OADMS) 230 and 234 coupled to DWDM ring 210, and third and fourth OADMs 236 and 238 coupled to DWDM ring 215. A point-to-point subnetwork 240 (e.g., a ULH subnetwork) includes optical fibers 250a, 250b, 252a, 252b, 256a, 256b, 258a, and 258b, which provide for optical communications between the DWDM rings. OADMs 260 and 262, optically coupled to DWDM rings 210 and 215, respectively, provide for adding and dropping optical wavelengths (also referred to as optical bands or spectral bands) to and from their respective DWDM rings as is well known in the art. It should be understood that while DWDM rings 210 and 215 are each shown as having one OADM, several OADMs may be optically coupled to each of the rings. Further, OADMs coupled to the DWDM rings may be, for example, OADMs.

Optical network 200 provides multiple paths for transmitting optical wavelengths between the DWDM rings. According to a normal operation scheme of optical network 200, light having a first plurality of optical wavelengths, say $\lambda 1 \ldots \lambda m$, is routed between the DWDM rings along a path 270. The first plurality of optical wavelengths may be, for example, the working bands for an OMS-SPRING or O-UPSR ring. More specifically, the optical wavelengths are added to DWDM ring 210 via OADM 260 and are routed along optical fiber 220 to first OADM 230. The first OADM routes the optical wavelengths across optical fiber 250a to the second OADM 236.

Figure 2B:
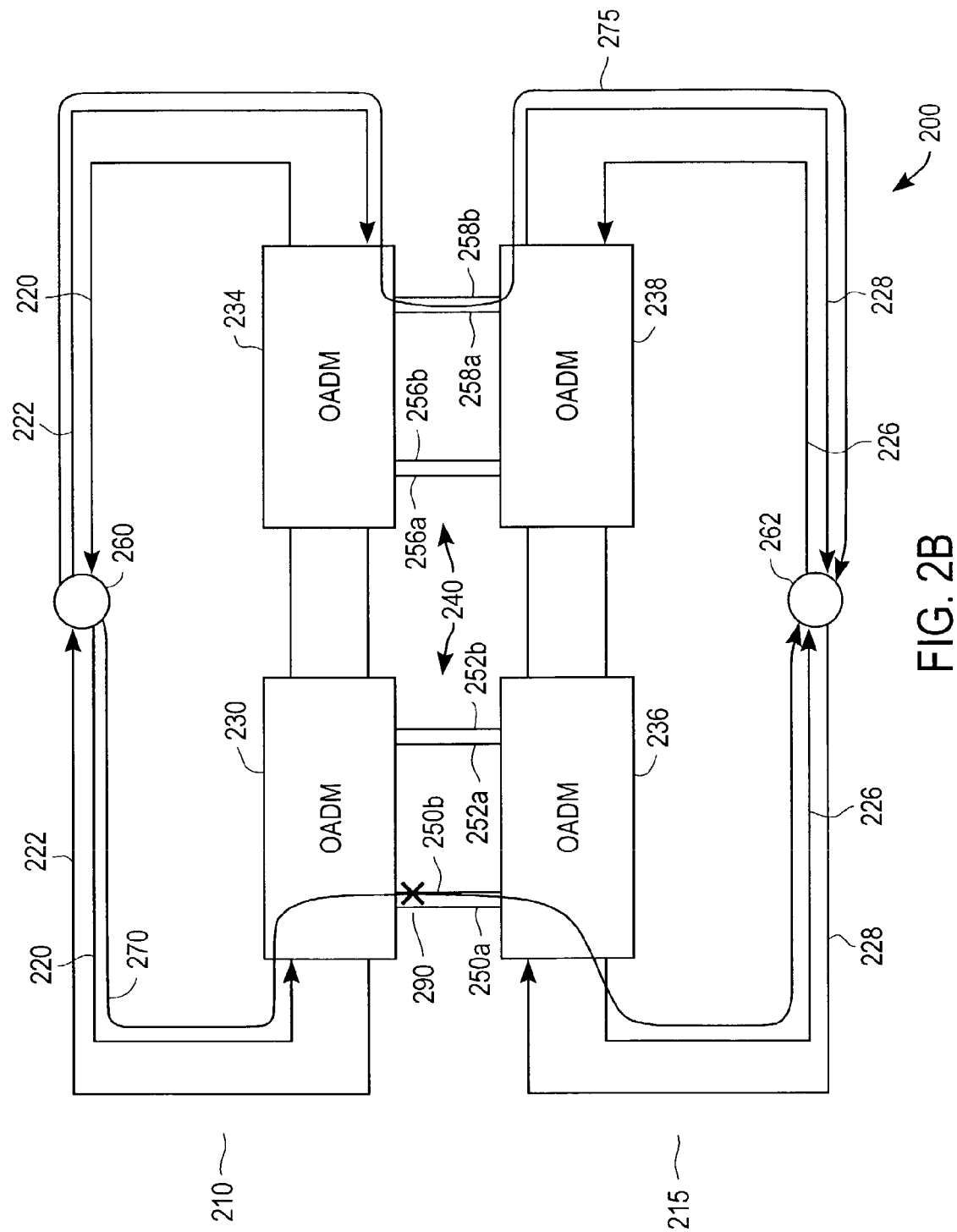

According to a protection scheme of optical network 200, the optical wavelengths are diversely routed along a protection path 275 to protect communication between the DWDM rings should a failure occur along path 270. For example, FIG. 2B shows a failure (designated by an "X") in optical fibers 250 disrupting the optical wavelengths traversing path 270. The optical wavelengths routed along protection path 275 may be, for example, the protection bands for an OMS-SPRING or O-UPSR ring. Along the protection path the optical wavelengths are added to DWDM ring 210 via OADM 260 and are further routed along optical fiber 220 to OADM 234. OADM 234, in turn, routes the optical wavelengths across optical fiber 258a to OADM 238, which, in turn, routes the optical wavelengths onto optical fiber 228. Protection path 275 is typically selected by an OADM, such as OADM 260, coupled to one of the DWDM rings, upon detection of a disruption of optical wavelengths being routed along path 270. Such routing of optical wavelengths onto protection path 275 is well known in the art.

Figure 2C:
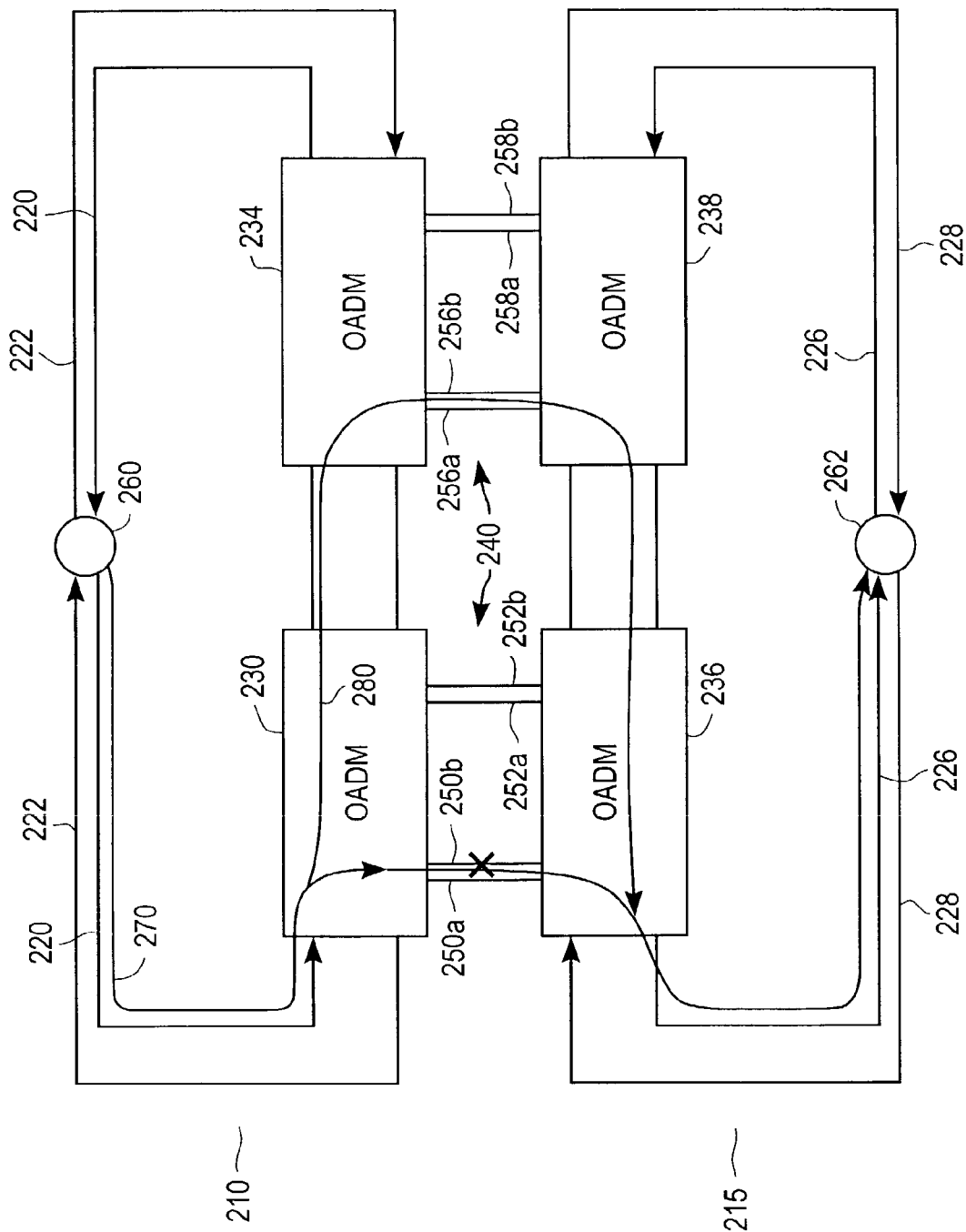

FIG. 2C is a schematic of optical network 200 showing another protection path 280 for protecting communications between the DWDM rings according to an embodiment of the present invention. First and second optical rings 210 and 215 are, for example, OMS-SPRINGs according to the example of FIG. 2C and optical wavelengths traversing path 270 may be, for example, working bands. Protection path 280 may be selected for a variety of failure configurations. For example, FIG. 2C shows optical network 200 having a failure 290 (designated by an "X") in optical fibers 250a and/or 250b.

Optical wavelengths routed along protection path 280 are a copy of the optical wavelengths (e.g., working bands) received by OADM 230 from optical fiber 220. OADM 230 splits the optical wavelengths, routes one copy along path 270 and routes another copy along path 280. The copy of optical wavelengths routed along path 280 is routed from OADM 230 to OADM 234, and is further routed across optical fiber 256a to OADM 238. OADM 238 routes the copy of optical wavelengths to OADM 236, which further routes the copy of optical wavelengths onto optical fiber 226, restoring optical communication across the subnetwork (i.e., providing protection for the subnetwork).

Figure 2D:
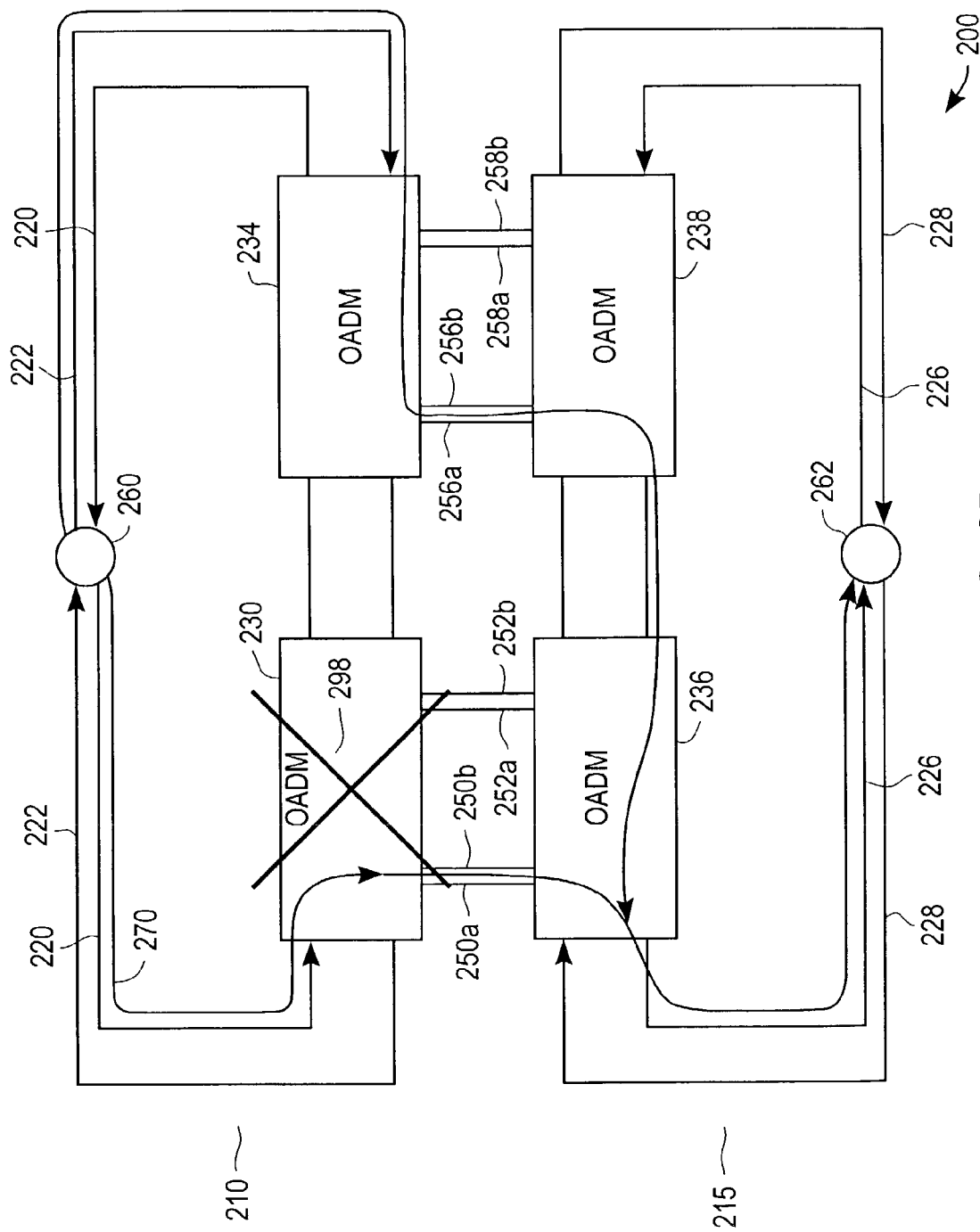

FIG. 2D is a schematic of optical network 200 showing another protection path 285 for protecting communications between the DWDM rings according to an embodiment of the present invention. Protection path 285 may be selected for a variety of failure configurations, for example, the failure 298 (designated by an "X") of OADM 230.

Optical wavelengths routed along protection path 285 are routed by OADM 260 onto optical fiber 222 instead of routing the optical wavelengths onto optical fiber 220. The optical wavelengths are received by OADM 234, which, in turn, routes the wavelengths onto optical fiber 256a. The optical wavelengths are received by OADM 238, which further routes the wavelengths to OADM 236. OADM 236 routes the optical wavelengths onto optical fiber 226, which routes the wavelengths to OADM 262, thus restoring communication across the subnetwork (i.e., providing protection for the subnetwork).

Figure 2E:
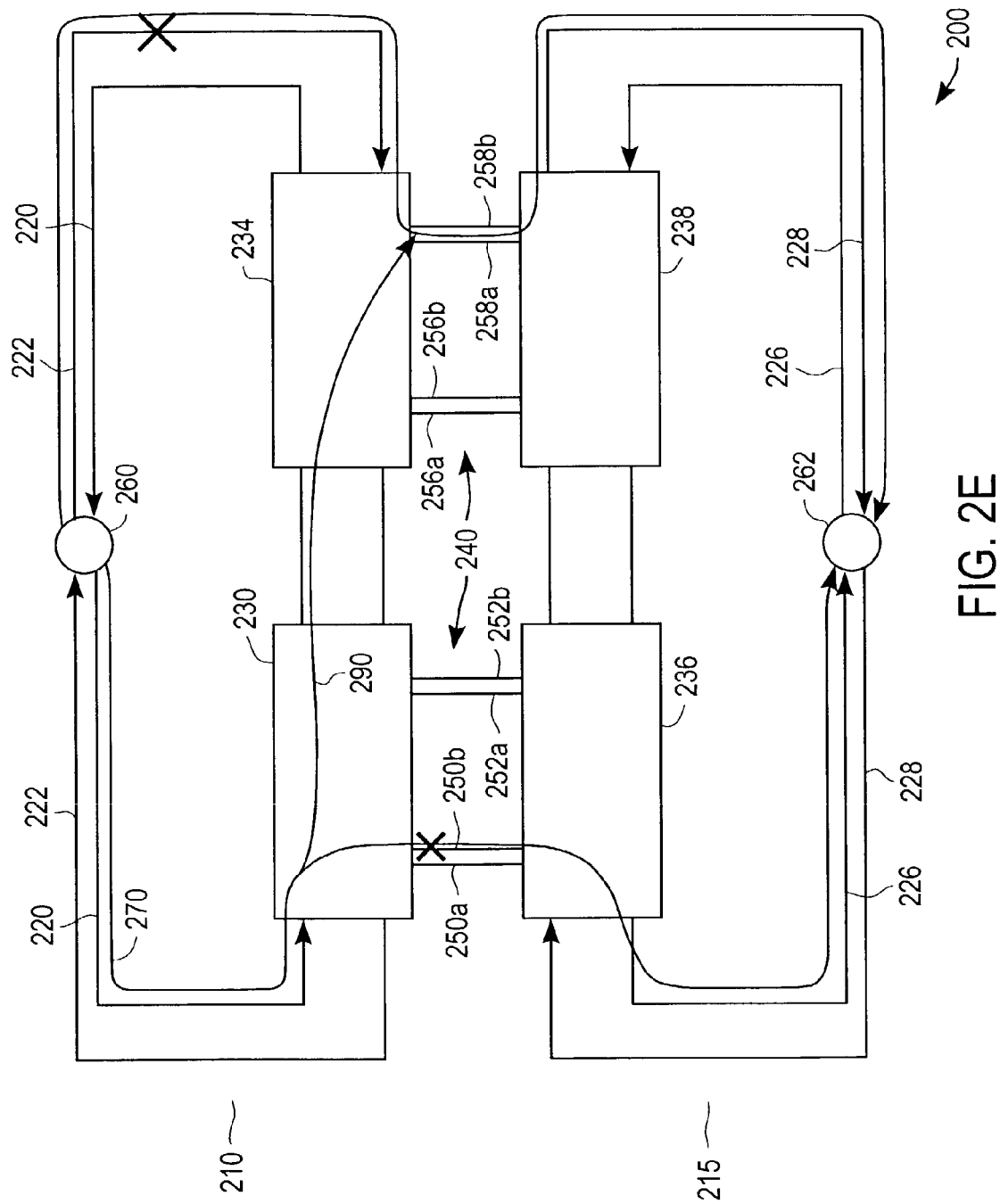

FIG. 2E is a schematic of optical network 200 showing another protection path 290 for protecting communications between the DWDM rings according to an embodiment of the present invention. First and second optical rings 210 and 215 are, for example, O-UPSR according to the example of FIG. 2E with working bands traversing path 270 and protection bands traversing path 275. Protection path 290 may be selected for a variety of failure configurations. For example, FIG. 2E shows optical network 200 having a first failure 292 (designated by an "X") in optical fibers 250a and/or 250b and a second failure 294 (designated by an "X") in optical fiber 296.

Optical wavelengths routed along protection path 290 are a copy of the optical wavelengths received by OADM 230 from optical fiber 220. OADM 230 splits the optical wavelengths, routes one copy along path 270 and routes another copy along path 290. The copy of optical wavelengths routed along path 290 is routed from OADM 230 to OADM 234, and is further routed across optical fiber 258a to OADM 238, which further routes the copy of optical wavelengths onto optical fiber 228, restoring optical communication across the subnetwork (i.e., providing protection for the subnetwork).

For each of the paths previously described, each OADM, 230, 234, 238, and 236 may route to successive optical devices (e.g., other OADMs) fewer optical wavelengths than the number received by the OADM. More specifically, each OADM, on a per wavelength basis, may selectively terminate a given wavelength or selectively transmit the given wavelength. For example, along path 270, OADM 230 receiving $\lambda 1 \ldots \lambda m$ may selectively terminate $\lambda 1$, $\lambda 2$, and $\lambda 3$ and selectively transmit $\lambda 4$, $\lambda 5 \ldots \lambda m$ to OADM 234. Each successive OADM receiving the optical wavelengths may similarly terminate or transmit given wavelengths.

As discussed above, for a shared-protection network, such as an OMS-SPRING network, half of the working optical wavelengths are allocated to a working fiber (e.g., optical fibers 220 and 226) and half of the working optical wavelengths are allocated to a protection fiber (e.g., optical fibers 222 and 228). Capacity not allocated to working traffic is allocated to protection traffic; such allocation is commonly referred to as a channel plan. Working traffic should typically not be established on channels allocated for protection traffic unless the working traffic can be preempted in the event of a protection switch. OADMs 230, 234, 238, and 236, being dynamically configurable to terminate or transmit optical wavelengths on a per wavelength basis, provide configurable routing that may take into account a shared-protection network channel plan. For example, the OADMs may transmit optical wavelengths onto channels allocated for protection traffic and may selectively terminate transmission of those wavelengths in the event of a protection switch. Accordingly, the present invention is dynamically configurable to provide subnetwork protection while taking into account an existing channel plan.

Each OADM 230, 234, 238, and 236 include add ports and drop ports that provide well know routing functionality. For simplicity the add ports and drop ports associated with each OADM are not shown in FIGS. 2A-2E.

Figure 3A:
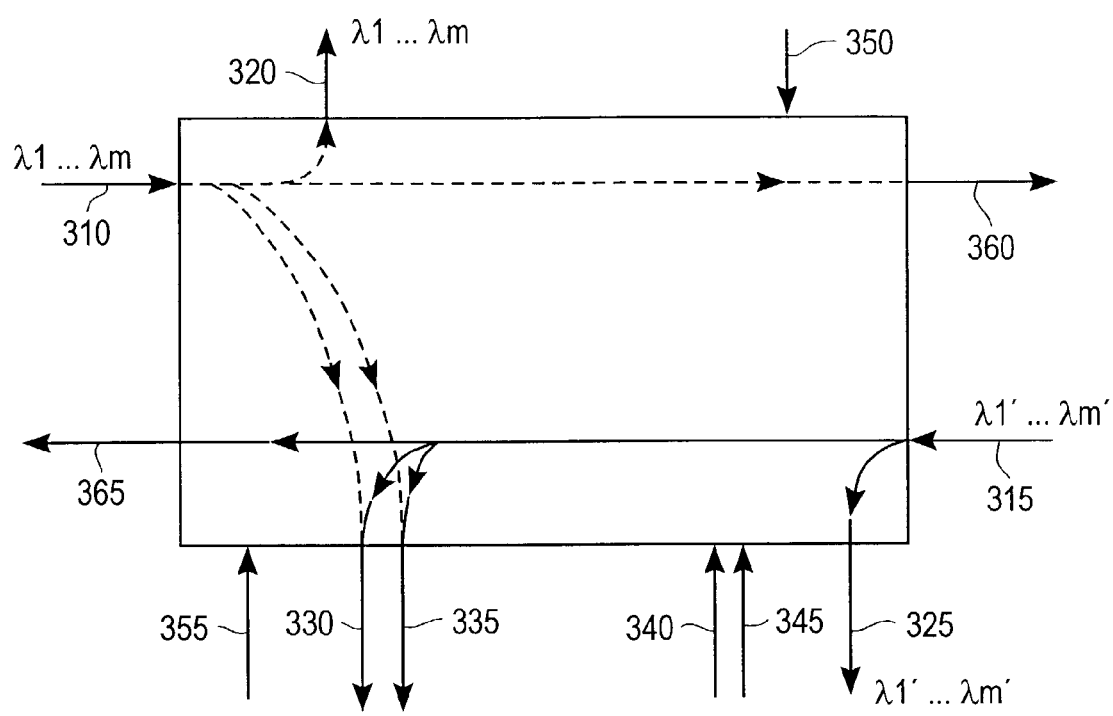
FIGS. 3A-3C are schematics of an OADM according to an embodiment of the present invention.
Figure 3B:
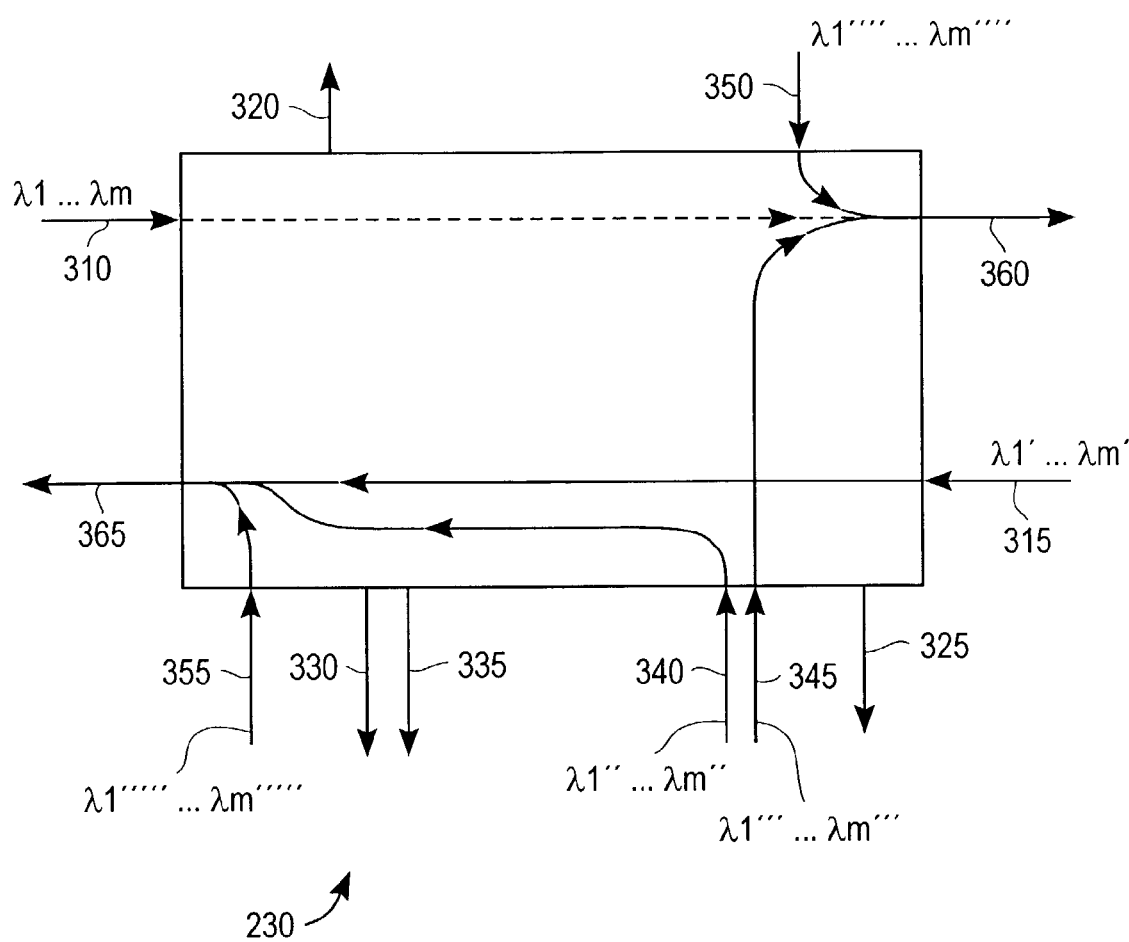

FIGS. 3A and 3B are schematics showing the optical routing states of OADM 230 (or alternatively OADM 234, 236, or 238) according to an embodiment of the present invention. The elements constituting OADM 230 and providing the routing shown in FIGS. 3A-3B will be discussed in detail subsequent to the following discussion of optical routing states.

OADM 230 includes first and second input ports 310 and 315 for accepting light having first and second pluralities of optical wavelengths, respectively, say $\lambda 1 \ldots \lambda m$ and $\lambda 1' \ldots \lambda m'$. The OADM splits each of the first and second pluralities of optical wavelengths into three copies. The three copies of the first plurality of optical wavelengths are referred to as the first drop wavelengths, the first dual-feed wavelengths, and the first express wavelengths. The three copies of the second plurality of optical wavelengths are referred to as the second drop wavelengths, the second dual-feed wavelengths, and the second express wavelengths.

The first drop and second drop wavelengths are routed to first and second drop ports 320 and 325, respectively. Select subsets of the first dual-feed and second dual-feed wavelengths are routed to first and second output ports 330 and 335. More specifically, OADM 230 is dynamically configurable to transmit one of a given pair of optical wavelengths having the same frequency, to both output ports 330 and 335 and to terminate the other optical wavelength. Each given pair of optical wavelengths includes one wavelength from the first dual-feed wavelengths and another wavelength from the second dual-feed wavelengths. For example, for a given pair of optical wavelengths, say $\lambda 1$ and $\lambda 1'$, one of $\lambda 1$ or $\lambda 1'$ is routed to both output ports 330 and 335 while the other optical wavelength is terminated. Alternatively, OADM 230 is dynamically configurable to route either optical wavelength of the given pair of optical wavelengths to either output port 330 or 335. For example, for the given pair of optical wavelengths $\lambda 1$ and $\lambda 1'$, $\lambda 1$ may be routed to output port 330 while $\lambda 1'$ is routed to output port 335, or $\lambda 1'$ may be routed to output port 330 while $\lambda 1$ is routed to output port 335.

OADM 230 additionally includes third and fourth input ports 340 and 345 for receiving light having third and fourth pluralities of optical wavelengths, respectively, say $\lambda 1'' \ldots \lambda m''$ and $\lambda 1''' \ldots \lambda m'''$. The OADM also has first and second add ports 350 and 355 for receiving light having fifth and six pluralities of optical wavelengths, respectively, say $\lambda 1'''' \ldots \lambda m''''$ and $\lambda 1''''' \ldots \lambda m'''''$. It should be understood that in the present discussion, select subsets of the first express wavelengths $\lambda 1 \ldots \lambda m$, the fourth plurality of optical wavelengths $\lambda 1''' \ldots \lambda m'''$, and the fifth plurality of optical wavelengths $\lambda 1'''' \ldots \lambda m''''$ are routed to a third output port 360. More specifically, OADM 230 is dynamically configurable to transmit one of a set of three given wavelengths to the third output port and to terminate the other two. The optical wavelengths of each set of three given optical wavelengths have the same frequency and include one wavelength from each of the first express wavelengths, the fourth plurality of optical wavelengths, and the fifth plurality of optical wavelengths. For example, for a set of three given wavelengths, say $\lambda 1$, $\lambda 1'''$, and $\lambda 1''''$, having the same frequency, either $\lambda 1$, $\lambda 1'''$, or $\lambda 1''''$ is routed to the third output port while the other two wavelengths are terminated.

OADM 230 is similarly configured to route selective subsets of the second express wavelengths λ1' . . . λm', the third plurality of optical wavelengths λ1" . . . λm", and the sixth plurality of optical wavelengths λ1"" . . . λm"" to a fourth output port 365.

It should be understood that in the present discussion, a unique channel of information is carried on a unique optical wavelength. Each unique optical wavelength of a plurality of optical wavelengths, for example the first plurality of optical wavelengths λ1 . . . λm, carries a unique channel of information. It being understood that suffixes 1 . . . m of the optical wavelengths λ, indicate that each λ1 . . . λm has a unique wavelength (i.e., frequency).

It should also be understood that in the present discussion, optical wavelengths of disparate pluralities of optical wavelengths, for example the first and second pluralities, may have the same or different wavelengths (i.e., frequencies). For example, λ1 and λ1' may have the same wavelength, and λ2 and λ2' may have the same wavelength, and so forth. Such might be the case in a discussion of an O-UPSR network. Alternatively, λ1 and λ1' may have different wavelengths, and λ2 and λ2' may have different wavelengths, and so forth. Such might be the case in a discussion of a shared protection ring network. The forgoing discussion is not an indication that optical wavelengths of different pluralities in an O-UPSR network or a shared protection ring network have the same or different wavelengths (i.e., frequencies), but is an indication that the pluralities of optical wavelengths according to the present discussion are not constrained to having the same wavelengths (i.e., frequencies). Those of skill in the art will understand in the discussions of various network formates which pluralities of optical wavelengths have the same or different wavelengths (i.e., frequencies).

Figure 3C:
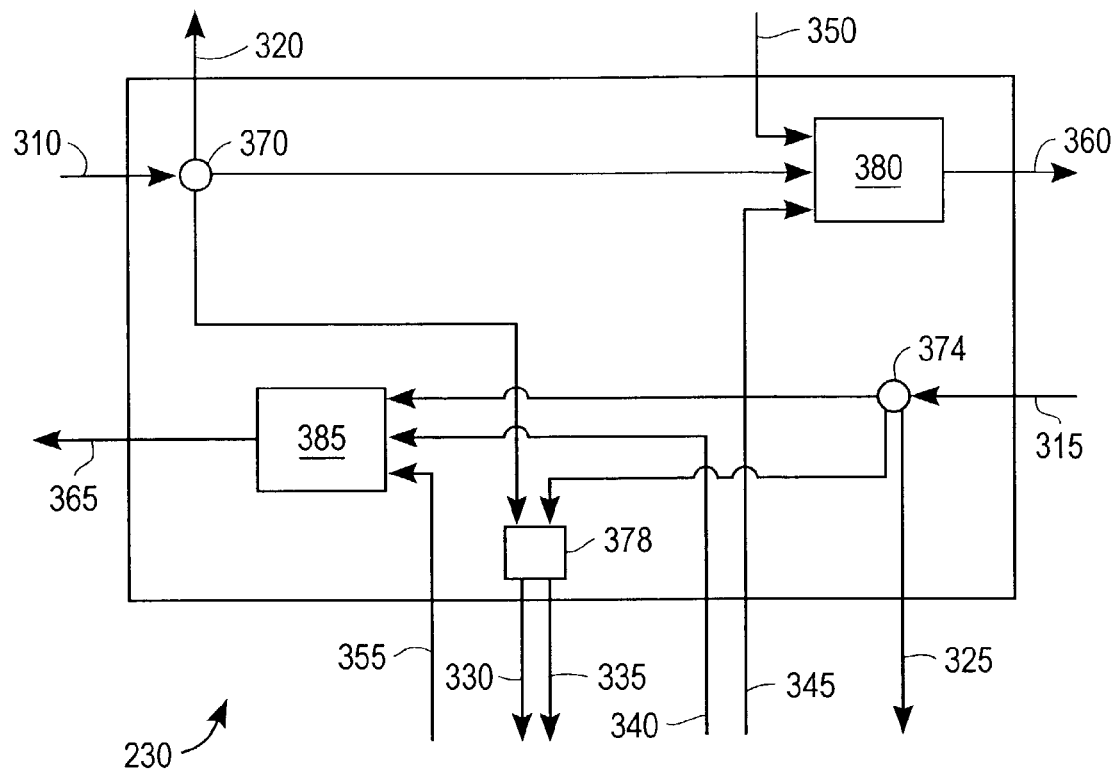

FIG. 3C is a schematic of OADM 230 showing the elements comprising the OADM. OADM 230 includes first and second optical splitters 370 and 374 optically coupled to first and second input ports 310 and 315, respectively. First and second optical splitters 370 and 374 split the first and second pluralities of optical wavelengths, respectively, into three copies as discussed above. The OADM further includes a two-by-two switch 378 optically coupled to first and second output ports 330 and 335 and is configured to receive the first and second dual-feed wavelengths. The two-by-two switch is dynamically configurable to selectively route subsets of the first and second dual-feed wavelengths to the first and/or second output ports, as discussed above. The OADM further includes first and second three-by-one switches 380 and 385 optically coupled to the third and fourth output ports 360 and 365, respectively. The first three-by-one switch is configured to receive the first express wavelengths, the fourth plurality of optical wavelengths, and the fifth plurality of optical wavelengths, and to selectively route subsets of the wavelengths to the third output port, as discussed above. The second three-by-one switch is configured to receive the second express wavelengths, the third plurality of optical wavelengths, and the sixth plurality of optical wavelengths, and to selectively route subsets of the wavelengths to the fourth output port, as discussed above.

Figure 3D:
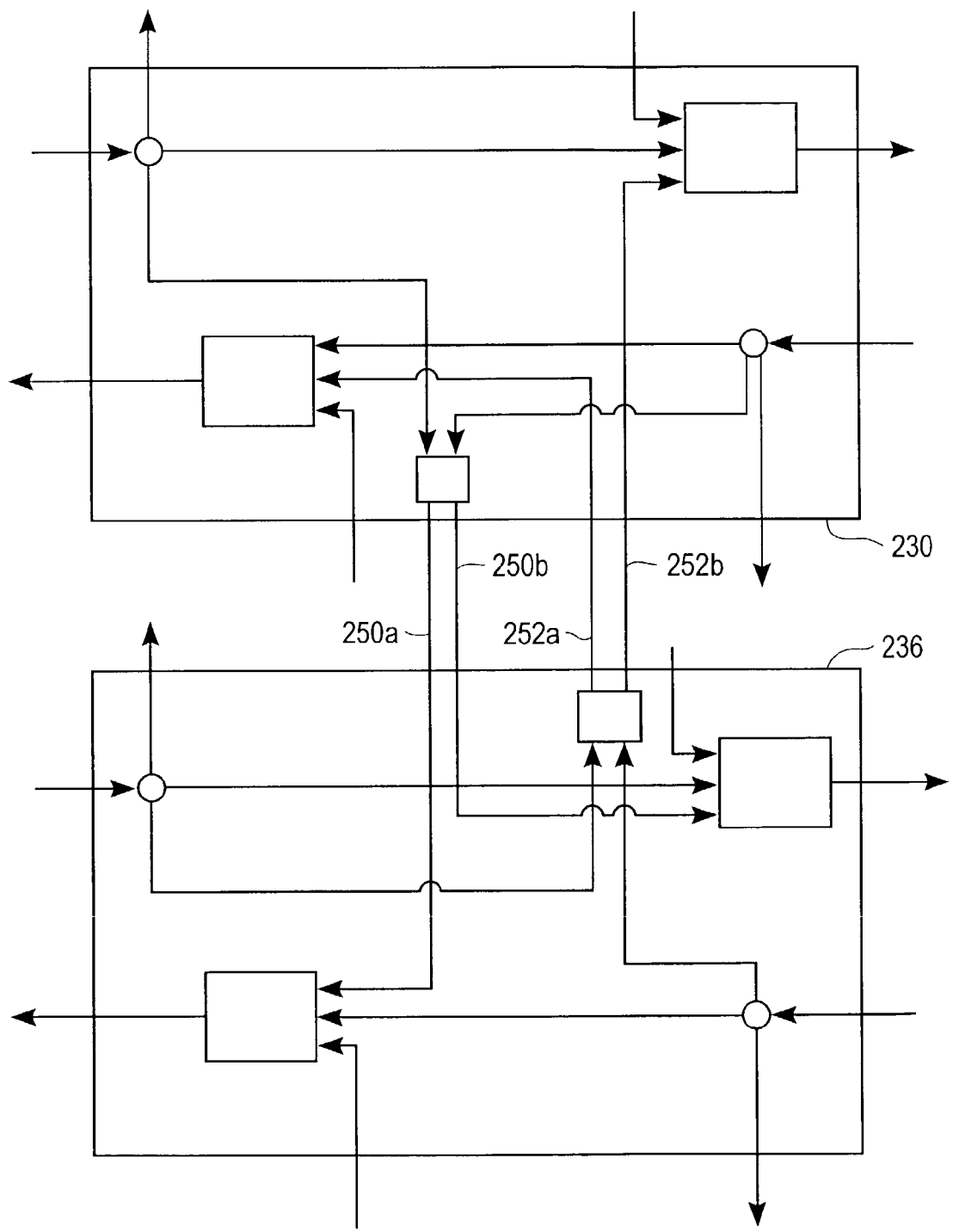
FIG. 3D is a schematic of a pair of OADMs coupled by optical fibers.

FIG. 3D is a schematic of first and second OADMs 230 and 236 optically coupled by optical fibers 250a, 250b, 252a, and 252b. FIG. 3D shows OADMs 230 and 236 as they are oriented in optical network 200 shown in FIGS. 2A-2D. Third and fourth OADMs 256 and 258 are similarly oriented in optical network 200.

Figure 4:
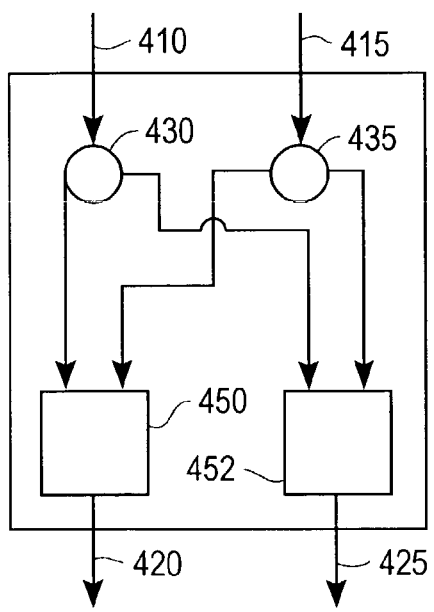
FIG. 4 is a schematic of a two-by-two switch 378 according to an embodiment of the present invention.

FIG. 4 is a schematic of a two-by-two switch 378 according to an embodiment of the present invention. The two-by-two switch is dynamically configurable to route an optical wavelength received at either of its input ports 410 or 415 to either of its output ports 420 or 525. More specifically, the first and second input ports are configured to receive the first and second dual-feed wavelengths, respectively. First and second optical splitters 430 and 435 are configured to split the first and second dual-feed wavelengths, respectively, into two copies. The two-by-two switch further includes first and second wavelength routing elements (WRE) 450 and 452. Each of the WREs is configured to receive one copy of both the first and second dual-feed wavelengths. Each WRE comprises a plurality of two-by-one switches. According to one embodiment of the present invention, each WRE comprises 80 two-by-one switches. Each two-by-one switch is configured to receive a pair of optical wavelengths having the same frequency. The pair includes one optical wavelength from the first dual-feed wavelengths and one optical wavelength from the second dual-feed wavelengths. Each two-by-one switch dynamically selects the termination of one of the wavelengths and the transmission of the other wavelength. Wavelengths transmitted by the two-by-one switches are transmitted from their respective WREs 450 or 452, and are further transmitted from OADM 200 via their respective first or second output port 420 or 425. Various WRE providing the previously described selective termination and transmission functions are described in detail in co-owned and co-pending U.S. patent application Ser. No. 09/442,061, entitled "Wavelength Router," incorporated herein by reference for all purposes.

Figure 5:
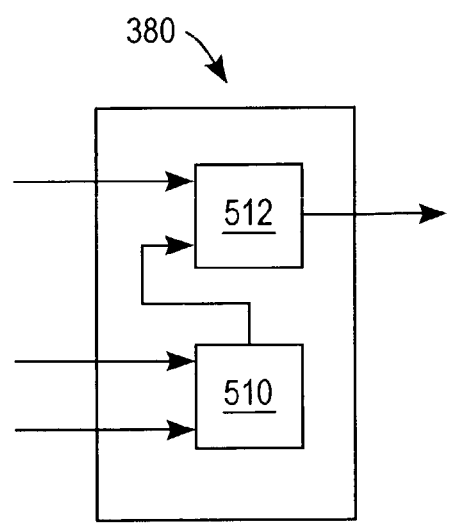
FIG. 5 is a schematic of three-by-one switch according to an embodiment of the present invention.

FIG. 5 is a schematic of three-by-one switch 380 (or alternatively 385) according to an embodiment of the present invention. The three-by-one switch includes optically coupled first and second WRE 510 and 512, such as those described above. The output of WRE 510 is fed into one of the inputs of WRE 512. Each WRE comprises a plurality of two-by-one switches. According to one embodiment of the present invention, each WRE comprises 80 two-by-one switches. Pairs of two-by-one switches are configured to dynamically switch sets of three given optical wavelengths. For example, a given two-by-one switch associated with WRE 510 is configured to receive two optical wavelengths having the same frequency. One of the optical wavelengths is from the first express wavelengths and the other optical wavelength is from the third plurality of optical wavelengths. The given two-by-one switch terminates one of the optical wavelengths and transmits the other. Another two-by-one switch associated with WRE 512 is configured to receive the optical wavelength transmitted by the given two-by-one switch and to receive an optical wavelength from the fourth plurality of optical wavelengths. The two optical wavelengths received by the other two-by-one switch have the same frequency. The other two-by-one switch terminates one of these optical wavelengths and transmits the other; the transmitted optical wavelength is, in turn, transmitted from the WRE and is further transmitted from the OADM.

Optical Network Providing Multiplexed Subnetwork Protection

Figure 6A:
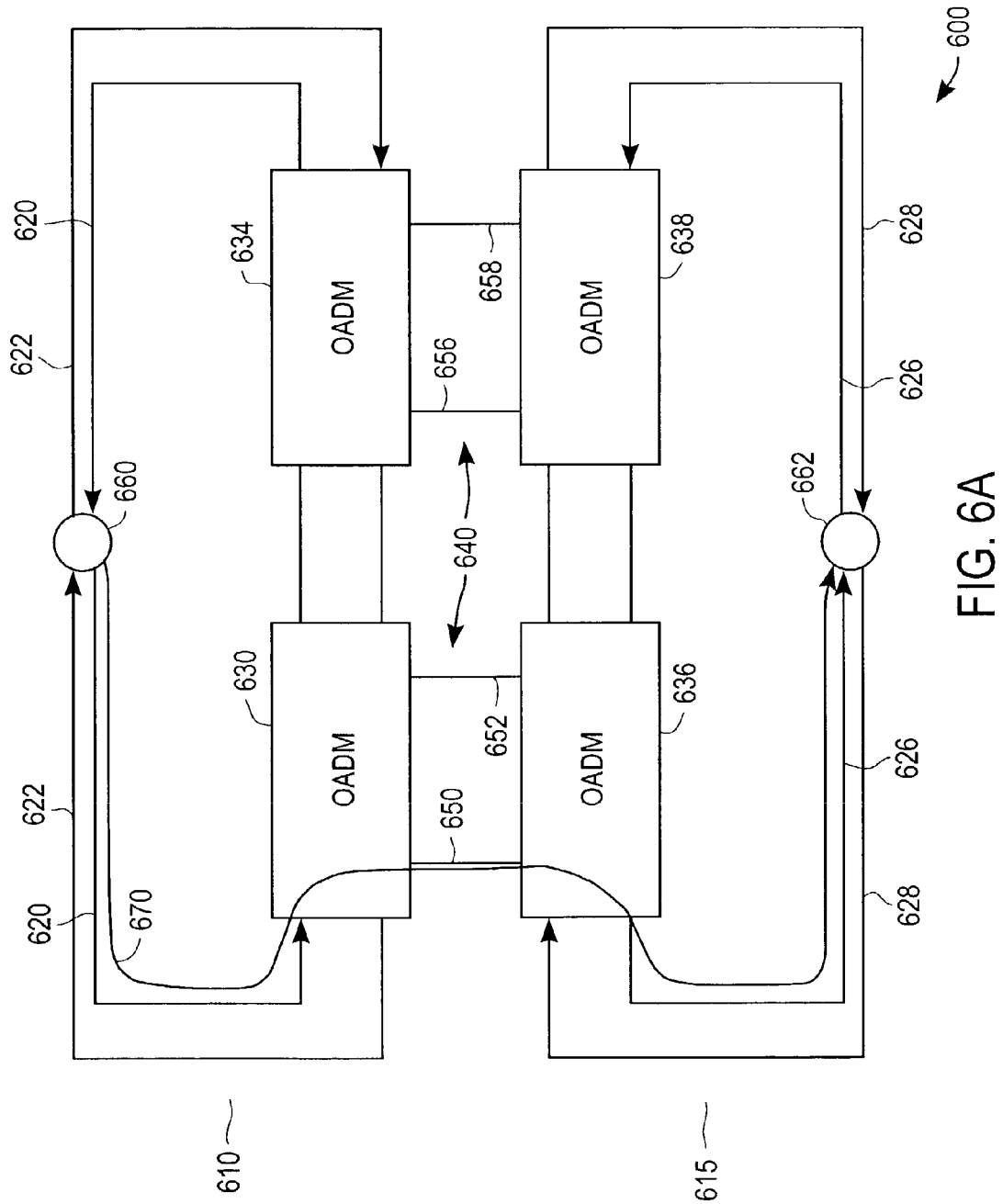
FIGS. 6A-6D are schematics of an optical network providing subnetwork protection according to another embodiment of the present invention.

FIG. 6A is a schematic of an optical network 600 providing subnetwork protection according to another embodiment of the present invention. This embodiment differs from the embodiments of FIGS. 2A-2D in that point-to-point subnetwork 640 includes four optical fibers 650, 652, 656 and 658, and has first, second, third, and fourth OADMs 630, 634, 636, and 638 configured to transmit and receive optical wavelengths to and from the subnetwork.

Optical network 600 includes first and second DWDM rings 610 and 615, respectively, which further include optical fibers 620 and 622, and optical fibers 626 and 628, respectively. DWDM rings 610 and 615 may have a shared protection network standard, such as an OMS-SPRING network, or a path-switched network standard, such as an O-UPSR network, or other network.

The first and second OADMs 630 and 634 are coupled to DWDM ring 610, and the third and fourth OADMs 636 and 638 are coupled to DWDM ring 615. Point-to-point subnetwork 640 (e.g., ULH subnetwork) provides for optical communications between the DWDM rings. OADMs 660 and 662 optically coupled to DWDM rings 610 and 615, respectively, provide for adding and dropping optical wavelengths to and from the DWDM rings as is well known in the art. It should be understood that while DWDM rings 610 and 615 are each shown as having one OADM optically coupled to each ring, several OADMs may be optically coupled to each of the rings. Further, OADMs coupled to the DWDM rings may be, for example, OADMs.

Optical network 600 provides multiple paths, similar to those shown in FIGS. 2A-2D, for transmitting optical wavelengths between the DWDM rings. According to a normal operation scheme of optical network 600, light having a first plurality of optical wavelengths, say $\lambda 1 \ldots \lambda m$, is routed between the DWDM rings along path 670. More specifically, the optical wavelengths are added to DWDM ring 610 via OADM 660 and are routed along optical fiber 620 to first OADM 630. The first OADM routes the optical wavelengths across optical fiber 650 to the second OADM 636. OADM 636, in turn, routes the optical wavelengths onto optical fiber 626, which routes the wavelengths to OADM 662.

Figure 6B:
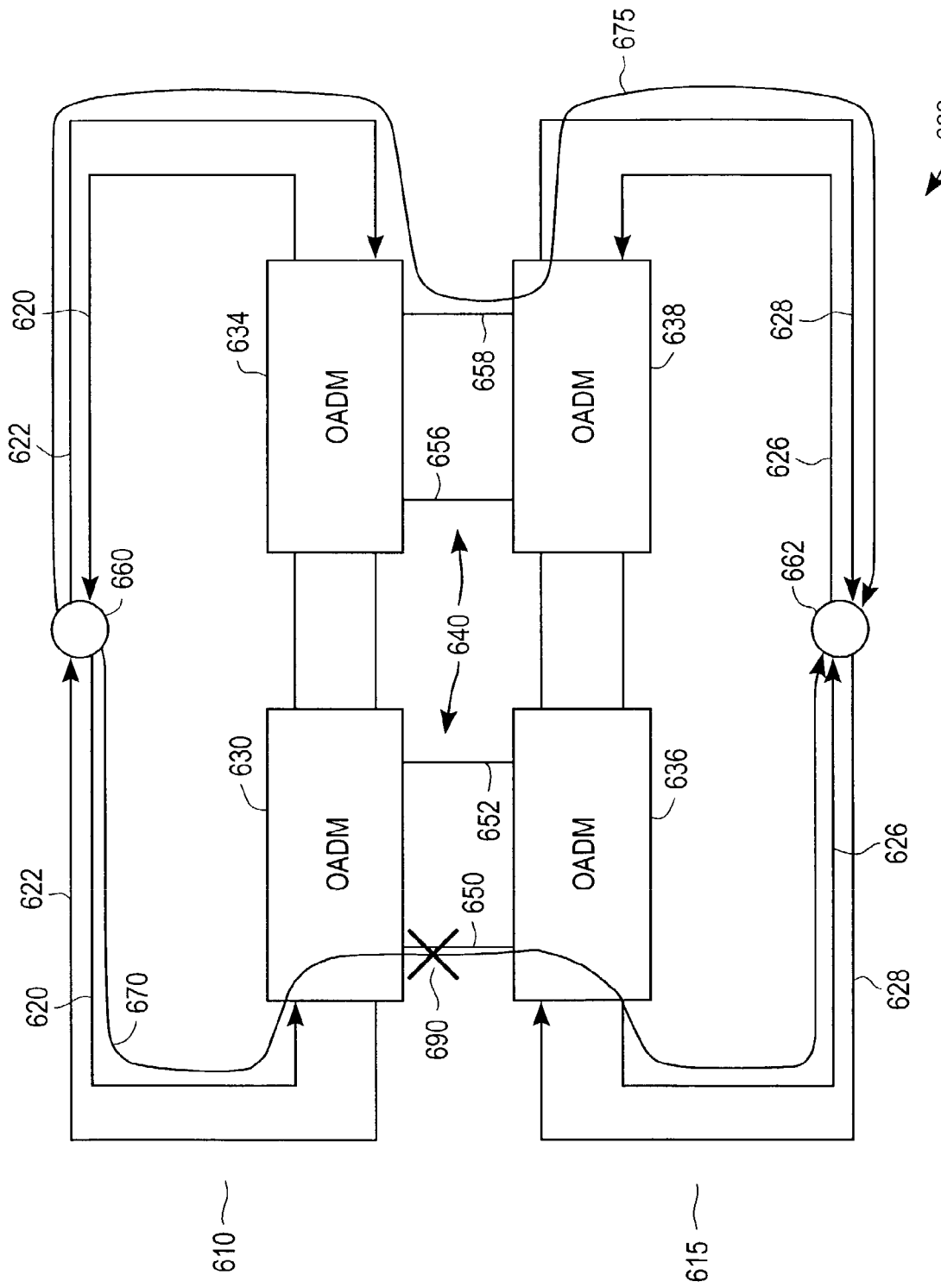

According to a protection scheme of optical network 600, the optical wavelengths are routed along a protection path 675 to protect communication between the DWDM rings should a failure occur along path 670. For example, FIG. 6B shows a failure 690 (designated by an "X") in optical fiber 650 disrupting the optical wavelengths traversing path 670. Along the protection path the optical wavelengths $\lambda 1 \ldots \lambda m$ are added to DWDM ring 610 via OADM 660 and are routed along optical fiber 622 to OADM 634, which, in turn, routes the optical wavelengths across optical fiber 658 to OADM 638. OADM 638 routes the optical wavelengths onto optical fiber 628, which further routes the wavelengths to OADM 662 restoring optical communication across the subnetwork. Protection path 675 is typically selected by an OADM, such as OADM 660, coupled to one of the DWDM rings upon detection of a disruption of optical wavelengths being routed along path 670. Such routing of optical wavelengths onto protection path 675 is well known in the art.

Figure 6C:
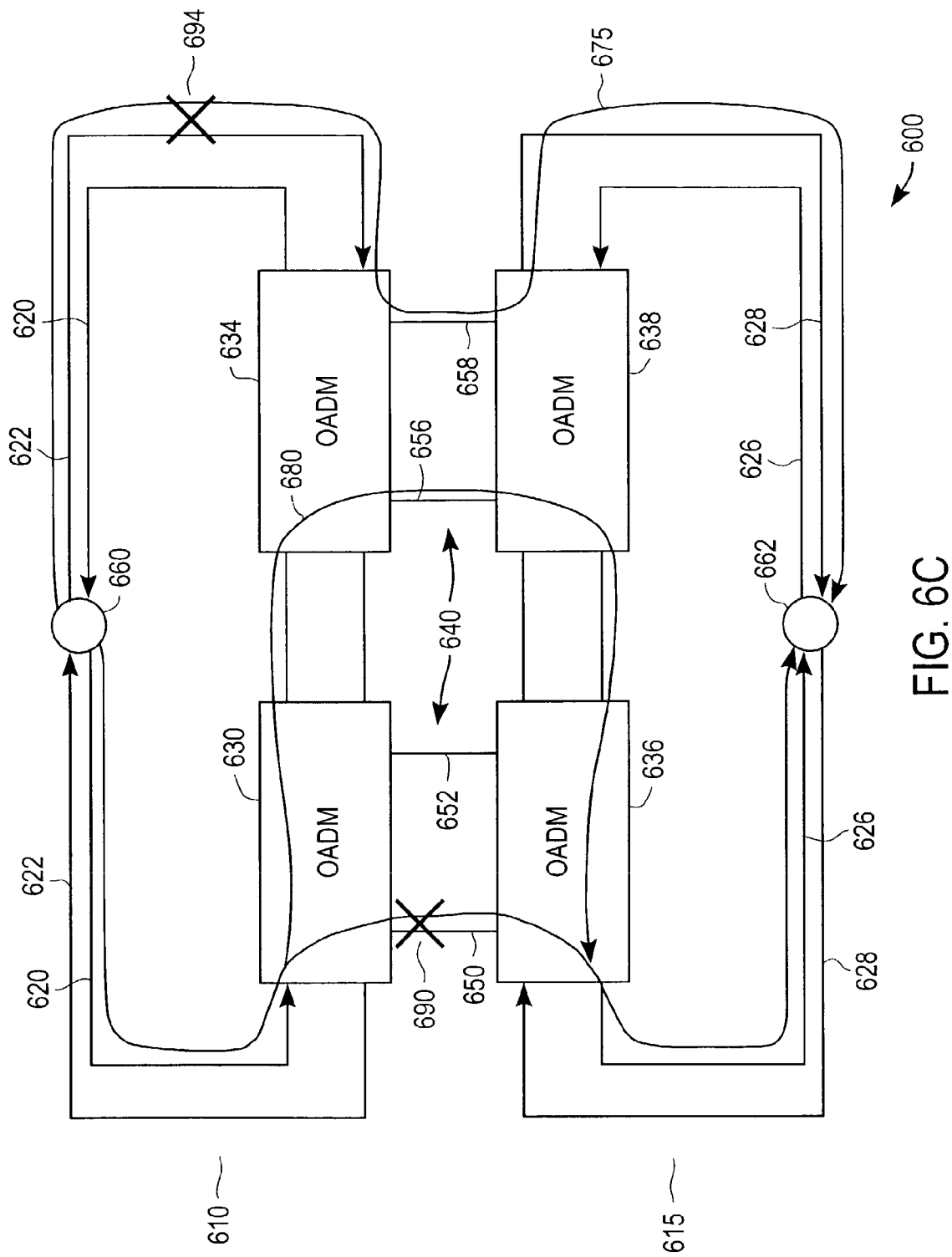

FIG. 6C is a schematic of optical network 600 showing another protection path 680 for protecting communications between the DWDM rings according to an embodiment of the present invention. Protection path 680 may be selected for a variety of failure configurations, for example, FIG. 6C shows optical network 600 having two failed optical components; the first failure 690 (designated by an "X") is in optical fiber 650 and the second failure 694 (designated by an "X") is in optical fiber 622 along protection path 675.

Optical wavelengths routed along protection path 680 are a copy of the optical wavelengths received by OADM 630 from optical fiber 620. OADM 630 splits the optical wavelengths and routes one copy of the optical wavelengths along path 670 and routes another copy along path 680. The optical wavelengths routed along path 680 are routed from OADM 630 to OADM 634 and are further routed across optical fiber 656 to OADM 638. OADM 638, in turn, routes the optical wavelengths to OADM 636, which further routes the wavelengths onto optical fiber 626, restoring optical communication to the subnetwork.

Figure 6D:
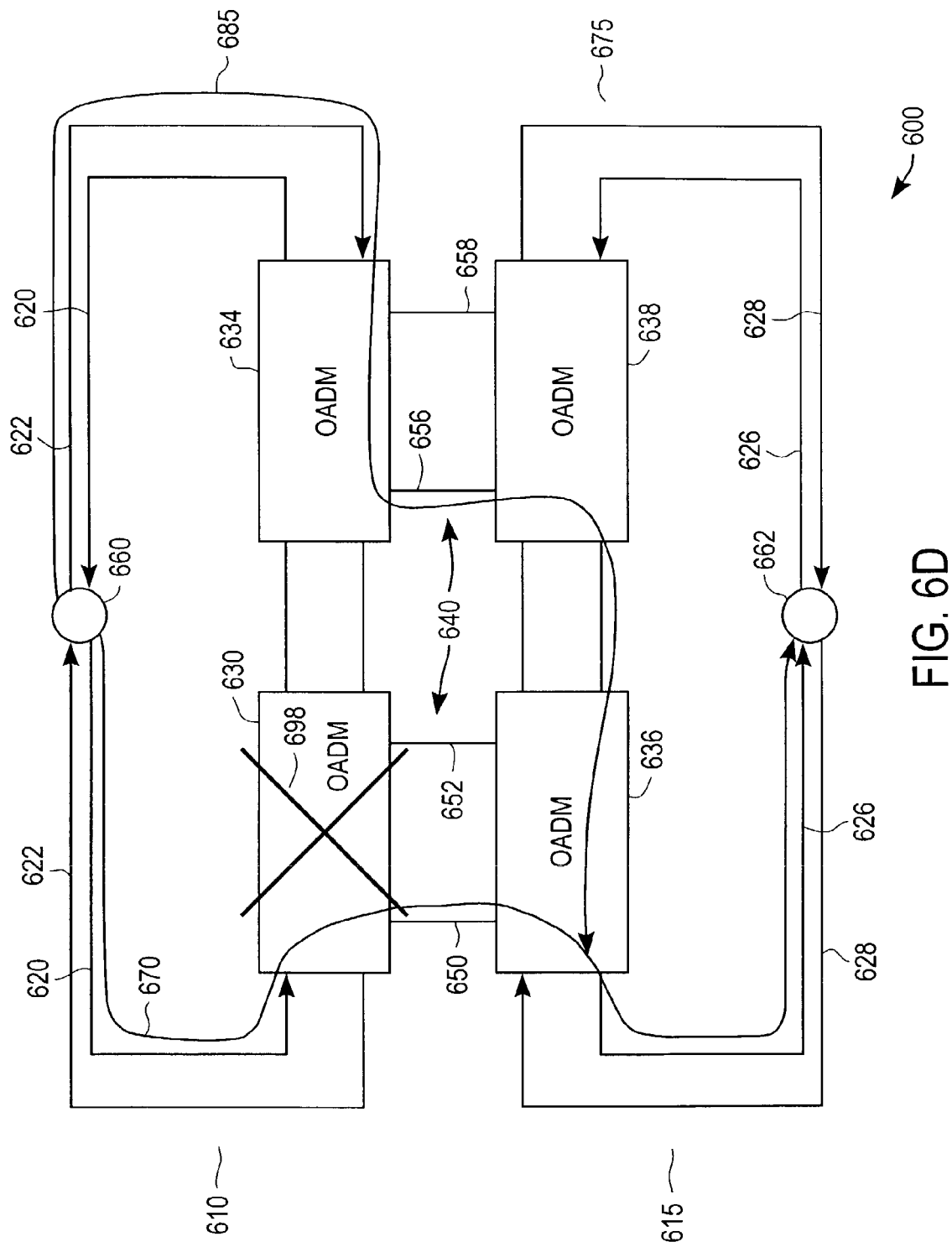

FIG. 6D is a schematic of optical network 600 showing another protection path 685 for protecting communications between the DWDM rings according to an embodiment of the present invention. Protection path 685 may be selected for a variety of failure configurations, for example, the failure 698 (designated by an "X") of OADM 630.

Optical wavelengths routed along protection path 685 are routed by OADM 660 onto optical fiber 622 instead of routing the optical wavelengths onto optical fiber 620. The optical wavelengths are received by OADM 634, which further routes the wavelengths onto optical fiber 656. The optical wavelengths are received by OADM 658, which, in turn, further routes the optical wavelengths to OADM 636. OADM 636 routes the optical wavelengths over optical fiber 626 to OADM 662, thus restoring communication across the subnetwork (i.e., providing protection for the subnetwork).

For each of the paths previously described, each OADM, 630, 634, 638, and 636 may route to successive optical devices (e.g., other OADMs) fewer optical wavelengths than the number received by the OADM. More specifically, each OADM, on a per wavelength basis, may selectively terminate a given wavelength or selectively transmit the given wavelength. For example, along path 670, OADM 630 receiving $\lambda 1 \ldots \lambda m$, may selectively terminate $\lambda 1, \lambda 2$, and $\lambda 3$ and selectively transmit $\lambda 4, \lambda 5 \ldots \lambda m$ to OADM 634. Each successive OADM receiving the optical wavelengths may similarly terminate or transmit given wavelengths.

Figure 7A:
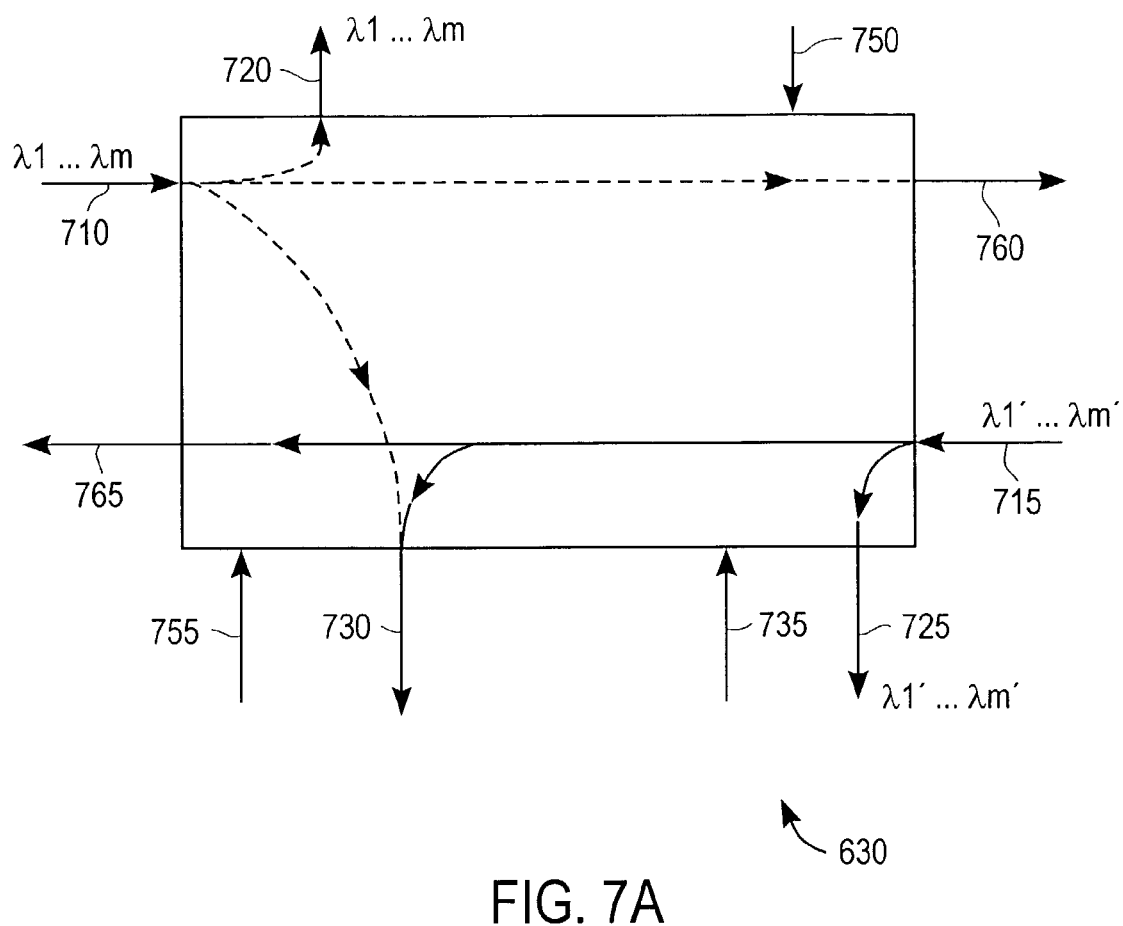
FIGS. 7A-7C are schematics of an OADM according to another embodiment of the present invention.
Figure 7B:
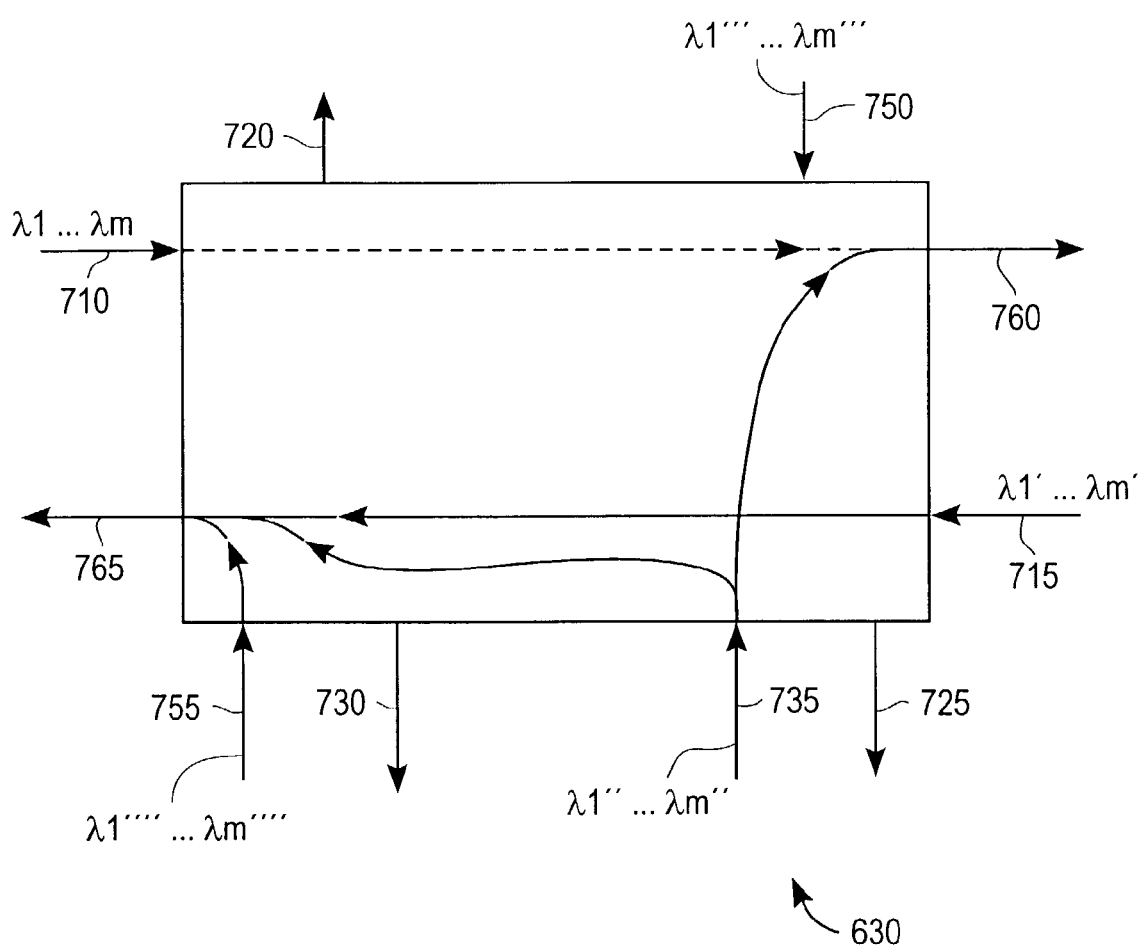

FIGS. 7A and 7B are schematics showing the optical routing states of OADM 630 (or, alternatively, OADM 634, 636, or 638) according to an embodiment of the present invention. Elements comprising OADM 630 and providing the routing shown in FIGS. 7A-7B will be discussed in detail subsequent to the following discussion of optical routing states.

As shown in FIG. 7A, OADM 630 has first and second input ports 710 and 715 for accepting light having first and second pluralities of optical wavelengths, respectively, say $\lambda 1 \ldots \lambda m$ and $\lambda 1' \ldots \lambda m'$. The OADM splits each of the first and second pluralities of optical wavelengths into three copies. The three copies of the first plurality of optical wavelengths are referred to as the first drop wavelengths, the first dual-feed wavelengths, and the first express wavelengths. The three copies of the second plurality of optical wavelengths are referred to as the second drop wavelengths, the second dual-feed wavelengths, and the second express wavelengths.

The first and second drop wavelengths are routed to first and second drop ports 720 and 725, respectively. Selective subsets of the first and second dual-feed wavelengths are routed to first output port 730. More specifically, OADM 630 is dynamically configurable to transmit one of a given pair of optical wavelengths having the same frequency, to output port 730 and to terminate the other optical wavelength. Each given pair of optical wavelengths includes one wavelength from the first dual-feed wavelengths and another wavelength from the second dual-feed wavelengths. For example, for a given pair of optical wavelengths having the same frequency, say $\lambda 1$ and $\lambda 1'$, one of $\lambda 1$ or $\lambda 1'$ is routed to first output port 730 and the other optical wavelength is terminated.

As shown in FIG. 7B, OADM 630 additionally includes a third input port 735 for receiving light having a third plurality of optical wavelengths, say $\lambda 1'' \ldots \lambda m''$. The OADM also has first and second add ports 750 and 755 for receiving light having fourth and fifth pluralities of optical wavelengths, respectively, say $\lambda 1''' \ldots \lambda m'''$ and $\lambda 1'''' \ldots \lambda m''''$.

Select subsets of the first express wavelengths $\lambda 1 \ldots \lambda m$, the third plurality of optical wavelengths $\lambda 1'' \ldots \lambda m''$, and the fourth plurality of optical wavelengths $\lambda 1''' \ldots \lambda m'''$ are routed to a second output port 760. More specifically, OADM 630 is dynamically configurable to transmit one of a set of three given wavelengths to the second output port and to terminate the other two wavelengths. The optical wavelengths of each set of three given optical wavelengths have the same frequency and include one wavelength from each of the first express wavelengths, the third plurality of optical wavelengths, and the fourth plurality of optical wavelengths. For example, for a set of three given wavelengths, say $\lambda 1$, $\lambda 1''$, and $\lambda 1'''$, having the same frequency, either $\lambda 1$, $\lambda 1''$, or $\lambda 1''''$ is routed to the third output port while the other two wavelengths are terminated. OADM 730 is similarly configured to route selective subsets of the second express wavelengths $\lambda 1' \ldots \lambda m'$, the third plurality of optical wavelengths $\lambda 1'' \ldots \lambda m''$, and the fifth plurality of optical wavelengths $\lambda 1'''' \ldots \lambda m''''$ to a third output port 765.

Figure 7C:
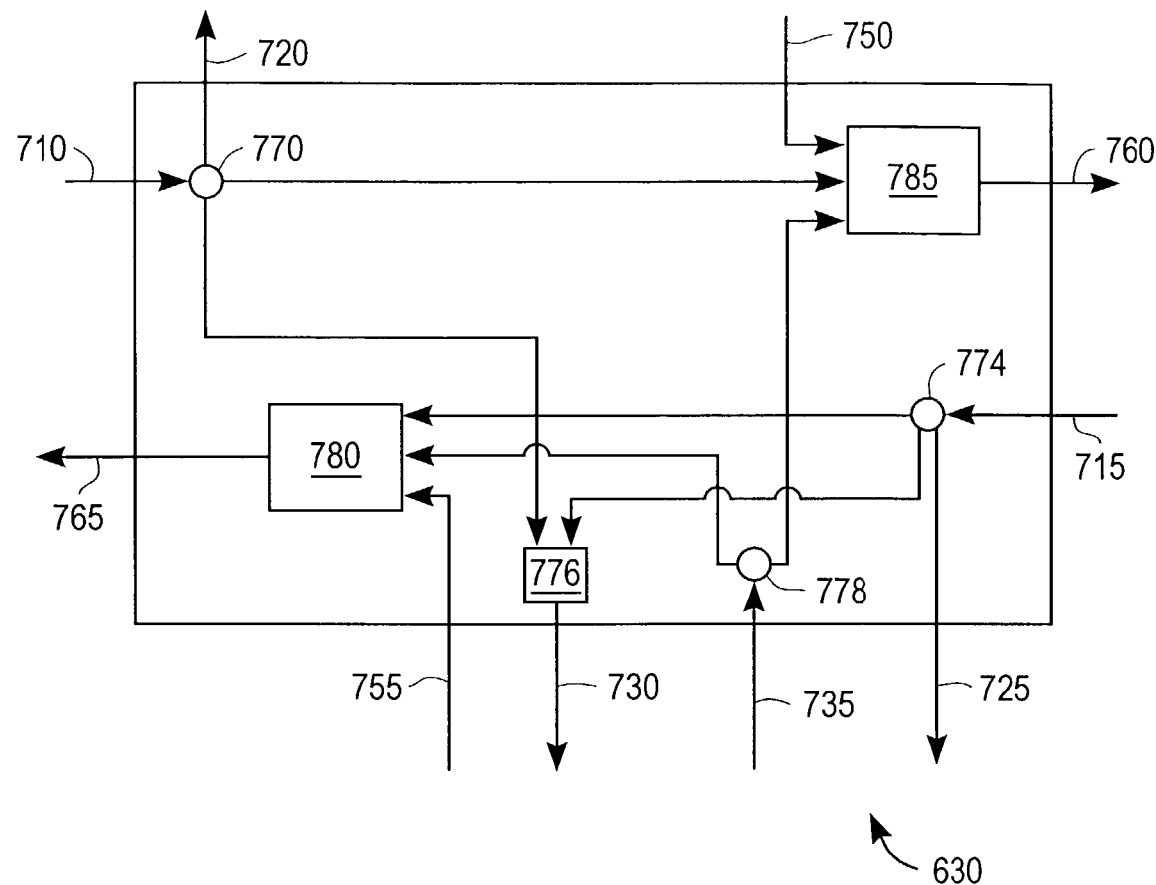

FIG. 7C is a schematic of OADM 630 (or, alternatively, OADM 634, 636, or 638) showing the elements comprising the OADM. OADM 630 includes first and second optical splitters 770 and 774 optically coupled to first and second input ports 710 and 715, respectively. First and second optical splitters 770 and 774 split the first and second pluralities of optical wavelengths, respectively, into three copies as discussed above. A two-by-one switch 776, optically coupled to first output port 730, is configured to receive the first and second dual-feed wavelengths. The two-by-one switch is dynamically configurable to selectively route subsets of the first and second dual-feed wavelengths to the first output port, as discussed above. A third optical splitter 778, optically coupled to third input port 735, is configured to receive the third plurality of optical wavelengths. The optical splitter splits the third plurality of optical signals into two copies. First and second three-by-one switches 780 and 785 are optically coupled to second and third output ports 760 and 765, respectively. The first three-by-one switch is configured to receive the first express wavelengths, a copy of the third plurality of optical wavelengths, and the fourth plurality of optical wavelengths, and to selectively route subsets of the wavelengths to the second output port, as discussed above. The second three-by-one switch is configured to receive the second express wavelengths, other copy of the third plurality of optical wavelengths, and the fifth plurality of optical wavelengths, and to selectively route subsets of the wavelengths to the third output port, as discussed above. First and second three-by-one switches 780 and 785 have the same configuration as three-by-one switches 380 and 385 described above in detail.

Figure 7D:
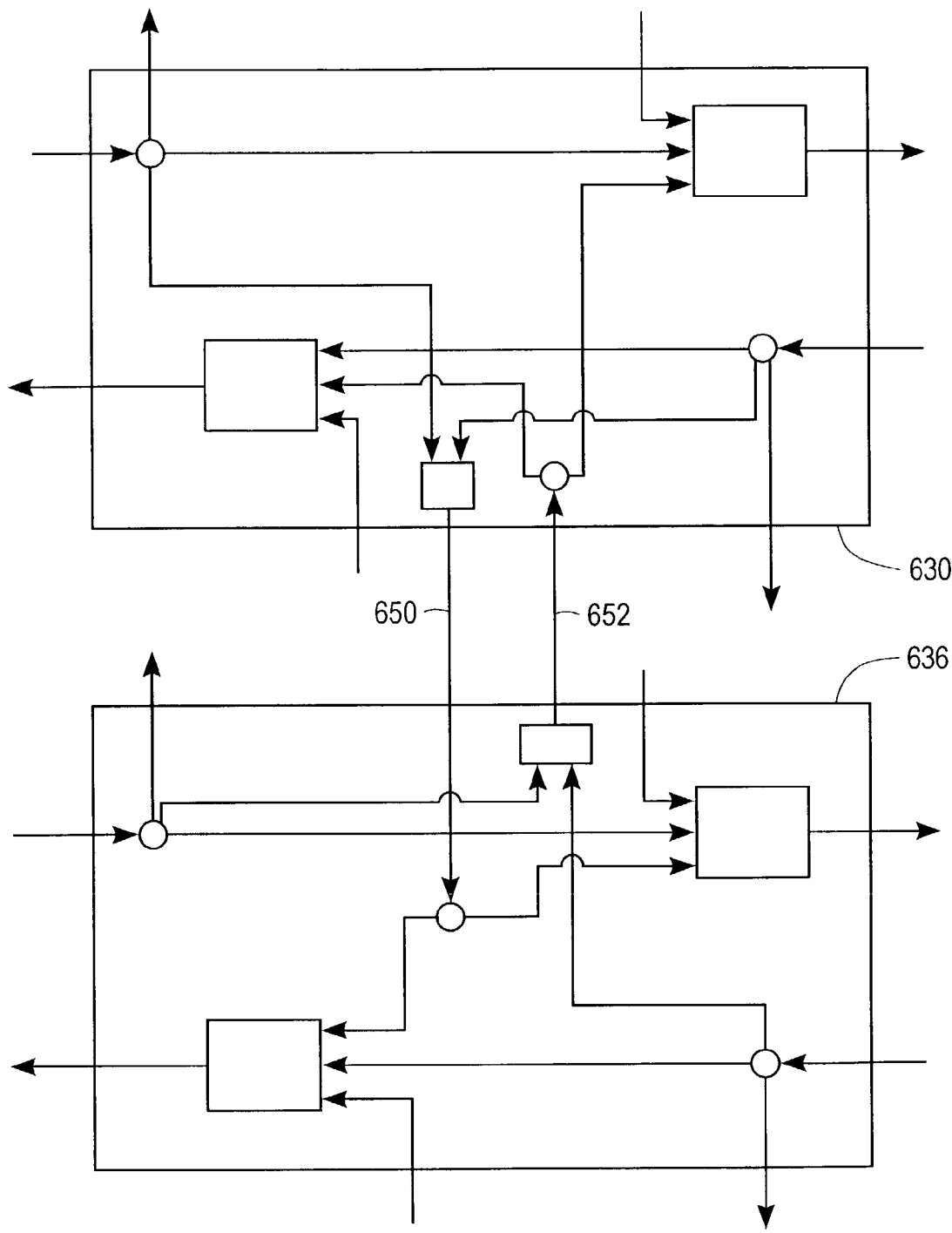
FIG. 7D is a schematic of a pair of OADMs coupled by optical fibers.

FIG. 7D is a schematic of first and second OADMs 630 and 636 coupled by optical fibers 650 and 652. FIG. 7D shows OADMs 630 and 636 as they are oriented in optical network 600 shown in FIGS. 6A-6D. Third and fourth OADMs 656 and 658 are similarly oriented in optical network 600.

Figure 8:
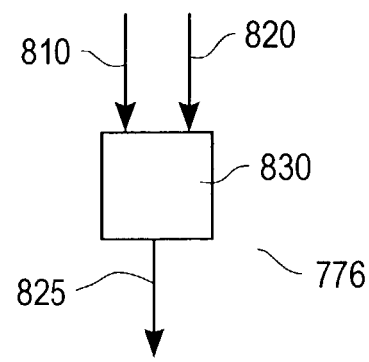
FIG. 8 is a schematic of two-by-one switch according to an embodiment of the present invention.

FIG. 8 is a schematic of two-by-one switch 776 according to an embodiment of the present invention. Two-by-one switch 776 includes first and second input ports 810 and 820, an output port 825, and a WRE 830. WRE 830 comprises a plurality of two-by-one switches dynamically configurable to selectively terminate or transmit one of a given pair of optical wavelengths having the same frequency. According to one embodiment of the present invention, WRE 830 comprises 80 two-by-one switches. WRE 830 is similarly configured to the WREs 450 and 425 shown in FIGS. 4 and 5 and described in detail above.

Optical Network Providing Multiplexed Subnetwork Protection

Figure 9A:
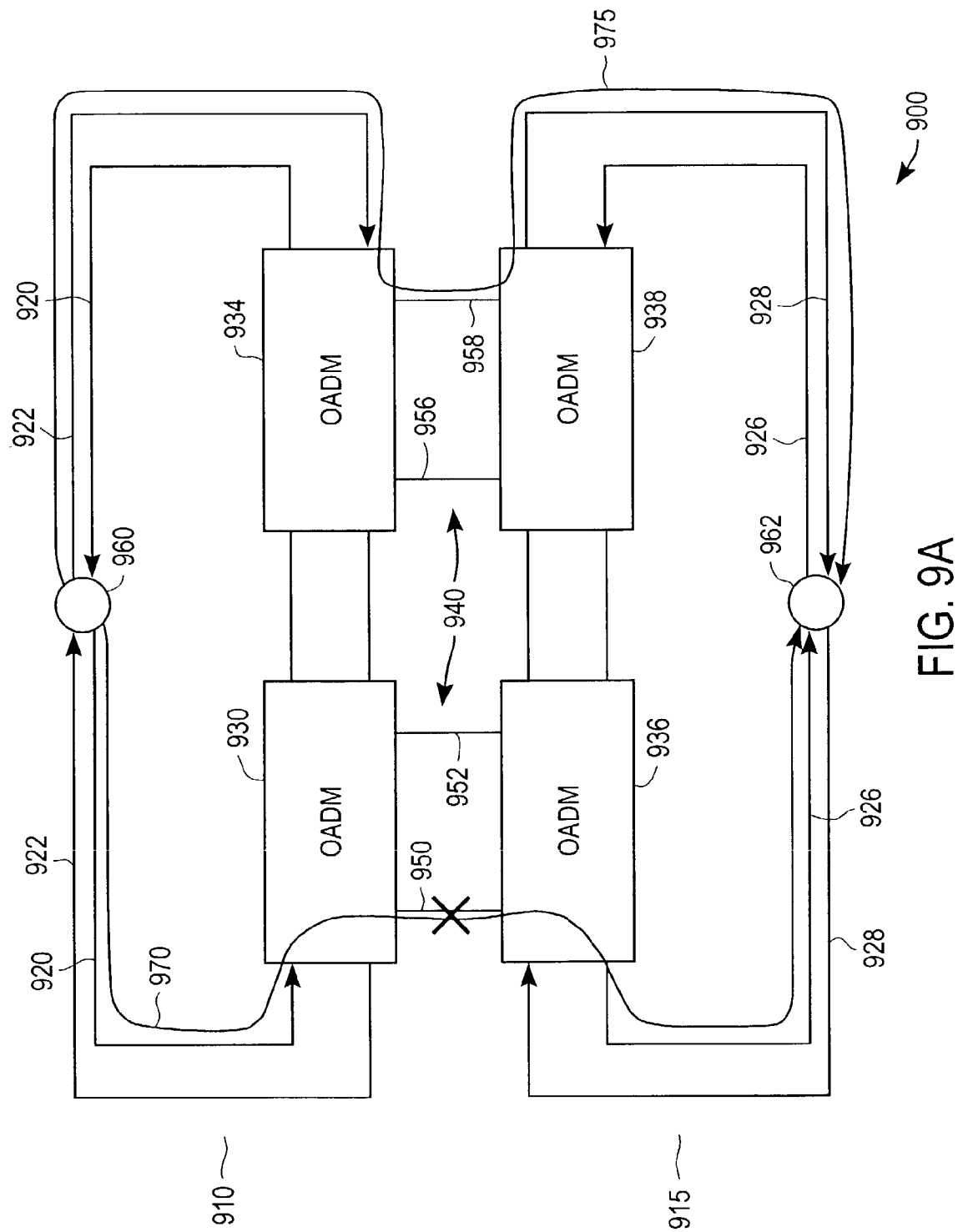
FIGS. 9A-9B are schematics of an optical network providing subnetwork protection according to another embodiment of the present invention.

FIG. 9A is a schematic of an optical network 900 providing subnetwork protection according to another embodiment of the present invention. This embodiment differs from the embodiments of FIGS. 6A-6D in that point-to-point subnetwork 640 includes first, second, third, and fourth OADMs 930, 934, 936, and 938 providing alternate subnetwork protection.

Optical network 900 includes first and second DWDM rings 910 and 915, respectively, which further include optical fibers 920 and 922, and optical fibers 926 and 928, respectively. DWDM rings 610 and 615 may be path switched rings, such as O-UPSRs, or other standards. Optical network 900, similar to optical network 600, includes first and second DWDM rings 910 and 915 that include optical fibers 920 and 922, and optical fibers 926 and 928, respectively. The first and second OADMs 930 and 934 are coupled to DWDM ring 910 and the third and fourth OADMs 936 and 938 coupled to DWDM ring 915. Point-to-point subnetwork 940 (e.g., ULH subnetwork) provides for optical communications between the DWDM rings and includes first, second, third, and fourth optical fibers 950, 952, 956, and 958, respectively. OADMs 960 and 962 optically coupled to DWDM rings 910 and 915, respectively, provide for adding and dropping optical wavelengths to and from the DWDM rings, as is well known in the art. It should be understood that while DWDM rings 910 and 915 are each shown as having one OADM optically coupled to each ring, several OADMs may be optically coupled to each of the rings. Further, OADMs coupled to the DWDM rings may be, for example, OADMs.

Optical network 900 provides multiple paths for transmitting optical wavelengths between the DWDM rings. Optical network 900 provides a path 970 (similar to path 670 shown in FIGS. 6A-6D) for routing optical wavelengths between OADMs 960 and 962. The optical network also provides a protection path 975 (similar to path 675 shown in FIGS. 6B-6C) for routing optical wavelengths between OADMs 960 and 962 in the event of a failure along path 970, such as that indicated by the "X" overlying optical fiber 950.

Figure 9B:
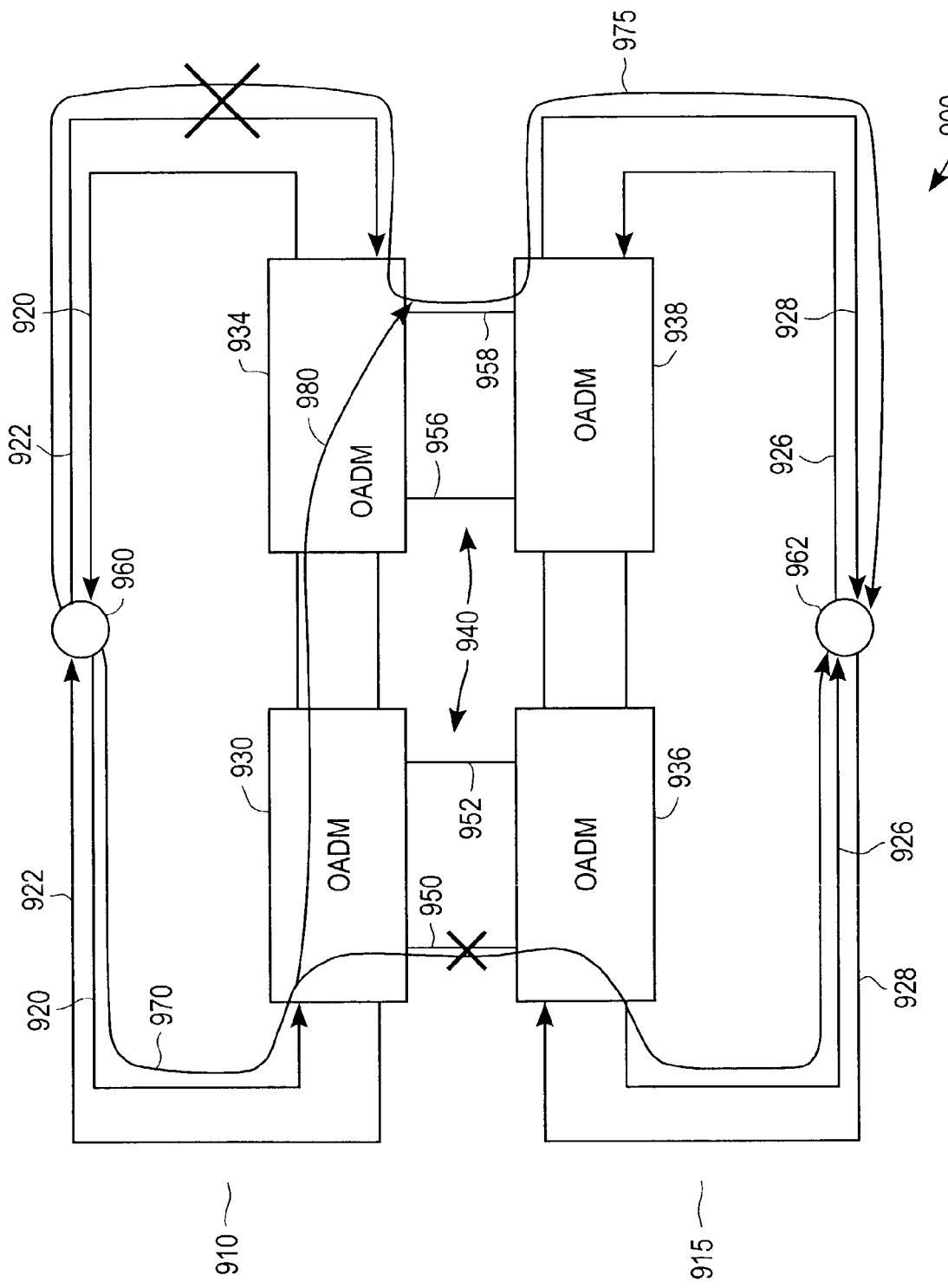

FIG. 9B is a schematic of optical network 900 showing another protection path 980 for protecting communications between the DWDM rings according to an embodiment of the present invention. Protection path 980 may be selected for a variety of failure configurations. For example, should optical fiber 950 fail (designated by an "X") cutting off portions of path 970, and optical fiber 922 fail (designated by an "X") cutting off portions of protection path 975, protection path 980 may be selected to route optical wavelengths from the portions of paths 970 to the portions of path 975 not effected by the failures, thus restoring communications across the subnetwork, (i.e., providing protection for the subnetwork). For each of the paths previously described, each OADM, 930, 934, 936, and 938 may route to successive optical devices (e.g., other OADMs) fewer optical wavelengths than the number received by the OADM. This selective transmission function is similar to that described above for OADMs 630, 634, 636, and 638.

Figure 10A:
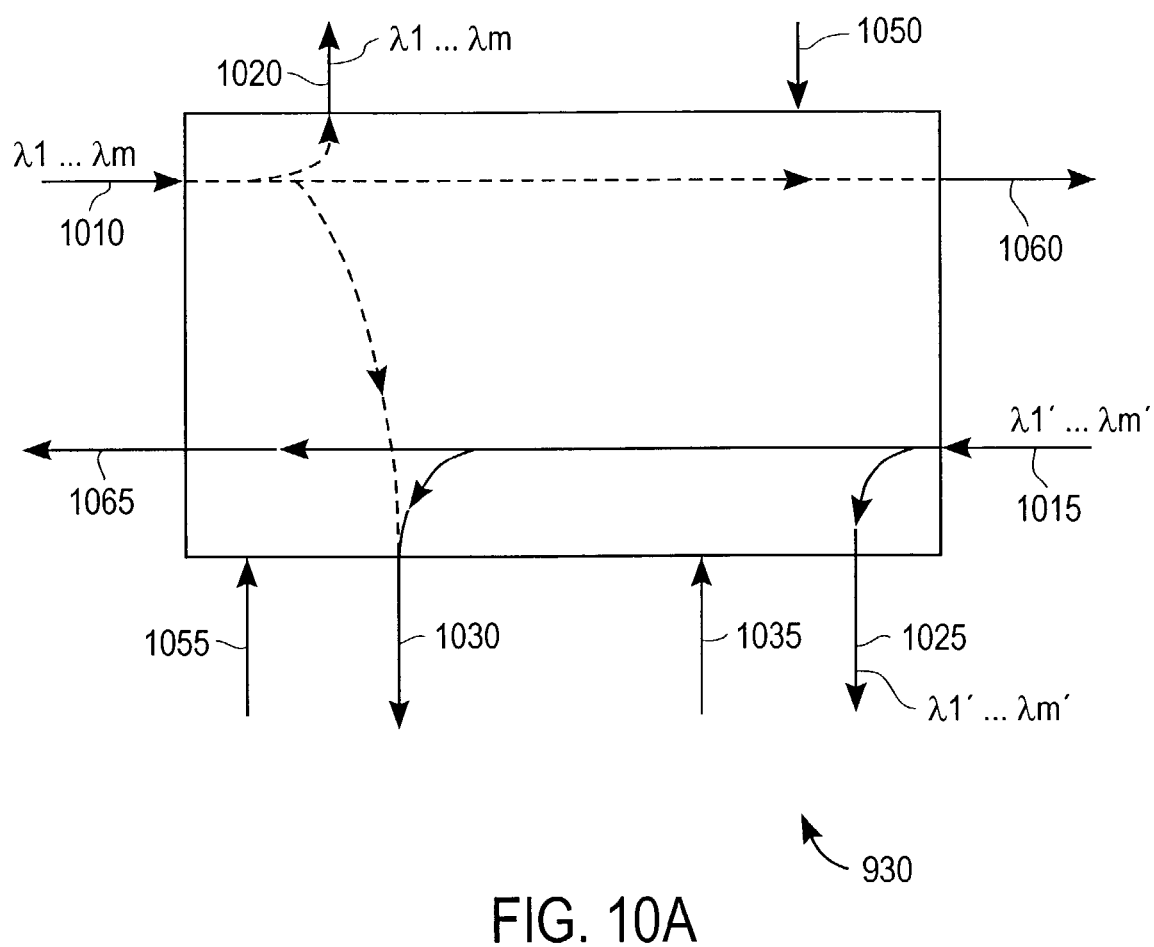
FIGS. 10A-10C are schematics of an OADM according to another embodiment of the present invention.
Figure 10B:
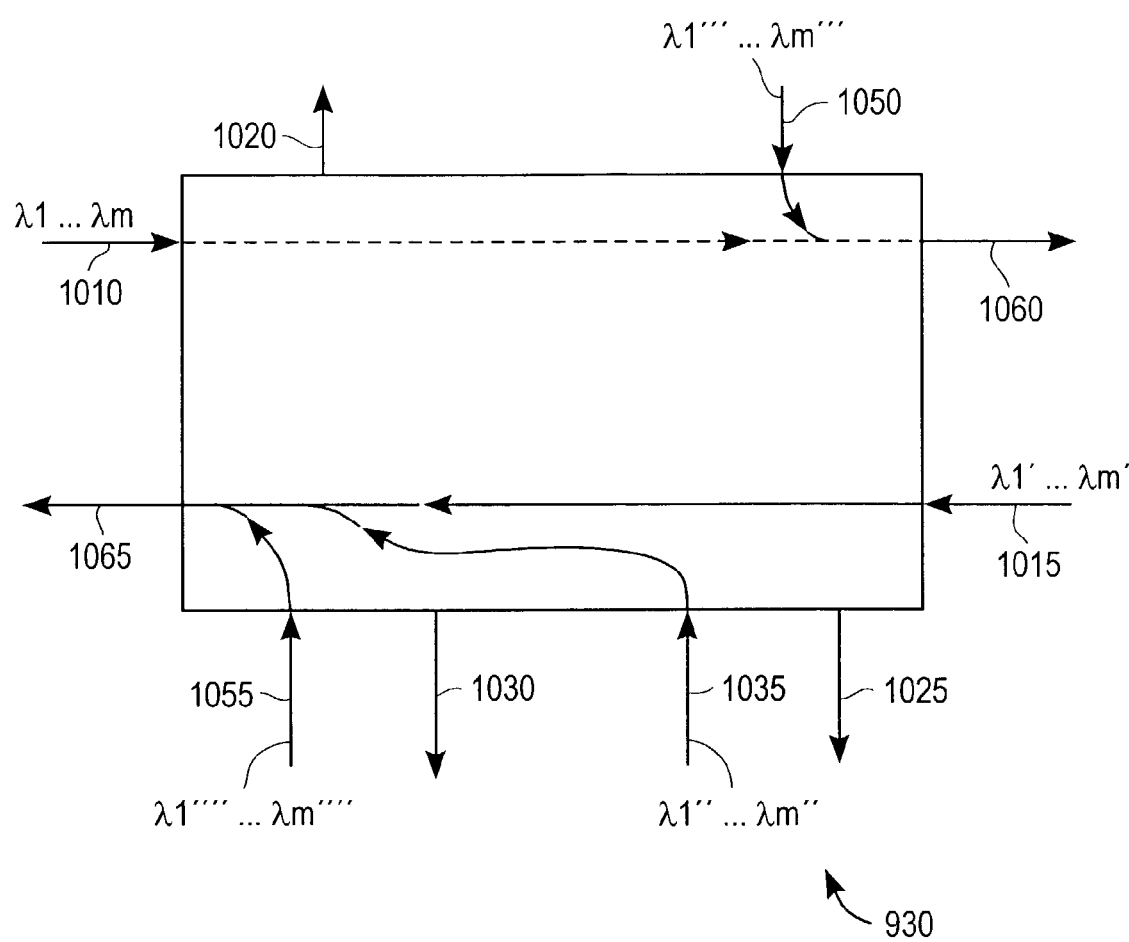

FIGS. 10A and 10B are schematics showing the optical routing states of OADM 930 (or, alternatively, OADM 934, 936, or 938) according to an embodiment of the present invention. Elements comprising OADM 930 and providing the routing shown in FIGS. 10A-10B will be discussed in detail subsequent to the following discussion of the optical routing states.

As shown in FIG. 10A, OADM 930 has first and second input ports 1010 and 1015 for accepting light having first and second pluralities of optical wavelengths, respectively, say λ1 . . . λm and λ1' . . . λm'. The OADM splits each of the first and second pluralities of optical wavelengths into three copies. The three copies of the first plurality of optical wavelengths are referred to as the first drop wavelengths, the first dual-feed wavelengths, and the first express wavelengths. The three copies of the second plurality of optical wavelengths are referred to as the second drop wavelengths, the second dual-feed wavelengths, and the second express wavelengths.

The first and second drop wavelengths are routed to first and second drop ports 1020 and 1025, respectively. Selective subsets of the first and second dual-feed wavelengths are routed to the first output port 1030. More specifically, OADM 930 is dynamically configurable to transmit one of a given pair of optical wavelengths having the same frequency to output port 1030, and to terminate the other optical wavelength. Each given pair of optical wavelengths includes one wavelength from the first dual-feed wavelengths and another wavelength from the second dual-feed wavelengths. For example, for a given pair of optical wavelengths having the same frequency, say λ1 and λ1', one of λ1 or λ1 ' is routed to first output port 1030 and the other optical wavelength is terminated.

FIG. 10B shows a third input port 1035 configured to receive light having a third plurality of optical wavelengths, say λ1" . . . λm". First and second add ports 1050 and 1055 are configured to receive light having fourth and fifth pluralities of optical wavelengths, respectively, say λ1'" . . . λm'" and λ1"" . . . λm"".

Select subsets of the first express wavelengths and fourth plurality of optical wavelengths are routed to a second output port 1060. More specifically, OADM 930 is dynamically configurable to transmit one of a given pair of optical wavelengths to the second output port and to terminate the other wavelengths. The optical wavelengths of each given pair of optical wavelengths have the same frequency and include one wavelength from the first express wavelengths and one wavelength from the fourth plurality of optical wavelengths. For example, for a given pair of optical wavelengths, say λ1 and λ1'", having the same frequency, either λ1 or λ1'" is routed to the second output port, while the other wavelength is terminated.

OADM 930 is further dynamically configurable to route to a third output port 1065 select subsets of the second express wavelengths, the third plurality of optical wavelengths, and the fifth plurality of optical wavelengths. More specifically, OADM 930 is dynamically configurable to transmit one of a set of three given wavelengths to the third output port and to terminate the other two. The optical wavelengths of each set of three given optical wavelengths have the same frequency and include one wavelength from each of the second express wavelengths, the third plurality of optical wavelengths, and the fifth plurality of optical wavelengths. For example, for a set of three given wavelengths, say λ1', λ1", and λ1"", having the same frequency, either λ1', λ1", or λ1"" is routed to the third output port while the other two wavelengths are terminated.

Figure 10C:
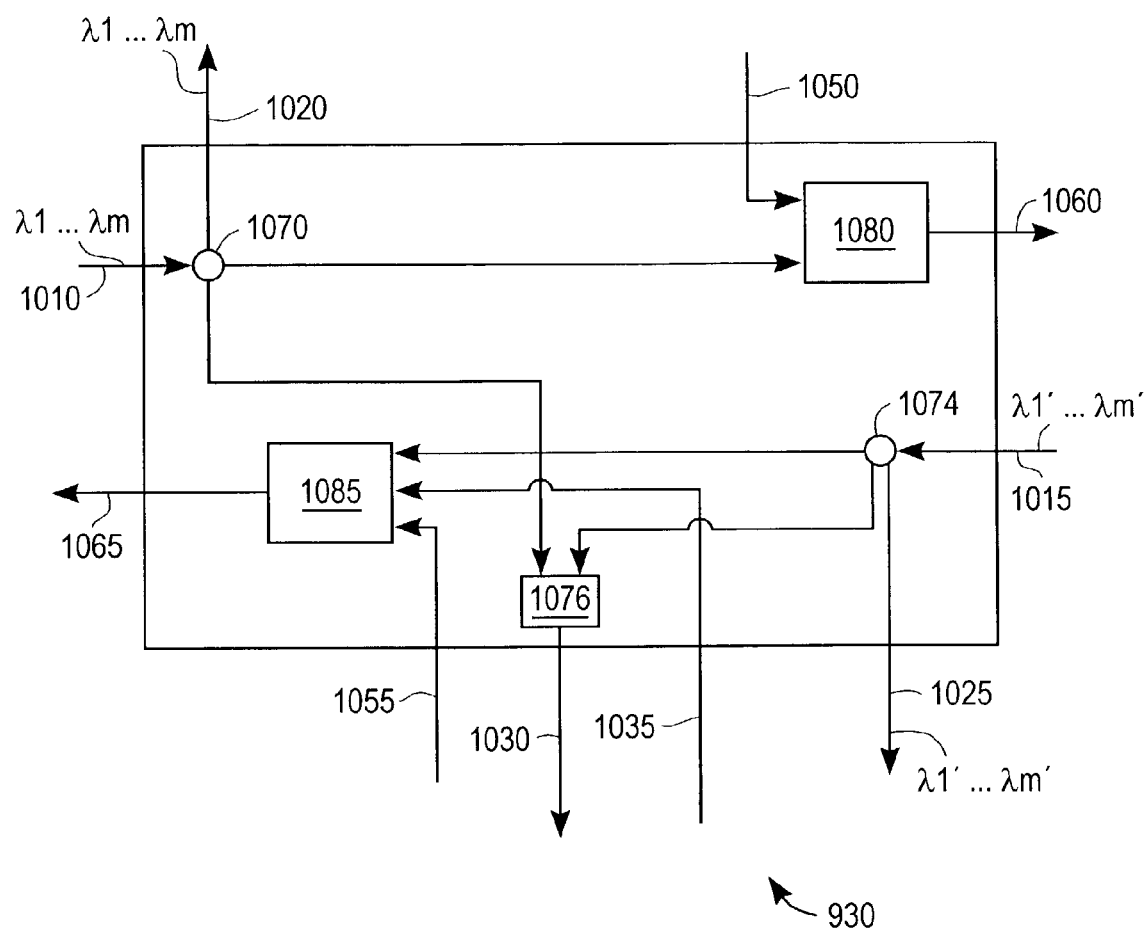

FIG. 10C is a schematic of OADM 930 (or alternatively OADM 934, 936, or 938) showing the optical routing elements comprising the OADM. OADM 930 includes first and second optical splitters 1070 and 1074 optically coupled to first and second input ports 1010 and 1015, respectively. First and second optical splitters 1070 and 1074 split the first and second pluralities of optical wavelengths, respectively, into three copies as discussed above. A first two-by-one switch 1076 optically coupled to the first output port 1030 and is configured to receive the first and second dual-feed wavelengths. The first two-by-one switch is dynamically configurable to selectively route subsets of the first and second dual-feed wavelengths to the first output port, as discussed above. A second two-by-one switch 1080 is optically coupled to the second output port 1060 and is configured to receive the first express wavelengths and the fourth plurality of optical wavelengths. The second two-by-one switch is dynamically configurable to selectively route subsets of the first express wavelengths and the fourth plurality of optical wavelengths to the second output port, as discussed above. First and second two-by-one switches 1076 and 1080 have the same configuration as two-by-one switch 776 shown in FIGS. 7C and 8 and described above in detail. Three-by-one switch 1085 is configured to receive the second express wavelengths, the third plurality of optical wavelengths, and the fifth plurality of optical wavelengths and to selectively route subsets of the wavelengths to the third output port as discussed above. Three-by-one switch 1085 has the same configurations as three-by-one switches 380 and 385 shown in FIGS. 3C and 5 and described above in detail.

Figure 10D:
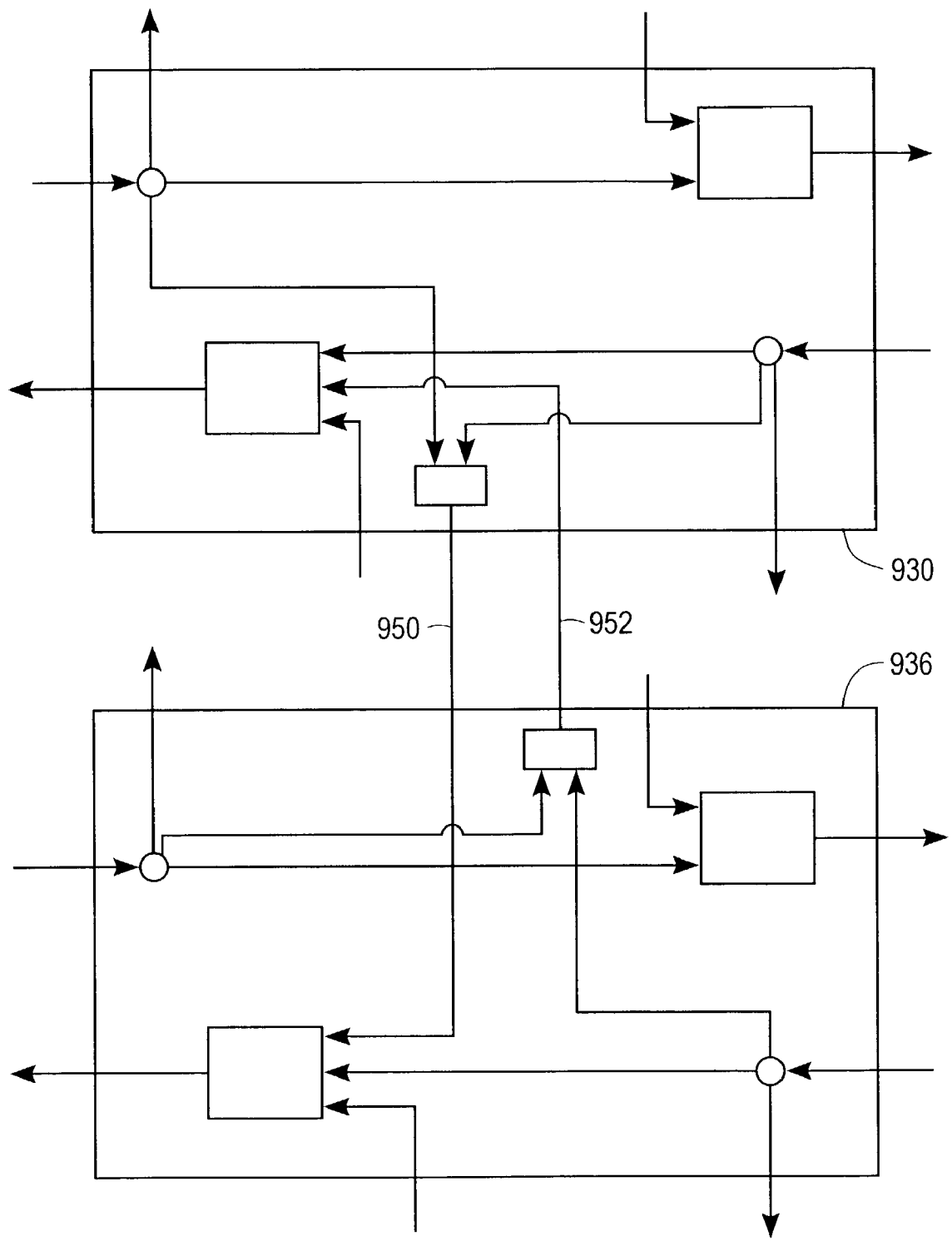
FIG. 10D is a schematic of a pair of OADMs coupled by optical fibers.

FIG. 10D is a schematic of first and second OADMs 930 and 936 coupled by optical fibers 950 and 952. FIG. 10D shows OADMs 930 and 936 as they are oriented in optical network 900 shown in FIGS. 9A-9B. Third and fourth OADMs 956 and 958 are similarly oriented in optical network 900.

Optical Network Providing Demultiplexed Subnetwork Protection

Figure 11:
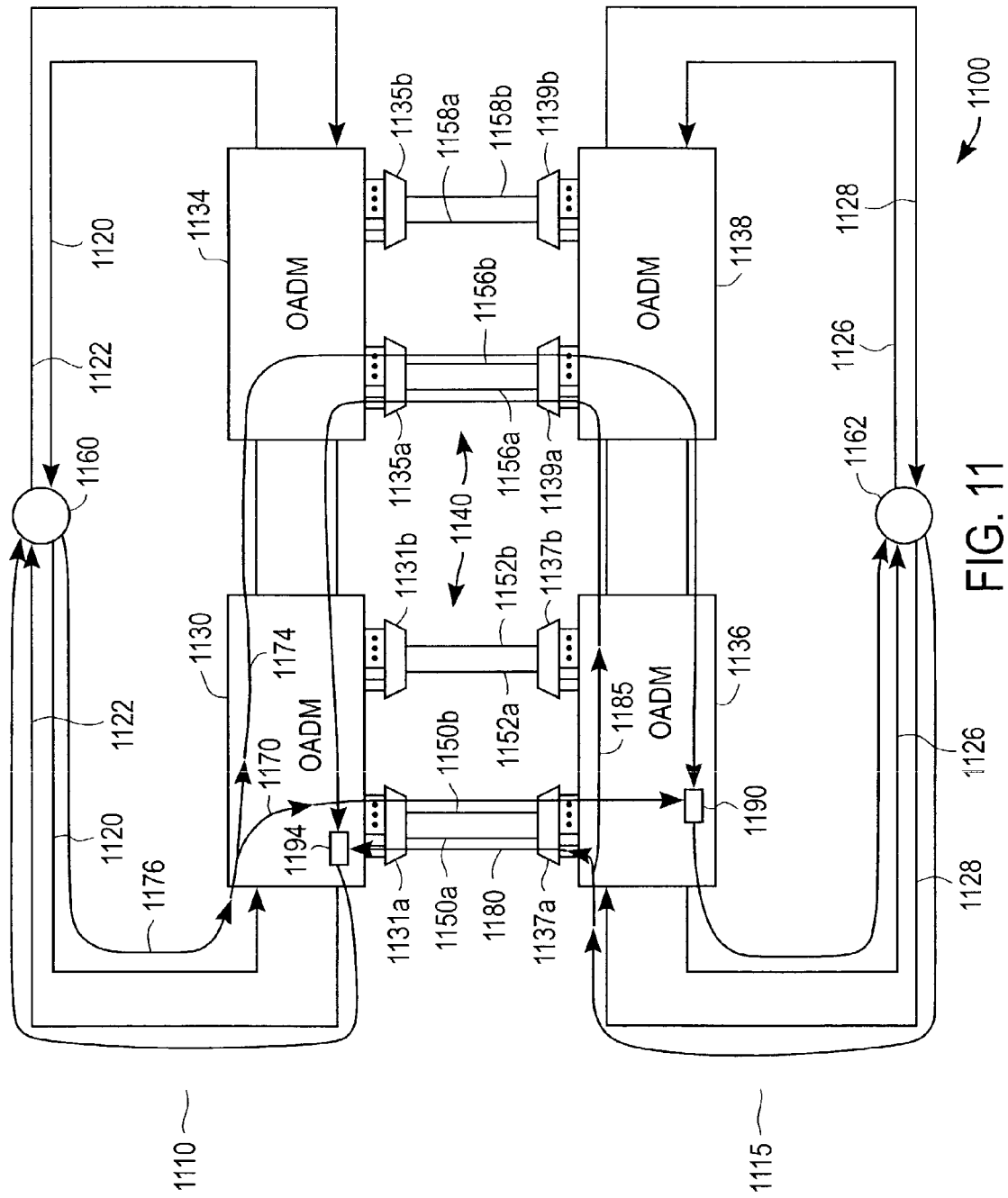
FIG. 11 is a schematic of an optical network providing subnetwork protection according to another embodiment of the present invention.

FIG. 11 is a schematic of an optical network 1100 providing subnetwork protection according to another embodiment of the present invention. This embodiment differs from the embodiments of FIGS. 2A-2D in that first, second, third, and fourth OADMs 1130, 1134, 1136, and 1138 are configured to transmit and receive demultiplexed optical wavelengths to and from transponder cards 131a and 1131b, 1135a and 1135b, 1137a and 1137b, and 1139a and 1139b, respectively.

Optical network 1100 includes first and second OMS-SPRINGs 1110 and 1115, which include optical fibers 1120 and 1122, and 1126 and 1128, respectively. Point-to-point subnetwork (e.g., ULH subnetwork) 1140 includes optical fibers 1150a, 1150b, 1152a, 1152b, 1156a, 1156b, 1158a, and 1158b that provide optical pathways between the OMS-SPRINGs. OADMs 1160 and 1162 provide for adding and dropping of optical wavelengths to and from their associated OMS-SPRINGs.

As discussed above, each optical fiber of an OMS-SPRING typically has half its channels allocated to working traffic and the other half allocated to protection traffic. Typical protection switching of an OMS-SPRING includes routing working traffic carried on one optical fiber onto channels allocated for protection traffic on another optical fiber. However, such switching does not provide protection for failures in a point-to-point subnetwork linking OMS-SPRINGs. FIG. 11 shows a subnetwork protection scheme for optical network 1100 implemented by OADMs 1130, 1134, 1136, and 1138. The protection scheme includes one of the OADM splitting into two copies optical wavelengths received from a DWDM ring's optical fiber and diversely routing the optical wavelengths across the point-to-point subnetwork. Diverse routing provides that in the event that one of the sub-network's optical fibers fails, communications across the sub-network will be uninterrupted.

More specifically, FIG. 11 shows two paths, 1170 and 1174 (e.g., working traffic paths), along which optical wavelengths may be diversely routed across the subnetwork. Along a first overlapping portion 1176 of paths 1170 and 1174, a plurality of optical wavelengths, say $\lambda 1 \ldots \lambda m$, are routed from OADM 1160 onto optical fiber 1120. Optical fiber 1120 routes the optical wavelengths to the first OADM 1130 which splits the wavelengths into two copies. One copy is routed across optical fiber 1150b to third OADM 1136 (path 1170). The other copy is routed from the first OADM 1130 to the second OADM 1134 and is further routed onto optical fiber 1156b. The optical fiber routes the other copy to the fourth OADM 1138, which, in turn, routes the other copy to the third OADM 1136 (path 1174). The third OADM receiving both copies of the optical wavelengths proceeds to select, via wavelength-selective two-by-one switch 1190, one of the copies for further transmission onto optical fiber 1126. Typically the wavelength-selective two-by-one switch selects the optical wavelengths traversing path 1170 for transmission onto optical fiber 1126 because this copy is subject to less attenuation and other signal degradations since it is routed through fewer optical devices. If optical fiber 1150b should fail, however, disrupting optical communication across the point-to-point subnetwork, the wavelength-selective two-by-one switch selects for transmission onto optical fiber 1126 the copy of the optical wavelengths traversing path 1175; thus restoring communication across the subnetwork.

Optical wavelengths routed from OADM 1162 to OADM 1160 are similarly protected. Paths 1180 and 1185 show the diverse routing of optical wavelengths across the point-to-point subnetwork. Similar to wavelength-selective two-by-one switch 1190, wavelength-selective two-by-one switch 1194 typically selects the copy of optical wavelengths traversing the shortest path (path 1180) for routing onto optical fiber 1122. Should portions of path 1180 (e.g., optical fiber 1150a) fail, however, wavelength-selective two-by-one switch 1194 will select the copy of optical wavelengths traversing path 1185. The OMS-SPRING protection traffic is similarly protected by diverse routing across the point-to-point network.

Figure 12A:
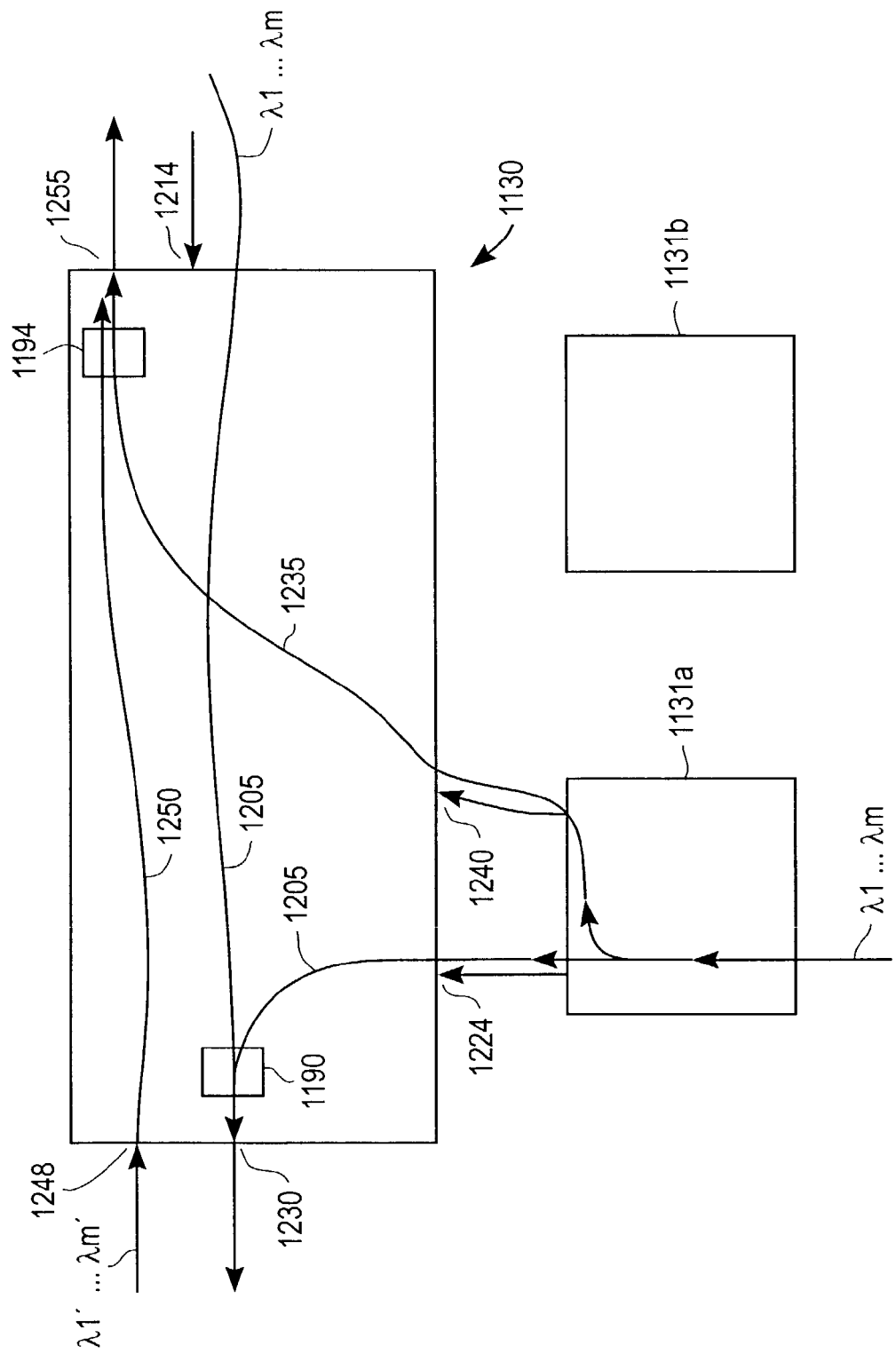
FIGS. 12A and 12B are schematics of an OADM according to another embodiment of the present invention.
Figure 12B:
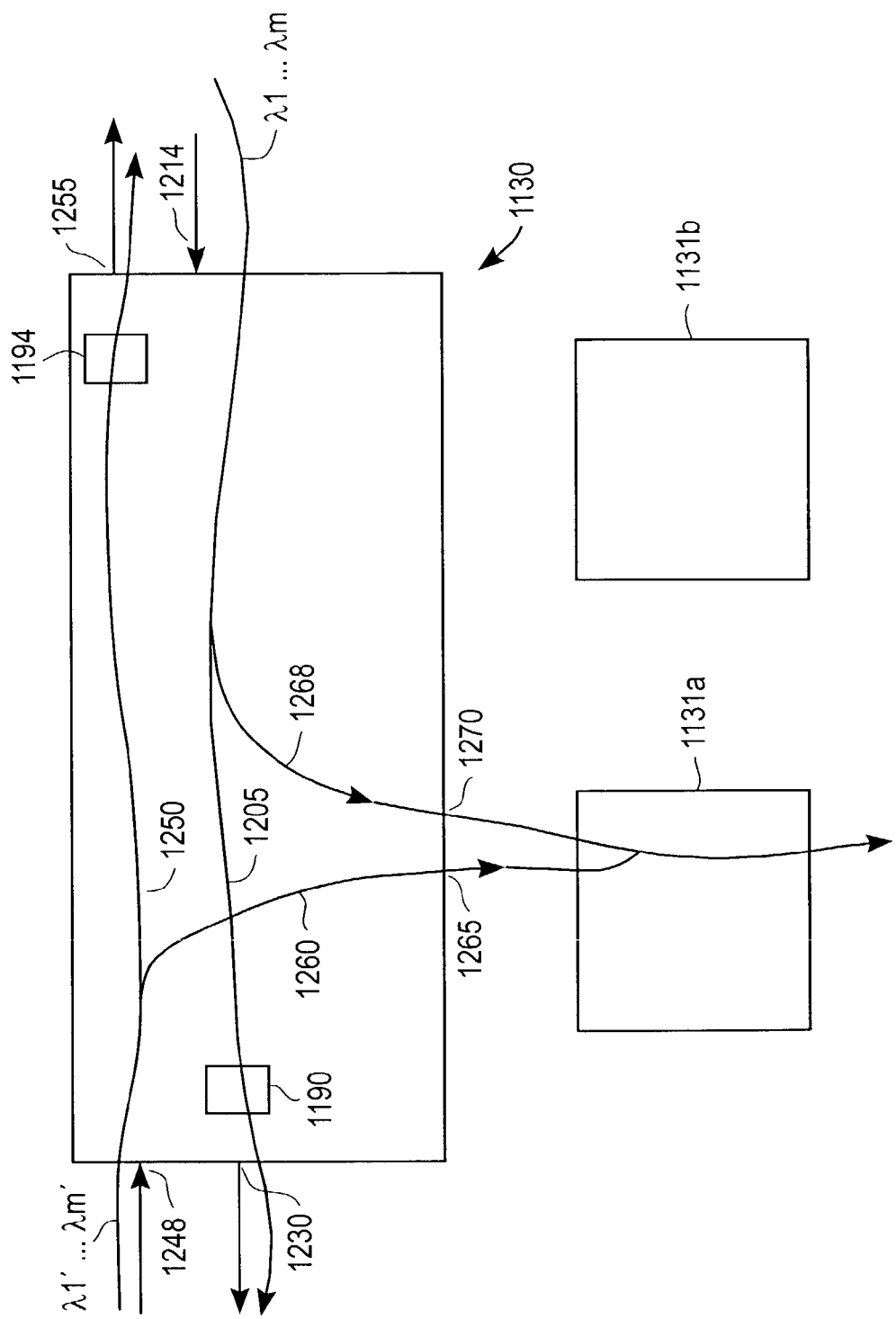

FIGS. 12A and 12B are schematics of first OADM 1130 (or, alternatively, OADM 1134, 1136, or 1138) showing various routing states of the OADM according to an embodiment of the present invention. Elements comprising OADM 1130 and providing the routing shown in FIGS. 11, 12A, and 12B will be discussed in detail subsequent to the following discussion of optical routing states.

The various routing states of first OADM 1130 include paths 1205 and 1210. Along path 1205, optical wavelengths $\lambda 1 \ldots \lambda m$ are received by first input port 1214 and are directed to wavelength-selective two-by-one switch 1190. Along path 1210, a copy of the optical wavelengths $\lambda 1 \ldots \lambda m$ is also directed to wavelength-selective two-by-one switch 1190. More specifically, the copy of optical wavelengths routed along path 1210 is routed from transponder card 1131a to a west demultiplexed input 1224. The west demultiplexed input includes a plurality of input ports corresponding to optical wavelengths $\lambda 1 \ldots \lambda m$. According to one embodiment of the present invention, the west demultiplexed input includes 80 input ports. The copy of optical wavelengths received by the west demultiplexed input is directed toward wavelength-selective two-by-one switch 1190. As described above, the wavelength-selective two-by-one switch may select the optical wavelengths traversing path 1205 or path 1210 and direct the selected optical wavelengths to output port 1230. Alternatively, the wavelength-selective two-by-one switch may select subsets of either or both copies of optical wavelengths $\lambda 1 \ldots \lambda m$ for routing to output port 1230.

Transponder card 1131a may alternatively direct optical wavelengths $\lambda 1 \ldots \lambda m$ onto protection path 1235 instead of onto path 1210. The switching of optical wavelengths onto the protection path is an example of OMS-SPRING protection switching. Such switching may be selected if, for example, portions of optical network 1100 (e.g., optical fiber 1122) coupled to output port 1230 fail.

As shown in FIG. 12A, optical wavelengths directed along protection path 1235 are received by OADM 1130 via east demultiplexed input 1240, which includes a plurality of input ports. According to one embodiment of the present invention, the east demultiplexed input includes 80 input ports. The optical wavelengths are directed from the east demultiplexed input to a second wavelength-selective two-by-one switch 1194. Optical wavelengths directed along the express path 1250 are also directed to wavelength-selective two-by-one switch 1194. Along express path 1250, optical wavelengths, say $\lambda 1' \ldots \lambda m'$, are routed from input port 1248 to the wavelength-selective two-by-one switch 1194. The wavelength-selective two-by-one switch is dynamically configurable to select either the optical wavelengths traversing protection path 1235 or express path 1250 for routing to output port 1255. Alternatively, the wavelength-selective two-by-one switch may select subsets of either or both sets of optical wavelengths, $\lambda 1 \ldots \lambda m$ and $\lambda 1' \ldots \lambda m'$, for routing to output port 1255.

In FIG. 12B, a copy of optical wavelengths $\lambda 1' \ldots \lambda m'$ received at input port 1248 is routed along path 1260 to west demultiplexed output 1265, which includes a plurality of output ports. According to one embodiment of the present invention, the west demultiplexed output includes 80 output ports. Transponder card 1131a is configured to receive optical wavelengths traversing both paths 1260 and 1268 and to further route the optical wavelengths from one of the paths. Optical wavelengths traversing path 1268 are the protection traffic for optical wavelengths traversing path 1260. For example, should optical fiber 1120 fail, the optical wavelengths traversing the fiber are switched onto optical fiber 1122 and further routed onto path 1268. Such protection switching (i.e., OMS-SPRING protection switching) is well known to those of skill in the art. The optical wavelengths traversing optical path 1268 are routed from OADM 1130 via east demultiplexed output 1270, which includes a plurality of output ports. According to one embodiment of the present invention, the east demultiplexed output includes 80 output ports. As discussed above, the optical wavelengths are further routed to transponder card 1131a for possible additional routing. Transponder card 1131a is dynamically configurable to transmit the optical wavelengths routed either along path 1260 or along path 1268, but not both.

Figure 13:
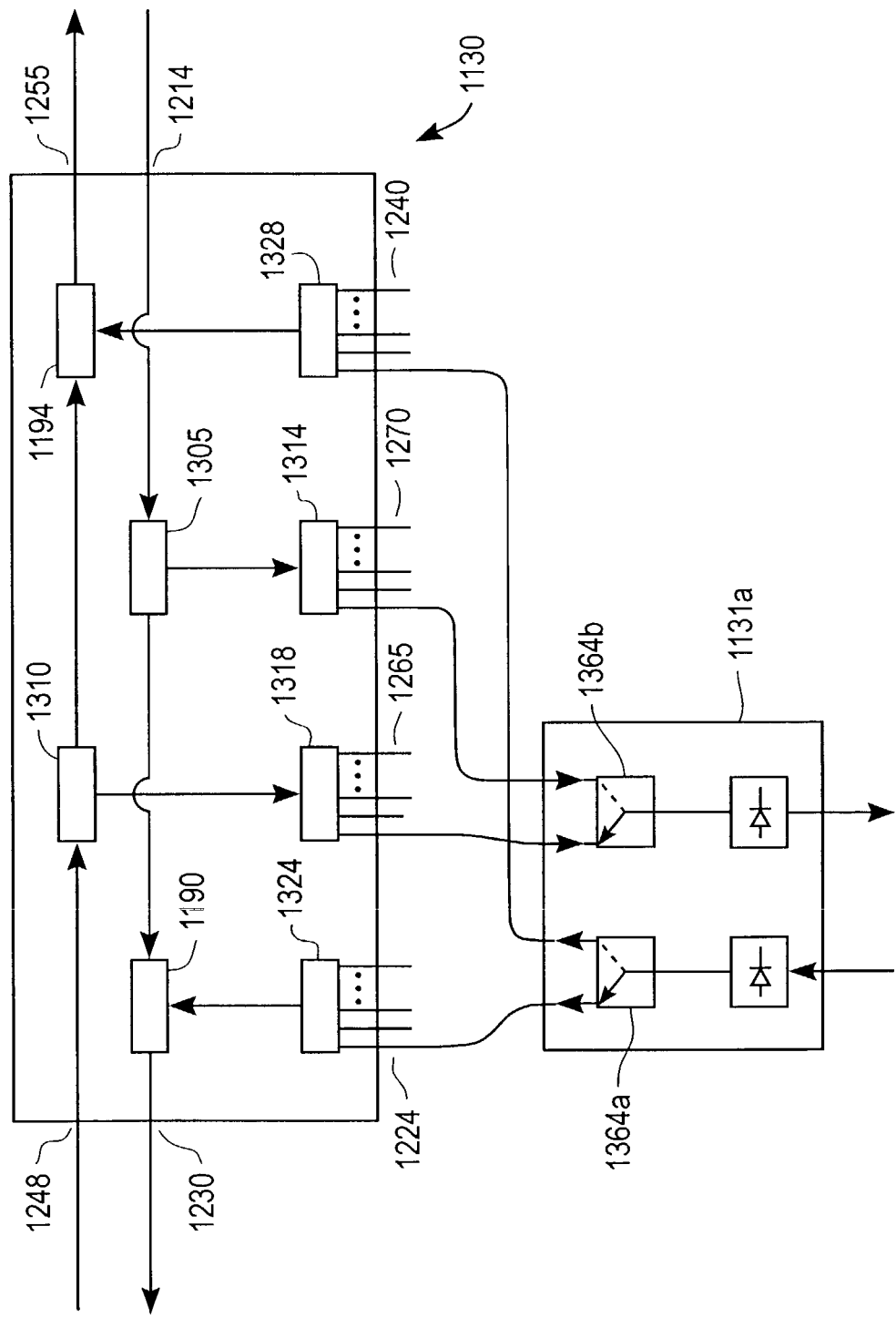
FIG. 13 is a schematic of an OADM according to another embodiment of the present invention.

FIG. 13 is a schematic of OADM 1130 (or alternatively OADM 1134, 1136, or 1138) showing the elements comprising the OADM. OADM 1130 includes east and west splitters 1305 and 1310 configured to receive optical wavelengths from input ports 1214 and 1248, respectively. Each splitter splits received optical wavelengths into first and second copies. The east splitter directs a copy of its received optical wavelengths $\lambda 1, \ldots \lambda m$ to wavelength-selective two-by-one switch 1190 and another copy to east demultiplexer 1314. The east demultiplexer routes the optical wavelengths to east demultiplexed output 1270 that further routes the wavelengths to either or both transponder card 1131a or 1131b. The transponder cards route optical wavelengths between the OADM and the optical fibers of the point-to-point subnetwork. West splitter 1310 directs a copy of its received optical wavelengths λ1' . . . λm' to wavelength-selective two-by-one switch 1194 and another copy to west demultiplexer 1318. The west demultiplexer routes the optical wavelengths to west demultiplexed output 1265, which further routes the wavelengths to either transponder card 1131a or 1131b, or to both.

Both transponder cards 1131a and 1131b include switches for selectively transmitting optical wavelengths received from either the west or east demultiplexed output. The switches included in transponder card 1131a are designated 1364a and 1364b and the switches included in transponder card 1131b are designated 1368a and 1368b.

West and east couplers (i.e., multiplexers) 1324 and 1328 are optically coupled to the west and east demultiplexed inputs, respectively. The optical wavelengths received by the west coupler from the west demultiplexed input are routed (via path 1210, FIGS. 12A-12B) by the coupler to wavelength-selective two-by-one switch 1190. The optical wavelengths received by the east coupler from the east demultiplexed input are routed (via path 1235, FIGS. 12A-12B) by the coupler to wavelength-selective two-by-one switch 1194. Both wavelength-selective two-by-one switches 1190 and 1194 include a WRE. Each WRE is similar to and provides the same wavelength selective termination and transmission functions as WRE 830 described above and shown in FIG. 8. As described above, wavelength-selective two-by-one switch 1190 selectively routes to output port 1230 the optical wavelengths traversing path 1205, see FIGS. 12A-12B, (wavelengths received from the east splitter) and the optical wavelengths traversing path 1210, see FIGS. 12A-12B, (wavelengths received from the first demultiplexed input). Moreover, as described above, wavelength-selective two-by-one switch 1194 selectively routes to output 1255 the optical wavelengths traversing path 1250, see FIGS. 12A-12B, (wavelengths received from the west splitter) and the optical wavelengths traversing path 1235, see FIGS. 12A-12B, (wavelengths received from the east coupler).

According to an alternate embodiment, optical network 1100 includes two transponder cards (e.g., 1131a and 1137a) optically coupled between OADMs 1130 and 1136 and two transponder cards (e.g., 1135a and 1139a) optically coupled between OADMS 1134 and 1138. According to a further embodiment, OADMs 1130, 1134, 1136, and 1138 include one transponder card, for example, 1131a, 1135a, 1137a, and 1139a, respectively.

Optical Network Providing Demultiplexed Subnetwork Protection

Figure 14:
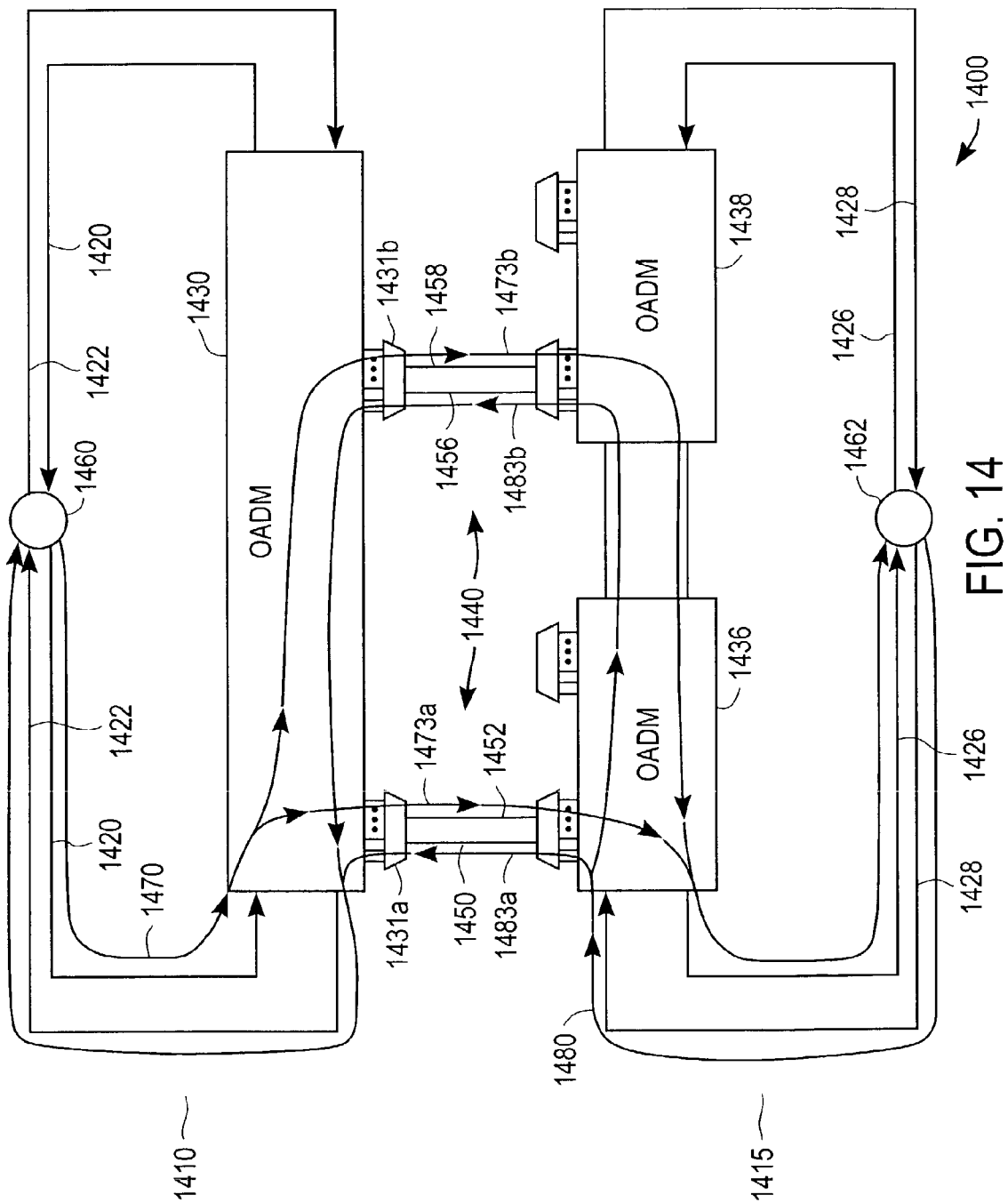
FIG. 14 is a schematic of an optical network providing subnetwork protection according to another embodiment of the present invention.

FIG. 14 is a schematic of an optical network 1400 providing subnetwork protection according to another embodiment of the present invention. The embodiment shown in FIG. 14 differs from the embodiments of FIG. 11 in that a single OADM 1430 coupled to DWDM ring 1410 provides an optical pathway from the DWDM ring to transponder cards 1431a and 1431b and further to point-to-point subnetwork 1440 (e.g., UHL subnetwork).

Optical network 1400 includes first and second DWDM rings 1410 and 1415, which include optical fibers 1420 and 1422, and 1426 and 1148, respectively. DWDM ring 1410 may include, for example, a ring not having protection switching. That is, optical wavelengths traversing optical fiber 1420, for example, will not be switched to optical fiber 1422 should optical fiber 1420 fail. Similarly, optical wavelengths traversing optical fiber 1422 will not be switched to optical fiber 1420 should optical fiber 1422 fail. Although traffic traversing DWDM ring 1410 is not protected, the present embodiment of the invention provides protection for subnetwork 1440. DWDM ring 1415 may be, for example, an OMS-SPRING, O-UPSR, or the like, or may also be a ring not having protection switching.

Protection for subnetwork 1440 is implemented, in part by diversely routing copies of optical wavelengths across the subnetwork. More specifically, FIG. 14 shows optical wavelengths routed along path 1470 are split into two copies by OADM 1430 and further routed along paths 1473a and 1473b. The copy of optical wavelengths traversing path 1473a is routed from OADM 1430 across optical fiber 1452 to OADM 1436. The copy of optical wavelengths traversing path 1473b is routed from OADM 1430 across optical fiber 1458 to OADM 1438 and is further routed to OADM 1436. OADM 1436 selects one of the two copies of optical wavelengths to route onto optical fiber 1426. OADMs 1436 and 1438 may be similarly configured to OADM 1130 shown in FIGS. 12a-12b and 13 or may be otherwise configured.

FIG. 14 also shows copies of optical wavelengths are diversely routed from OADMs 1436 and 1438 across the subnetwork to OADM 1430. More specifically, optical wavelengths routed along path 1480 are received by OADM 1436, which splits the optical wavelengths into two copies. One copy of the optical wavelengths is routed along path 1483a and the other copy is routed along path 1483b. Transponder card 1431a receives the optical wavelengths routed across optical fiber 1450 (path 1483a) and transponder card 1431b receives the copy of optical wavelengths routed across optical fiber 1456 (path 1483b). Transponder cards 1431a and 1431b select only one copy of the optical wavelengths for routing to OADM 1430. Typically each transponder card selects the better of the two copies for further routing. If one of the optical fibers fails, however, the transponder card coupled to the functioning optical fiber selects its associated copy of optical wavelengths for transmission. Such diverse routing and selective transmission by the transponder cards provides protection switching for the subnetwork.

Figure 15A:
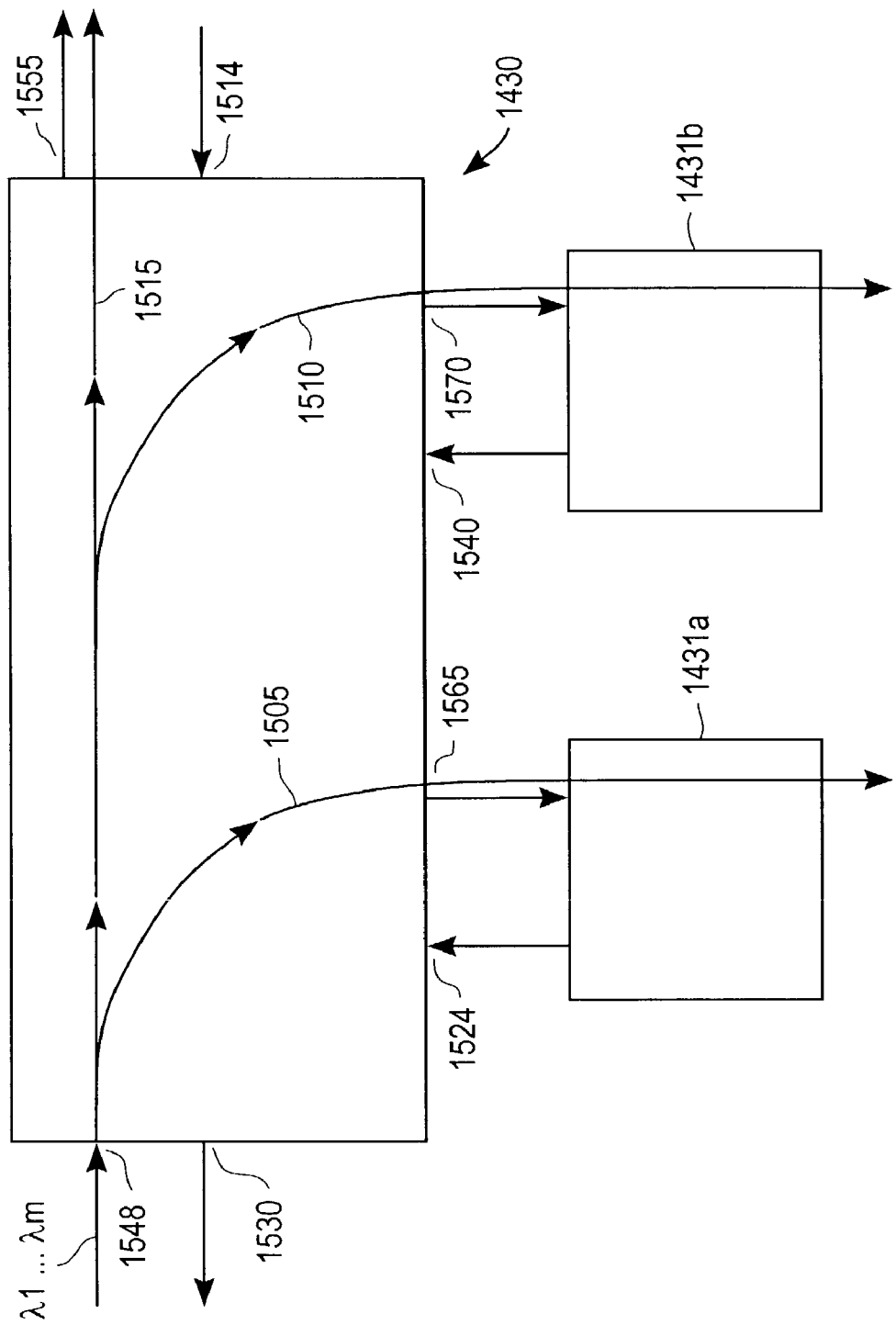
FIGS. 15A and 15B are schematics of an OADM according to another embodiment of the present invention.
Figure 15B:
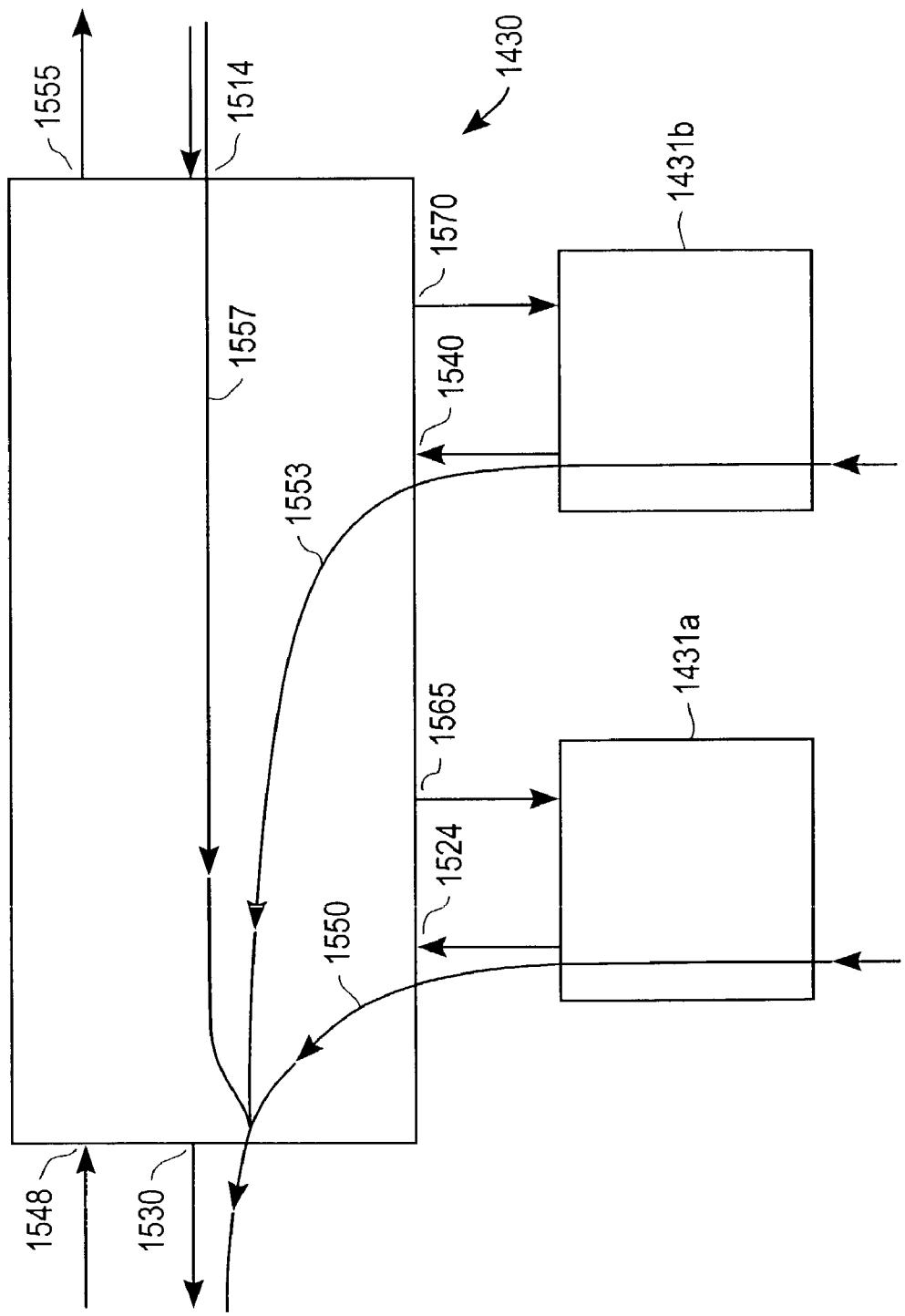

FIGS. 15A and 15B are schematics of OADM 1430 and its associated transponder cards 1431a and 1431b showing various routing states according to an embodiment of the present invention. As shown in FIG. 15A, the various routing states of OADM 1430 and transponder cards 1431a and 1431b include paths 1505 and 1510. Along path 1505, optical wavelengths λ1 . . . λm are received by first input port 1548 and are directed to a west demultiplexed output 1565, which includes a plurality of output ports. According to one embodiment of the present invention, the west demultiplexed output includes 80 output ports. The optical wavelengths traversing path 1505 are further routed from the west demultiplexed output and through transponder card 1431a. A copy of the optical wavelengths λ1 . . . λm is routed along path 1510 to an east demultiplexed output 1570, which includes a plurality of output ports. According to one embodiment of the present invention, the east demultiplexed output includes 80 output ports. The copy of optical wavelengths routed through the east demultiplexed output is routed from the OADM through transponder card 1431b. An additional copy of the optical wavelengths λ1 . . . λm is routed along path 1515. This additional copy of the optical wavelengths, a subset thereof, or none of the optical wavelengths may be routed from the OADM via output port 1555.

Other routing states of the OADM include paths 1550 and 1553, as shown in FIG. 15B. Optical wavelengths, say λ1 . . . λm', routed along path 1550, are routed through transponder card 1431a and are received by the OADM via a west demultiplexed input 1524, which includes a plurality of input ports. According to one embodiment of the present invention, the east demultiplexed output includes 80 output ports. Optical wavelengths received via the west demultiplexed input are further routed to first output port 1530. Along path 1553, a copy of the optical wavelengths λ1' . . . λm' is routed through transponder card 1431b through the east demultiplexed input 1540 to the first output port. The east demultiplexed input includes a plurality of input ports; according to one embodiment of the present invention, the input includes 80 input ports. While paths 1550 and 1553 both show optical wavelengths routed to output port 1530, only one of the paths is active (routing optical wavelengths) at any given time. Each path's activity is controlled by its associated transponder card and only one of the transponder cards transmits optical wavelengths to the OADM at any given time.

Optical wavelengths may also be routed from second input port 1514 along express path 1557 to output port 1430. OADM 1430 is dynamically configurable to transmit either the optical wavelengths traversing path 1557 or the active path of the two paths 1550 and 1553 to output port 1530. Alternatively, the OADM may transmit select subsets of either or both of the optical wavelengths traversing path 1457 or the active path of the two paths 1550 or 1553 to output port 1430.

Figure 16:
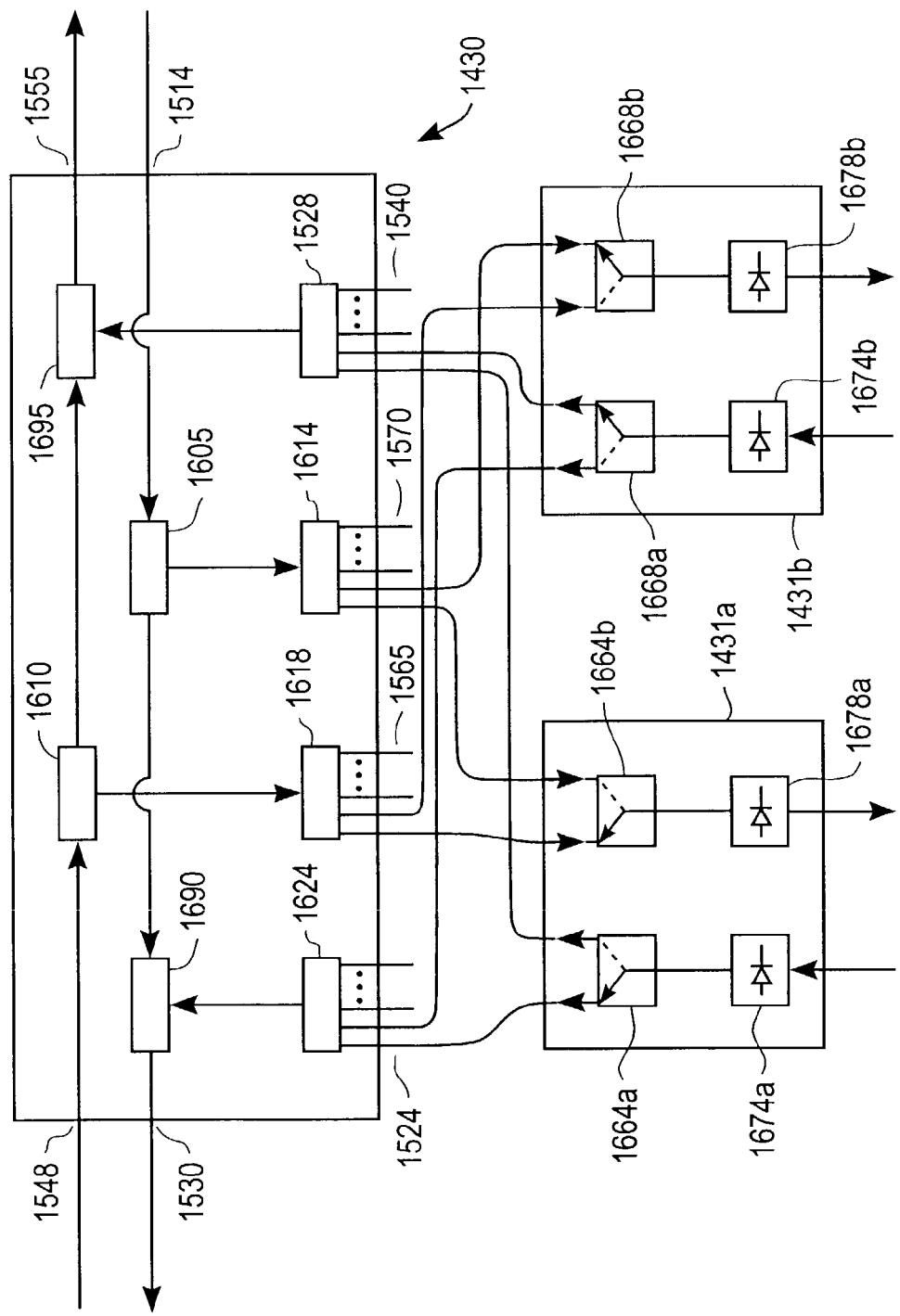
FIG. 16 is a schematic of an OADM according to another embodiment of the present invention.

FIG. 16 is a schematic of OADM 1430 showing the elements comprising the OADM. Similar to OADM 1130 shown in FIG. 13, OADM 1430 includes east and west splitters 1605 and 1610 configured to receive optical wavelengths from input ports 1514 and 1548, respectively. Each splitter splits received optical wavelengths into first and second copies. The east splitter directs a copy of its received optical wavelengths to wavelength-selective two-by-one switch (e.g., WRE) 1690 and another copy to east demultiplexer 1614. The east demultiplexer routes its copy of the optical wavelengths to east demultiplexed output 1540, which further routes the wavelengths to transponder cards 1431a and 1431b. The west splitter directs a copy of its received optical wavelengths to wavelength-selective two-by-one switch (e.g., WRE) 1695 and another copy to west demultiplexer 1618. The west demultiplexer routes the optical wavelengths to west demultiplexed output 1565, which further routes the wavelengths to transponder cards 1431a and 1431b.

Both transponder cards include a plurality of switches for selectively transmitting optical wavelengths received from either the west or east demultiplexed output. Each transponder card includes a switch for each wavelength received by the card. For convenience, two switches associated with each transponder card are shown. The switches associated with transponder card 1431a are designated 1664a and 1664b and the switches associated with transponder card 1431b associated with transponder card 1431b are designated 1668a and 1668b. Both transponder cards further include pairs of lasers (e.g., diode lasers). The lasers associated with transponder card 1431a are designated 1674a and 1674b and the lasers associated with transponder card 1431b are designated 1678a and 1678b.

West and east couplers (i.e., multiplexers) 1624 and 1628 are optically coupled to the west and east demultiplexed inputs, respectively. The optical wavelengths received by the west coupler from the west demultiplexed input are routed (via path 1550) to wavelength-selective two-by-one switch 1690. The optical wavelengths received by the east coupler from the east demultiplexed input are routed (via path 1553) to wavelength-selective two-by-one switch 1695. Each wavelength-selective two-by-one switch is similar to and provides the same wavelength selective termination and transmission functions as WRE 830, described above and shown in FIG. 8.

Referring again to FIG. 14, transponder cards 1431a and 1431b select only one copy of the optical wavelengths received by the transponder cards for transmission to OADM 1430. For example, transponder card 1431a receives the copy of optical wavelengths traversing path 1483a and transponder card 1431b receives the copy of optical wavelengths traversing path 1483b. Either the copy of optical wavelengths traversing path 1483a or the copy of optical wavelengths traversing path 1483b is transmitted to OADM 1430, but not both copies. Lasers 1674a and 1674b control this selective transmission. More specifically, only one of lasers 1674a or 1674b is turned on and transmitting at any give time. Such selective transmission prevents wavelengths having the same frequency from being simultaneously transmitted to output port 1530. Transponder cards 1431a and 1431b simultaneously transmit optical wavelengths received from OADM 1430. This simultaneous transmission is achieved by lasers 1678a and 1678b both being turned on and transmitting at the same time.

Optical Network Providing Demultiplexed Subnetwork Protection

FIGS. 17A-17D are schematics of an optical network 1700 providing subnetwork protection according to another embodiment of the present invention. For convenience, a similar numeral scheme will be adopted for elements of optical network 1700 corresponding to elements of optical network 1400 shown in FIG. 14. The embodiment shown in FIGS. 17A-17D differs from the embodiment of FIG. 14 in that a single OADM 1730 transmits and receives optical wavelengths to and from first, second, third, and fourth transponder cards 1731a, 1731b, 1731c, and 1731d. Protection for sub-network 1440 is implemented, in part, by diversely routing two copies of optical wavelengths across the subnetwork. Thus if one optical fiber of the subnetwork fails, a copy of the optical wavelengths is routed across another optical fiber of the subnetwork restoring communication across the subnetwork.

DWDM rings 1410 and 1415 may have similar or disparate routing standards. For example, DWDM rings 1410 may be O-UPSRs while DWDM ring 1415 may be an OMS-SPRING, O-UPSR, or other standard.

Figure 17A:
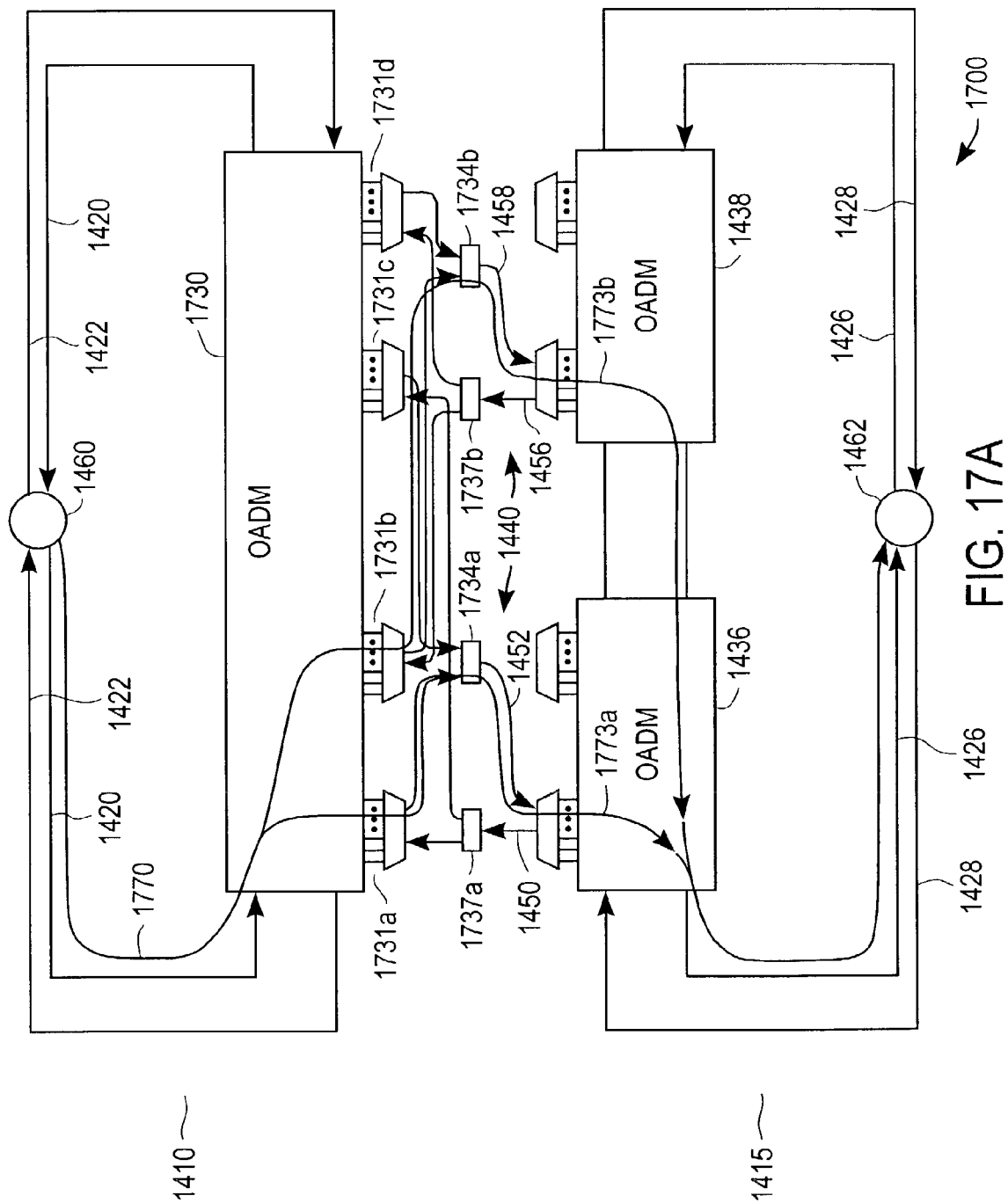
FIGS. 17A-17D are schematics of an optical network providing subnetwork protection according to another embodiment of the present invention.

According to a normal working state of optical network 1700, copies of optical wavelengths, say λ1 . . . λm, are routed along both working path 1770 (FIG. 17A) and protection path 1775 (FIG. 17B) (i.e., working and protection O-UPSR routing). Only one of these copies, however, is routed across the subnetwork at any given time. According to the normal working state, the copy of optical wavelengths traversing working path 1770 is routed across the subnetwork via paths 1773a and 1773b (FIG. 17A). Should a portion of the working path fail (e.g., optical fiber 1420), however, the copy of optical wavelengths routed along protection path 1775 is routed across the subnetwork via path 1778a and 1778b (FIG. 17B).

More specifically, the copy of optical wavelengths traversing optical fiber 1420 (path 1770) is received by OADM 1730 and is split into two copies. One copy is routed through first transponder card 1731a to a first coupler 1734a and the other copy is routed through second transponder card 1731b to a second coupler 1734b. The copy of optical wavelengths routed through the first coupler is further routed across optical fiber 1452 to OADM 1436. The copy of optical wavelengths routed through the second coupler is further routed across optical fiber 1458 to OADM 1438, which, in turn, routes the optical wavelengths to OADM 1436. OADM 1436 is configured to route one or a combination of the copies of optical wavelengths to optical fiber 1426. Thus, if one of optical fibers 1450 or 1456 should fail, the subnetwork is connection protected as copies of the optical wavelengths are diversely routed across the subnetwork.

Figure 17B:
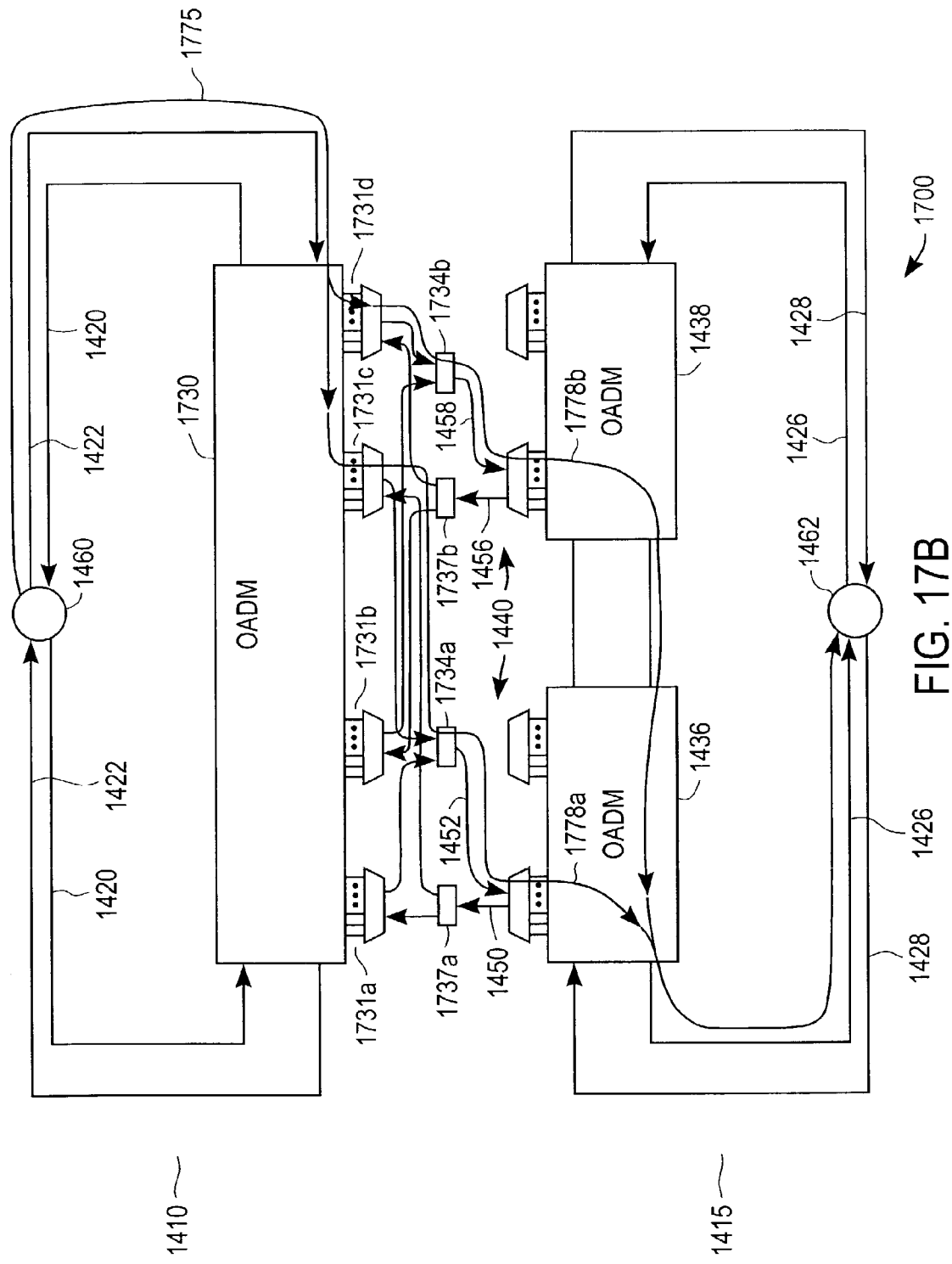

According to a protection state of optical network 1700, for example, should optical fiber 1420 fail, the copy of optical wavelengths $\lambda 1 \ldots \lambda m$ routed along protection path 1775 is routed across the subnetwork via paths 1778a and 1778b (FIG. 17B). More specifically, the copy of optical wavelengths is routed along optical fiber 1422 to OADM 1730 which splits the optical wavelengths into two copies. One copy of optical wavelengths is routed from OADM 1730 through transponder card 1731c to first coupler 1734a, which, in turn, routes the copy through optical fiber 1452 to OADM 1436. The other copy of optical wavelengths is routed from OADM 1730 through transponder card 1731d to second coupler 1734b, which, in turn, routes the copy onto optical fiber 1458. Optical fiber 1458 routes the copy to OADM 1438, which, in turn, routes the copy to OADM 1436. OADM 1436 is configured to route one or a combination of the copies onto optical fiber 1426. As discussed above, such diverse routing provides the subnetwork is connection protected if one of optical fibers 1450 or 1456 should fail.

The preceding discussion describes protection for optical wavelengths transmitted from DWDM ring 1410 to DWDM ring 1415 across the subnetwork; the following discussion describes protection for optical wavelengths transmitted from DWDM ring 1415 to DWDM ring 1410 across the subnetwork.

Figure 17C:
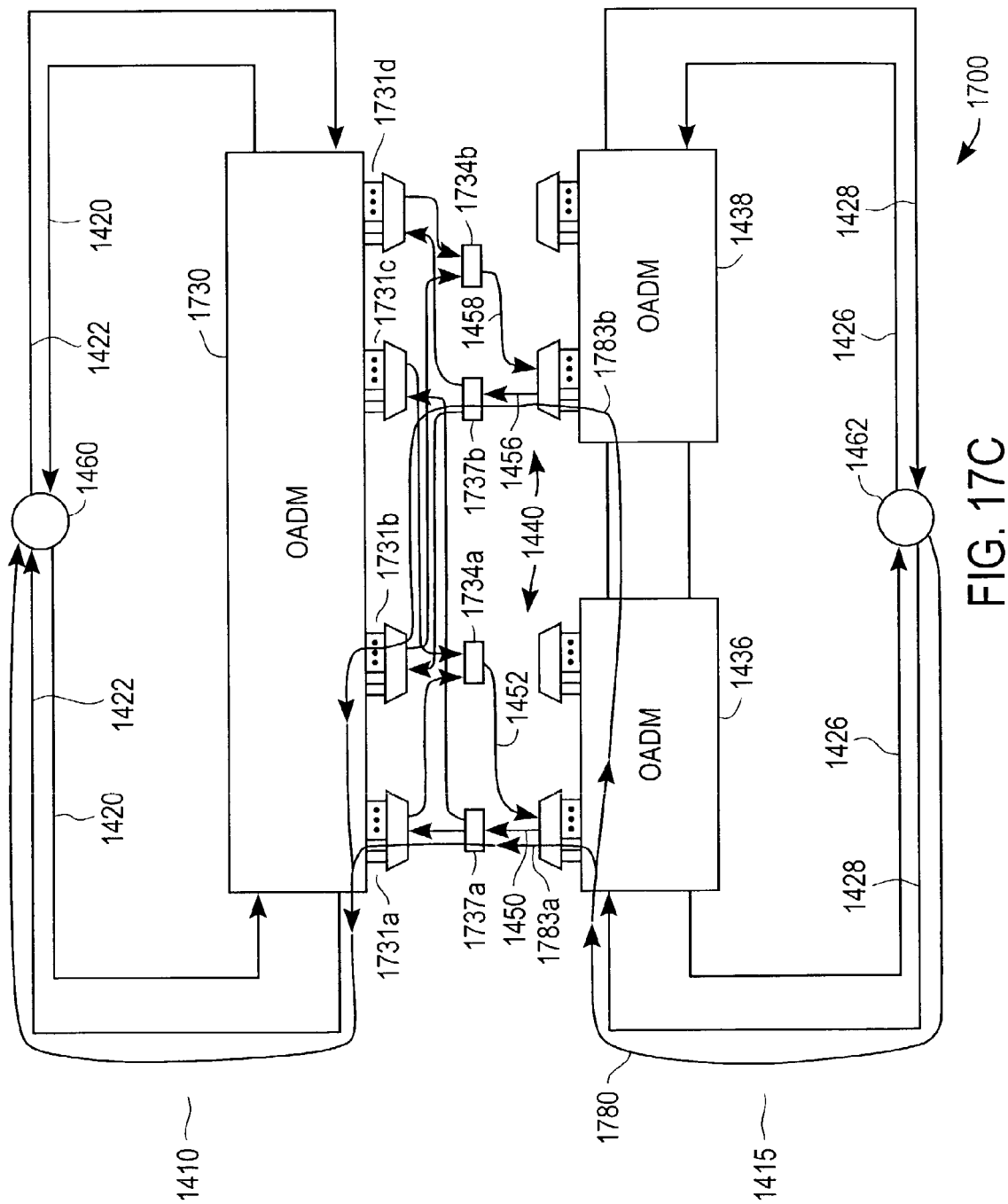
Figure 17D:
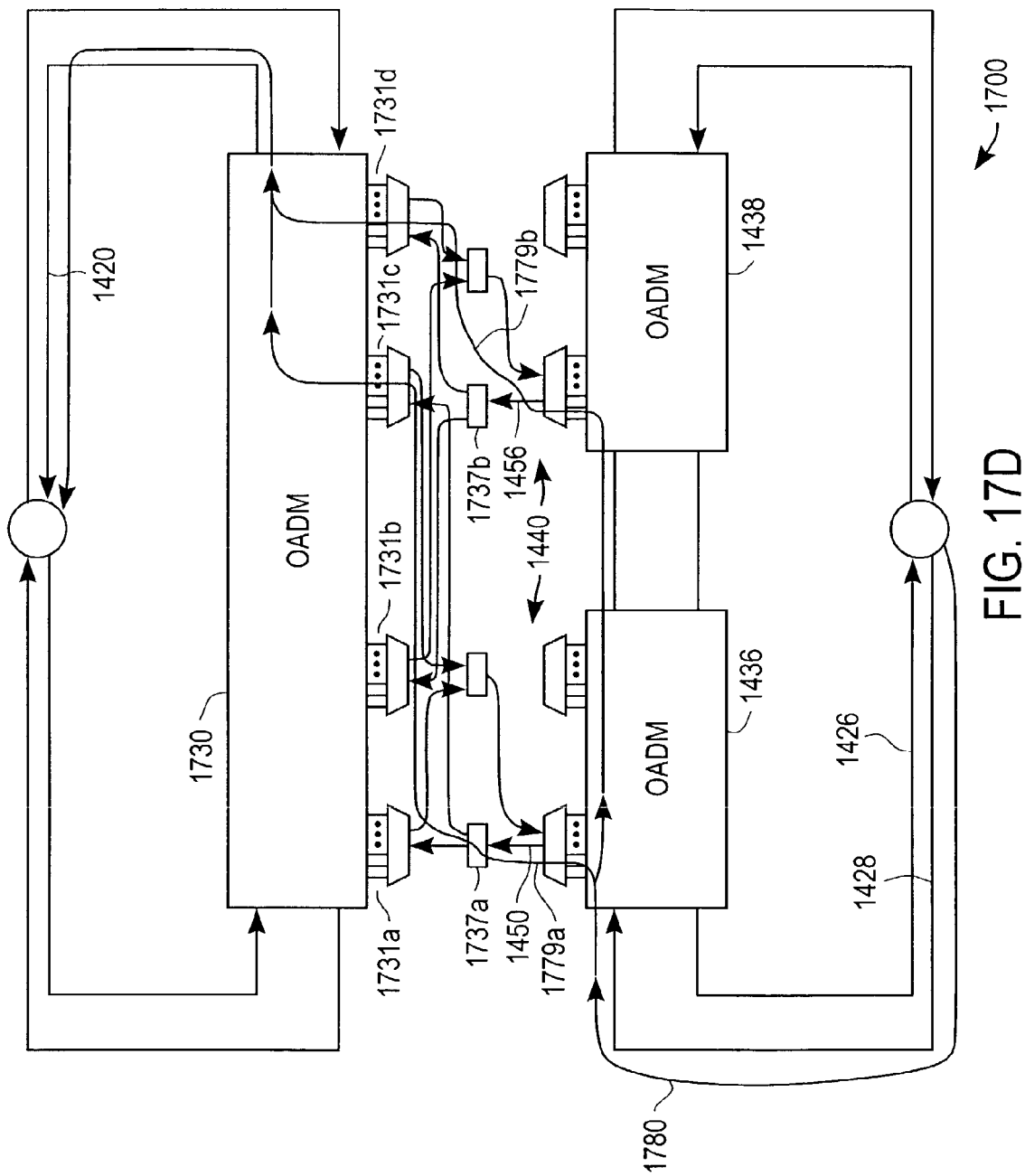

According to a normal working state of optical network 1700, optical wavelengths, say $\lambda 1' \ldots \lambda m''$, routed along path 1780 are split into two copies by OADM 1436 (FIG. 17C). One of the copies follows path 1783a across the subnetwork and the other copy follows path 1783b across the subnetwork (FIG. 17C). More specifically, optical wavelengths $\lambda 1' \ldots \lambda m'$ routed along optical fiber 1428 are received by OADM 1436 which splits the wavelengths into two copies. One copy of the optical wavelengths is routed across optical fiber 1450 to splitter 1737a, and is further routed to transponder card 1731a. The other copy of optical wavelengths is routed from OADM 1436 to OADM 1438, which routes the copy onto optical fiber 1456. The second splitter 1737b receives the copy of optical wavelengths from optical fiber 1456 and routes the copy to transponder card 1731b. Both transponder cards 1731a and 1731b are dynamically configurable to terminate their received copy of optical wavelengths or to transmit their received copy of optical wavelengths to OADM 1730. At any given time only one of transponder cards 1731a or 1731b transmits its received optical wavelengths to OADM 1730. Such selective transmission prevents copies of optical wavelengths having the same frequency from being simultaneously transmitted onto optical fiber 1422. As discussed above, diverse routing of copies of optical wavelengths across the subnetwork and the selective transmission of one of the copies provide the subnetwork is connection protected if one of optical fibers 1450 or 1456 should fail.

According to a protection state of optical network 1700 optical wavelengths $\lambda 1' \ldots \lambda m'$ are routed along protection path 1780 and further routed across the subnetwork via path 1779a or 1779b (FIG. 17D) onto optical fiber 1420 (i.e., O-UPSR protection fiber). More specifically, optical wavelengths $\lambda 1'' \ldots \lambda m'$ are routed across optical fiber 1428 and received by OADM 1436 which splits the optical wavelengths into two copies. One copy of the optical wavelengths is routed from OADM 1436 across optical fiber 1450 to splitter 1737a. The splitter routes the copy to transponder card 1731c. The other copy of optical wavelengths $\lambda 1' \ldots \lambda m''$ is routed from OADM 1436 to OADM 1438, which in turn routes the copy across the subnetwork via optical fiber 1456. Splitter 1737b receives the copy of optical wavelengths from the fiber and further routes the wavelengths to transponder card 1731d. Both transponder cards 1731c and 1731d are dynamically configurable to either terminate their received copy of optical wavelengths or to transmit their received copy of optical wavelengths to OADM 1730. At any given time only one of transponder cards 1731c or 1731d transmits its received copy of optical wavelengths to OADM 1730. Such selective transmission prevents copies of optical wavelengths having the same frequency from being simultaneously transmitted onto optical fiber 1420. As discussed above, diverse routing of copies of optical wavelengths across the subnetwork and the selective transmission of one of the copies provide the subnetwork is connection protected if one of optical fibers 1450 or 1456 should fail.

Figure 18A:
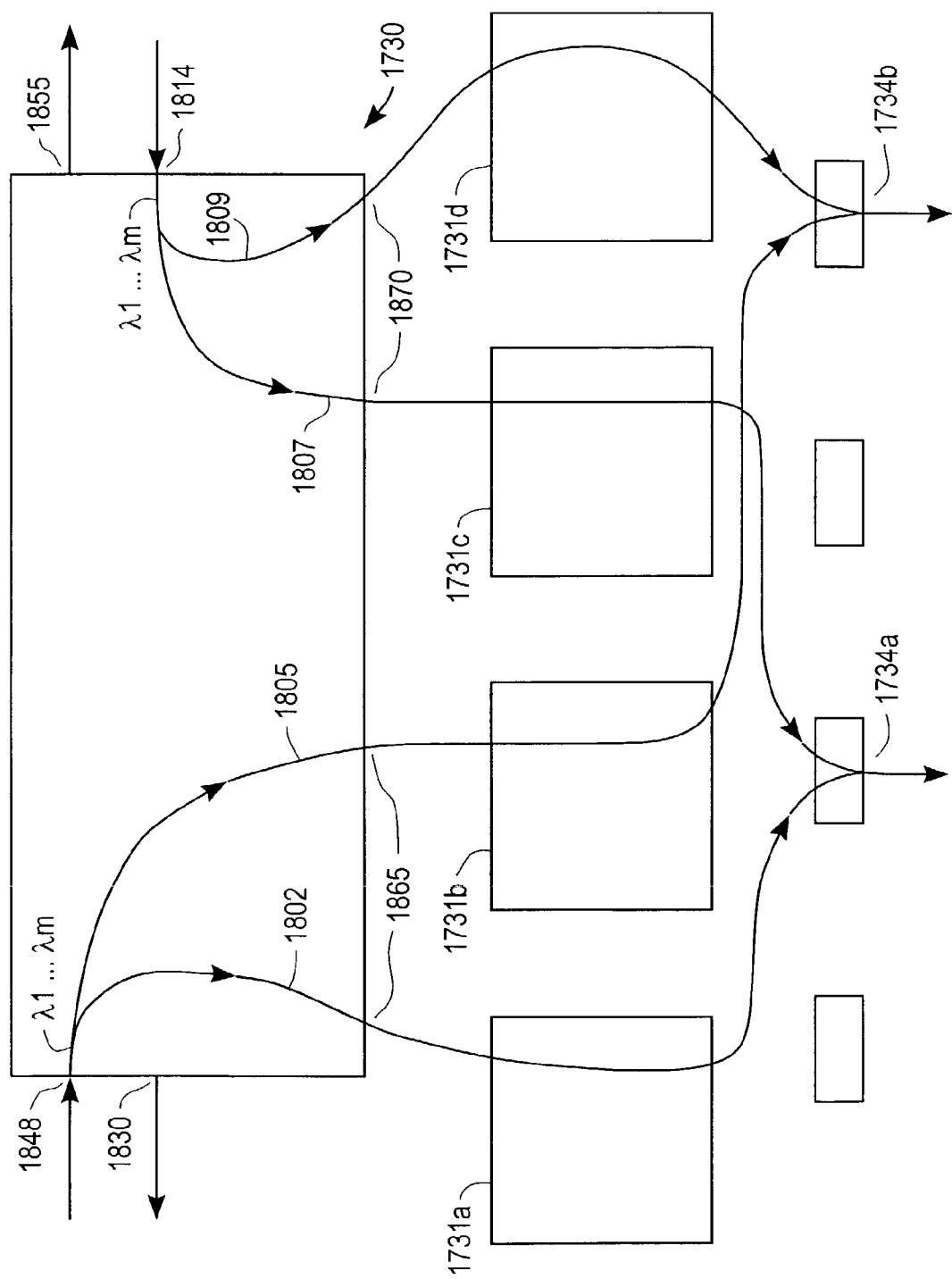
FIGS. 18A and 18B are schematics of an OADM according to another embodiment of the present invention.
Figure 18B:
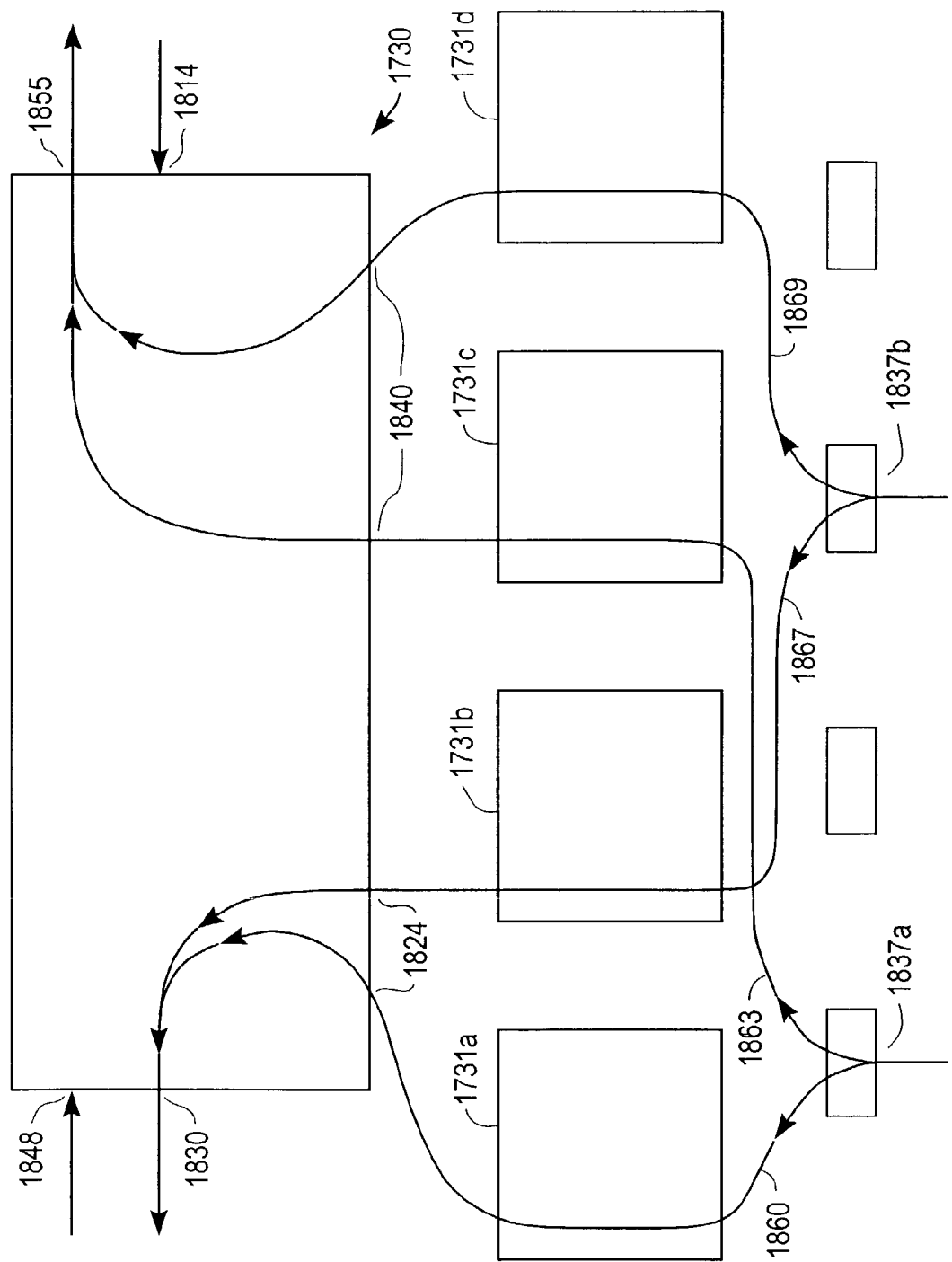

FIGS. 18A and 18B are schematics of OADM 1730 and its associated transponder cards, couplers and splitters, and show various routing states according to an embodiment of the present invention. As shown in FIG. 18A, the various routing states of the OADM and transponder cards include paths 1802, 1805, 1807 and 1809, along each of which OADM 1730 transmits optical wavelengths to the transponder cards. Along paths 1802 and 1805, the optical wavelengths $\lambda 1 \ldots \lambda m$ are received via first input port 1848 and are directed to west demultiplexed output 1865, which includes a plurality of output ports. According to one embodiment of the present invention, the west demultiplexed output includes 80 output ports. Copies of the optical wavelengths are directed to first and second transponder cards 1731a and 1731b. Along paths 1807 and 1809, a copy of optical wavelengths $\lambda 1 \ldots \lambda m$ are received via second input port 1814 and are directed to east demultiplexed output 1870, which includes a plurality of output ports. According to one embodiment of the present invention, the east demultiplexed output includes 80 output ports. The copy of the optical wavelengths is routed from the east demultiplexed output to third and fourth transponder cards 1731c and 1731d. According to a normal working state of the OADM, the first and second transponders are turned on and transmit optical wavelengths $\lambda 1 \ldots \lambda m$ to couplers 1734a and 1734b, and the third and fourth transponders are turned off (i.e., not transmitting). Such selective transmission by the transponder cards provides that copies of the optical wavelengths are not simultaneously routed through a coupler and onto a single optical fiber of subnetwork 1740 (FIGS. 17A-17D). According to a protection state, for example, should optical fiber 1420 fail, the first and second transponder cards are turned off and the third and fourth transponder cards are turned on and transmit the optical wavelengths to couplers 1734a and 1734b.

In FIG. 18B, the routing states of OADM 1730 include paths 1860, 1863, 1867, and 1869, along which OADM 1730 receives optical wavelengths from transponder cards 1731a-1731d. More specifically, along paths 1860 and 1863 optical wavelengths λ1' . . . λm' are received by splitter 1837a, which routes a copy of the optical wavelengths to transponder cards 1731a and 1731c. Along paths 1867 and 1869 a copy of the optical wavelengths λ1' . . . 'm" are received by splitter 1837b, which routes a copy of the optical wavelengths to transponder cards 1731b and 1731d. According to a normal working state transponder cards 1831a and 1831c are turned on and transmitting and transponder cards 1731b and 1731d are turned off. Transponder card 1731a routes a copy of the optical wavelengths to west demultiplexed input 1824, which includes a plurality of input ports. According to one embodiment of the present invention, the west demultiplexed input includes 80 input ports. From the west demultiplexed input port the optical wavelengths are routed to a first output port 1830. Transponder card 1731c routes another copy of the optical wavelengths to an east demultiplexed input 1840, which includes a plurality of input ports. According to one embodiment of the present invention, the east demultiplexed input includes 80 input ports. From the east demultiplexed input port the optical wavelengths are routed to a second output port 1855.

According to a protection state, for example, should optical fiber 1450 fail, transponder cards 1731b and 1731d are turned on and transmitting and transponder cards 1731a and 1731c are turned off. Transponder card 1731b routes a copy of the optical wavelengths to west demultiplexed input 1824 which, in turn, routes the copy to first output port 1830. Transponder card 1731d routes another copy of the optical wavelengths to east demultiplexed input 1840, which, in turn, routes the copy of to second output port 1855. Selectively switching on and off the transponder cards provides that copies of the optical wavelengths λ1' . . . λm' are not routed to the same output port of the OADM.

Figure 19:
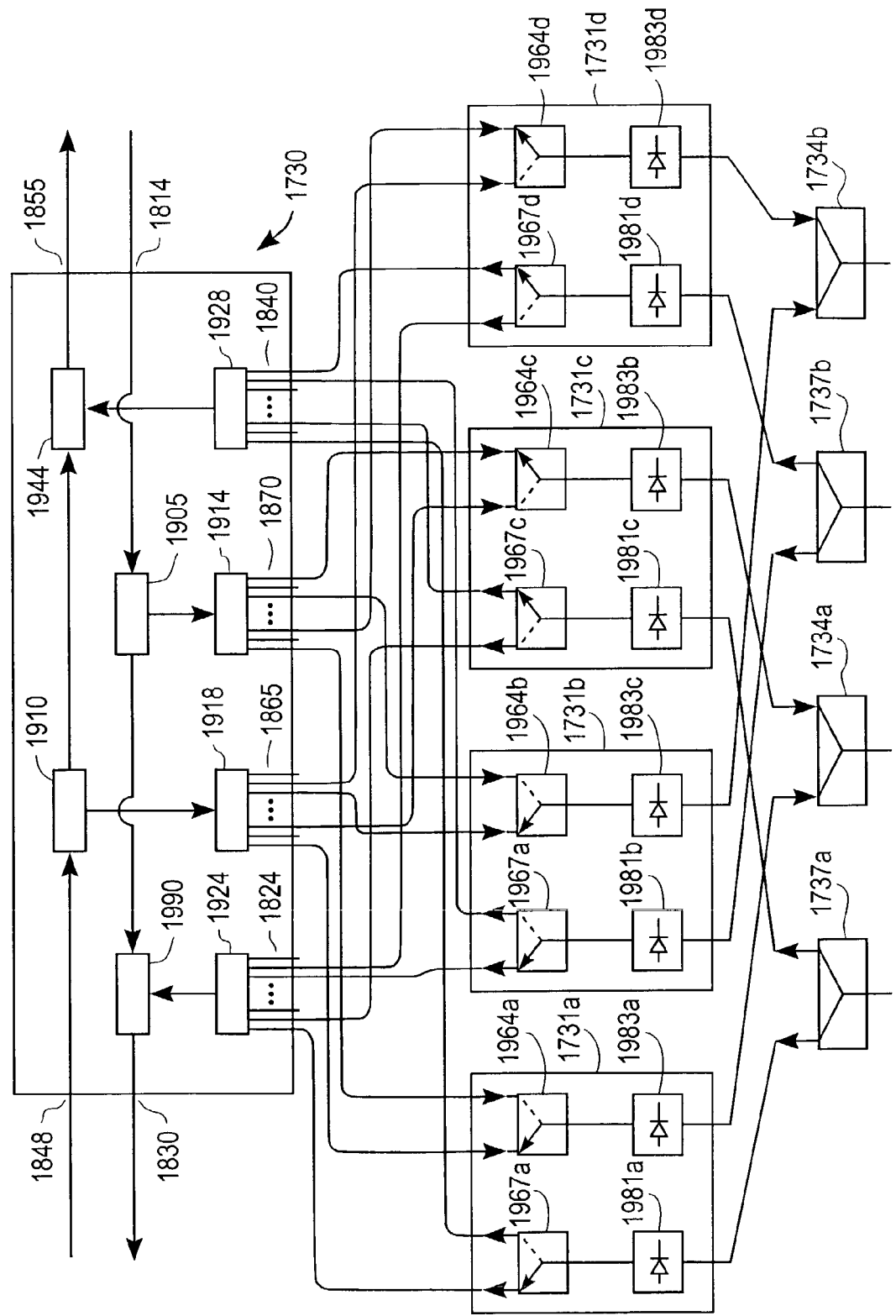
FIG. 19 is a schematic of an OADM according to another embodiment of the present invention.

FIG. 19 is a schematic of OADM 1730 showing the elements comprising the OADM. Similar to OADM 1130 shown in FIG. 13, OADM 1730 includes east and west splitters 1905 and 1910 configured to receive optical wavelengths from input ports 1814 and 1848, respectively. Each splitter splits received optical wavelengths into first and second copies. The east splitter directs a copy of its received optical wavelengths to wavelength-selective two-by-one switch (e.g., WRE) 1990 and another copy to east demultiplexer 1914. The east demultiplexer routes the optical wavelengths to east demultiplexed output 1870 which is optically coupled to each of transponder cards 1731a-1731d. The west splitter directs a copy of its received optical wavelengths to wavelength-selective two-by-one switch (e.g., WRE) 1944 and directs another copy to west demultiplexer 1918. The west demultiplexer routes the optical wavelengths to west demultiplexed output 1865 which is optically coupled to each of transponder cards 1731a-1731d.

West coupler 1924 is configured to receive optical wavelengths from the west demultiplexed input 1824 and is configured to route the optical wavelengths to wavelength-selective two-by-one switch 1990. Wavelength-selective two-by-one switch 1990 is similar to and provides the same wavelength selective termination and transmission functions as WRE 830, described above and shown in FIG. 8. Wavelength-selective two-by-one switch 1990 selectively routes to output port 1830 the optical wavelengths received from the east splitter and the west coupler. East coupler 1928 is configured to receive optical wavelengths from the east demultiplexed input 1840 and is configured to route the optical wavelengths to wavelength-selective two-by-one switch 1944. Wavelength-selective two-by-one switch 1944 is similar to and provides the same wavelength selective termination and transmission functions as WRE 830, described above and shown in FIG. 8. Wavelength-selective two-by-one switch 1944 selectively routes to output port 1855 the optical wavelengths received from the west splitter and the east coupler.

Transponder cards 1731a, 1731b, 1731c, and 1731d include switches 1964a, 1964b, 1964c, and 1964d, respectively, for selecting the transmission of optical wavelengths received from either the west or east-demultiplexed outputs. Transponder cards 1731a, 1731b, 1731c, and 1731d also include switches 1967a, 1967b, 1967c, and 1967d, respectively, for selecting the transmission of optical wavelengths directed toward either the west or east demultiplexed inputs. Each transponder card further includes pairs of lasers (e.g., diode lasers). One laser of the pair controls the transmission of optical wavelengths directed toward the OADM and the other laser of the pair controls the transmission of optical wavelengths received from the OADM. Each of lasers 1981a, 1981b, 1981c, and 1981d control transmission of optical wavelengths to the OADM. Lasers 1983a, 1983b, 1983c, and 1983d control transmission of optical wavelengths received from the OADM.

Referring again to FIGS. 17A-17D, lasers 1983a and 1983c control transmission of optical wavelengths λ1 . . . λm along paths 1773a and 1773b, respectively, and lasers 1983b and 1983d control transmission of optical wavelengths along paths 1778a and 1778b, respectively. Lasers 1981a and 1981b control transmission of optical wavelengths along paths 1783a and 1783b, respectively, and lasers 1981c and 1981d control transmission of optical wavelengths along paths 1779a and 1779b, respectively. Such selective transmission in combination with diverse routing of optical wavelengths across the subnetwork provides protection for the subnetwork.

Optical Network Providing Demultiplexed Subnetwork Protection

Figure 20A:
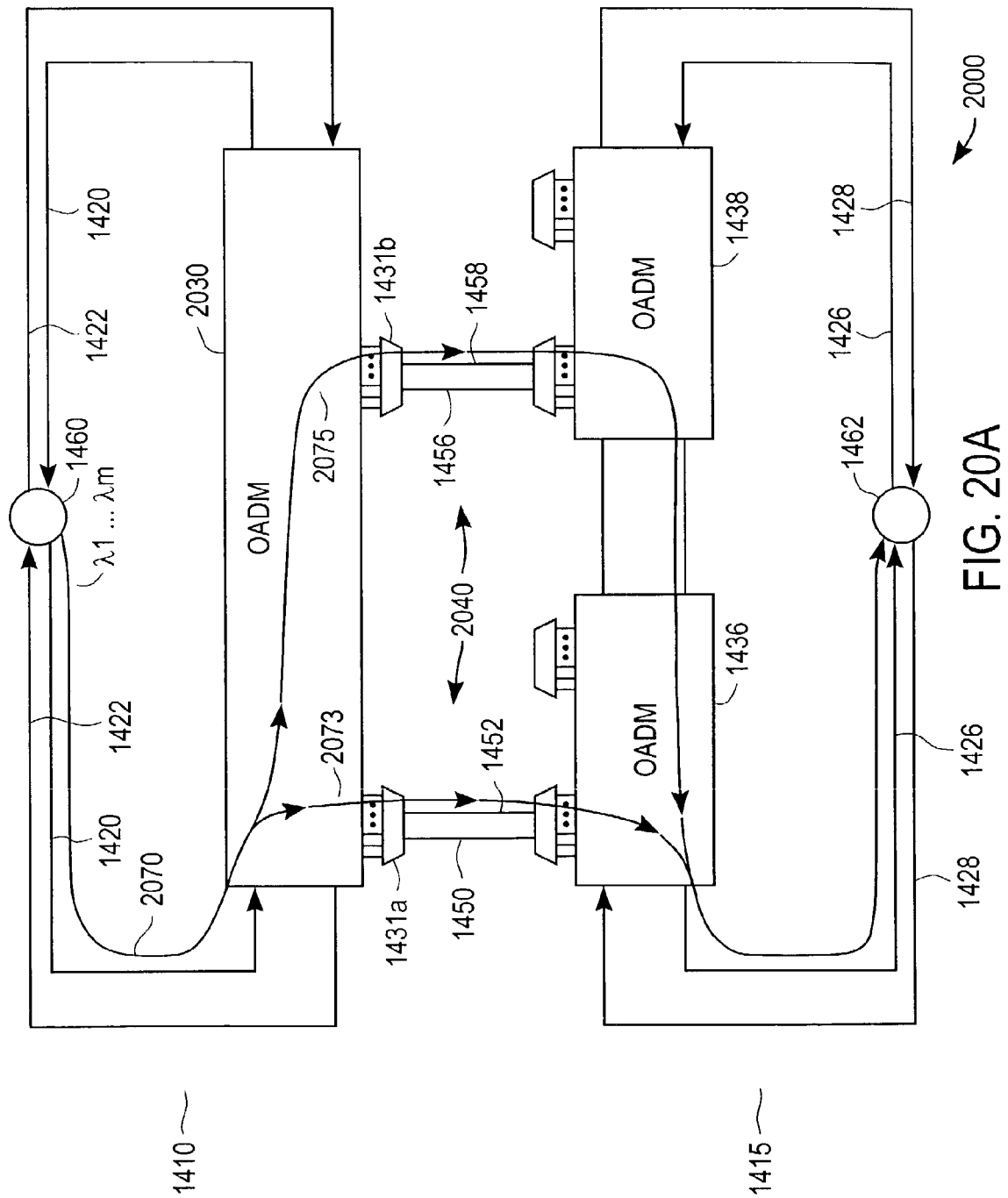
FIGS. 20A-20C are schematics of an optical network providing subnetwork protection according to another embodiment of the present invention.
Figure 20B:
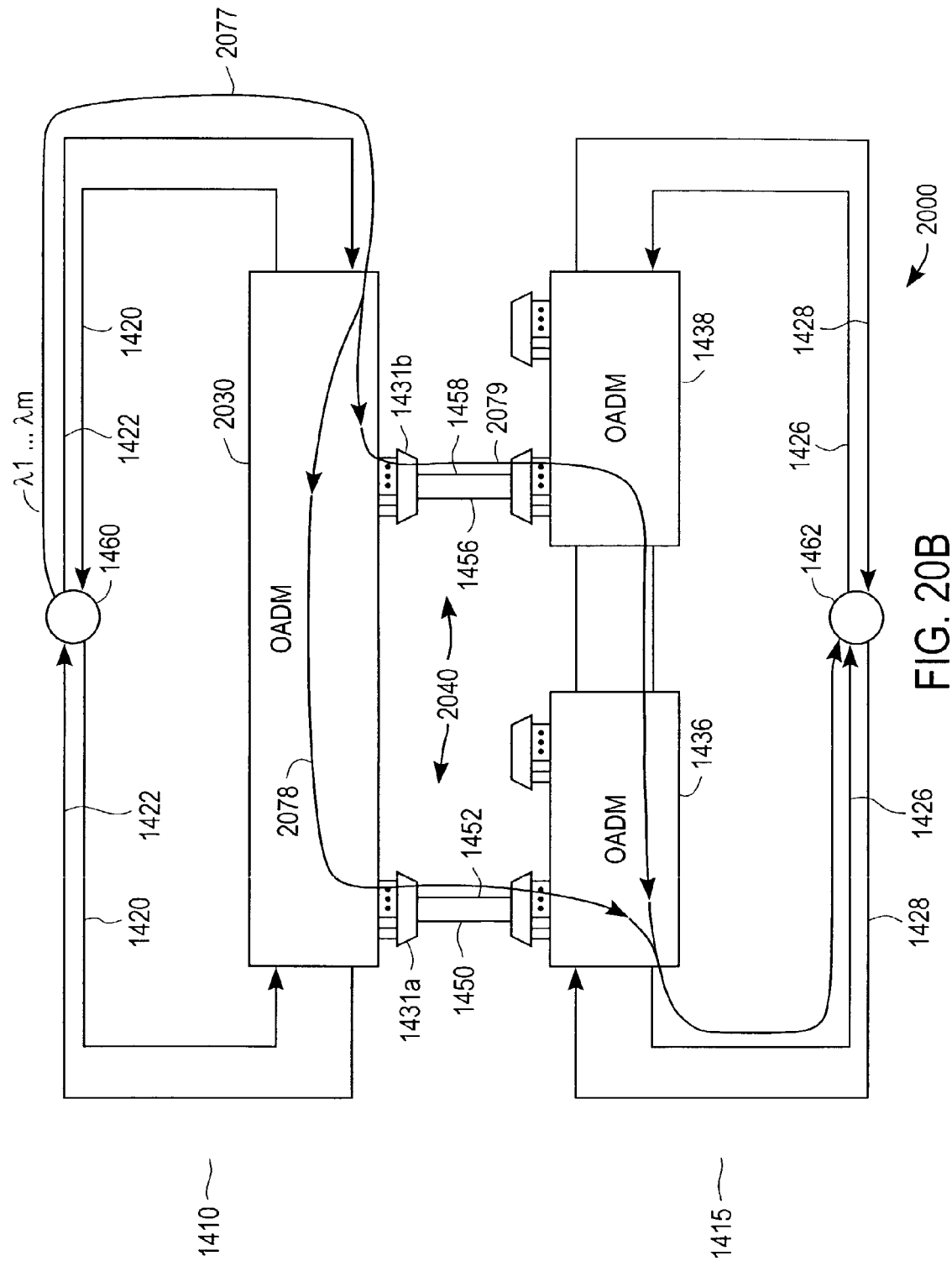
Figure 20C:
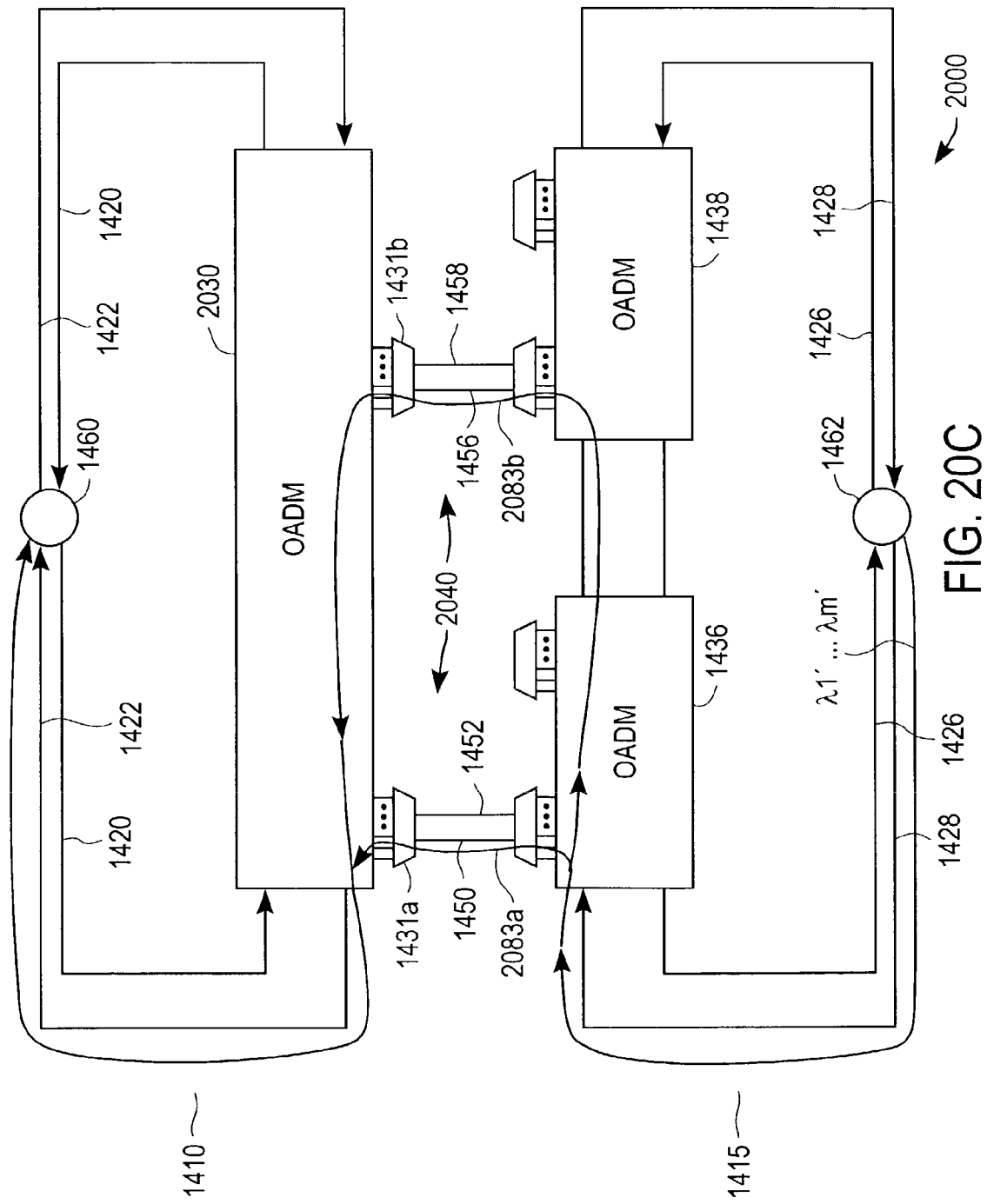

FIGS. 20A-20C are schematics of an optical network 2000 providing subnetwork protection according to another embodiment of the present invention. For convenience, a similar numeral scheme will be adopted for elements of optical network 2000 corresponding to elements of optical network 1400 shown in FIG. 14. The embodiment shown in FIGS. 20A-20C differs from the embodiment of FIG. 14 in that DWDM ring 1410 is an OMS-SPRING. DWDM ring 1415 may be an OMS-SPRING, O-UPSR, or other standard.

According to a normal working state of optical network 2000 shown in FIG. 20A, working traffic routed from DWDM ring 1410 to DWDM ring 1415 is diversely routed over the subnetwork 2040 in optical fibers 1452 (path 2073) and 1458 (path 2075). More specifically, along working path 2070, optical wavelengths λ1 . . . λm are routed from OADM 1460, across optical fiber 1420 to OADM 2030. OADM 2030 splits the optical wavelengths into two copies. The OADM routes one copy across optical fiber 1452 to OADM 1436 and routes another copy across optical fiber 1458 to OADM 1438, which, in turn, routes the other copy to OADM 1436. OADM 1436 selectively routes either or a combination of the copies onto optical fiber 1426 for further routing to OADM 1462. Such diverse routing provides that should one of optical fibers 1452 or 1458 fail, communication across the subnetwork is connection protected.

According to a protection state of optical network 2000 as shown in FIG. 20B, should optical fiber 1420 fail, for example, optical wavelengths λ1 . . . λm are routed from OADM 1460 to optical fiber 1422 (path 2077) instead of optical fiber 1420. Optical fiber 1422 transmits the optical wavelengths to OADM 2030, which splits the optical wavelengths into two copies. OADM 2030 routes one copy of the optical wavelengths across optical fiber 1452 (path 2078) to OADM 1436 and routes another copy of the optical wavelengths across optical fiber 1458 to OADM 1438 (path 2079), which, in turn, routes the other copy to OADM 1436. OADM 1436 selectively routes either copy of the optical wavelengths or a combination of the copies of optical wavelengths onto optical fiber 1426 for further routing to OADM 1462. Such routing, should one of optical fibers 1452 or 1458 fail, provides that communication across the subnetwork is connection protected.

The preceding discussion describes protection for optical wavelengths transmitted from DWDM ring 1410 to DWDM ring 1415 across the subnetwork; the following discussion describes protection for optical wavelengths transmitted from DWDM ring 1415 to DWDM ring 1410 across the subnetwork.

According to a normal working state of optical network 2000, as shown in FIG. 20C, working traffic is diversely routed from DWDM ring 1415 across subnetwork via optical fibers 1450 (path 2083*a*) and 1456 (path 2083*b*). Working traffic from only one these optical fibers, however, is transmitted from transponder cards 1431*a* and 1431*b* to OADM 2030 at any given time. More specifically, optical wavelengths, say $\lambda 1' \ldots \lambda m'$, are routed from OADM 1462 to OADM 1436, which splits the wavelengths into two copies. One copy of the optical wavelengths is routed over optical fiber 1450 to transponder card 1431*a*. The other copy of the optical wavelengths is routed to OADM 1438, which, in turn, routes the copy over optical fiber 1456 to transponder card 1431*b*. As discussed above, only one of the copies is further routed from transponder card 1431*a* or 1431*b* to OADM 2030. This selective transmission provides that only one of the copies of the optical wavelengths is routed onto optical fiber 1420. Such routing across the subnetwork provides the subnetwork is protected should one of the subnetwork's optical fibers fail.

Figure 21A:
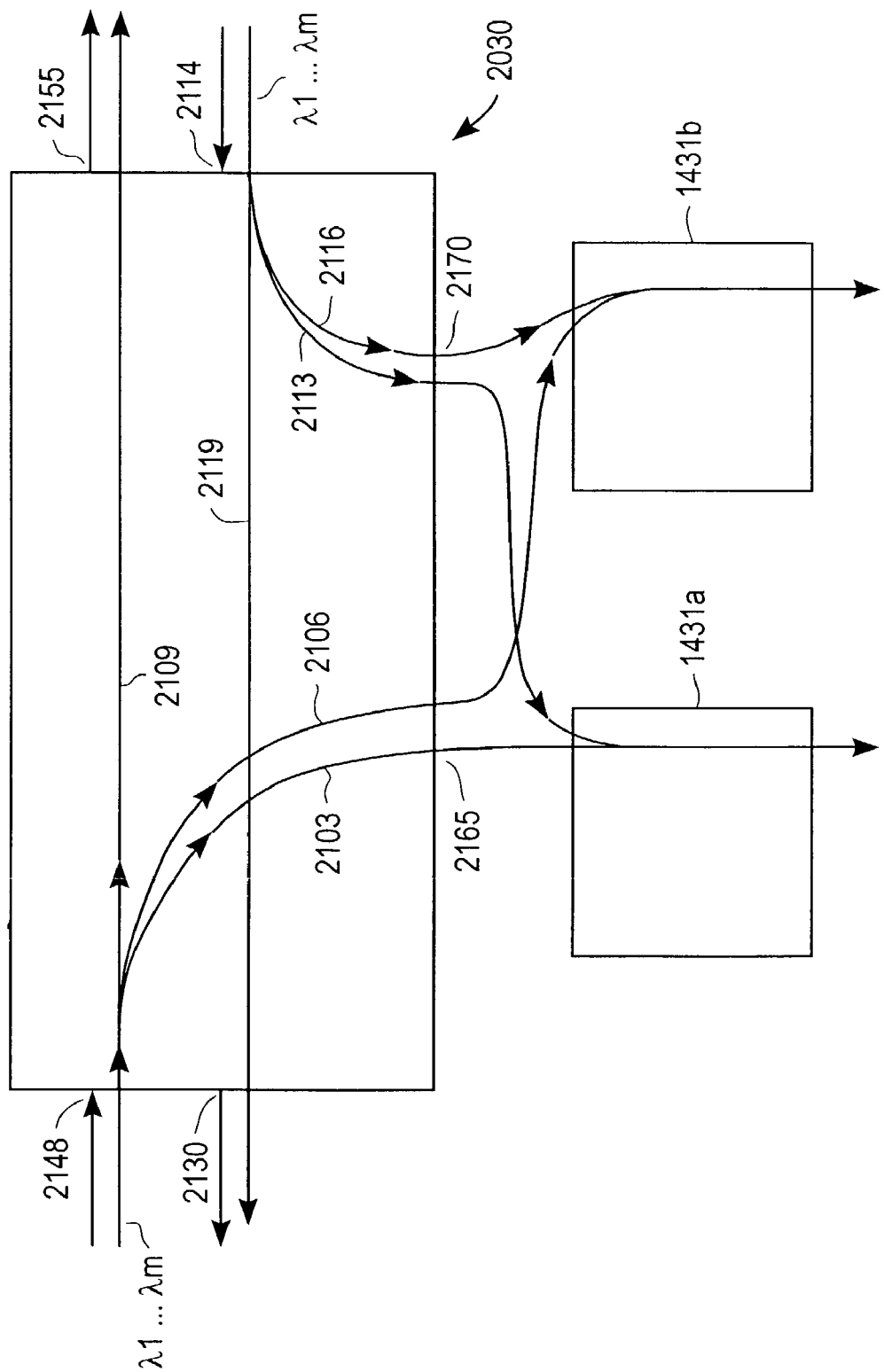
FIGS. 21A and 21B are schematics of an OADM according to another embodiment of the present invention.
Figure 21B:
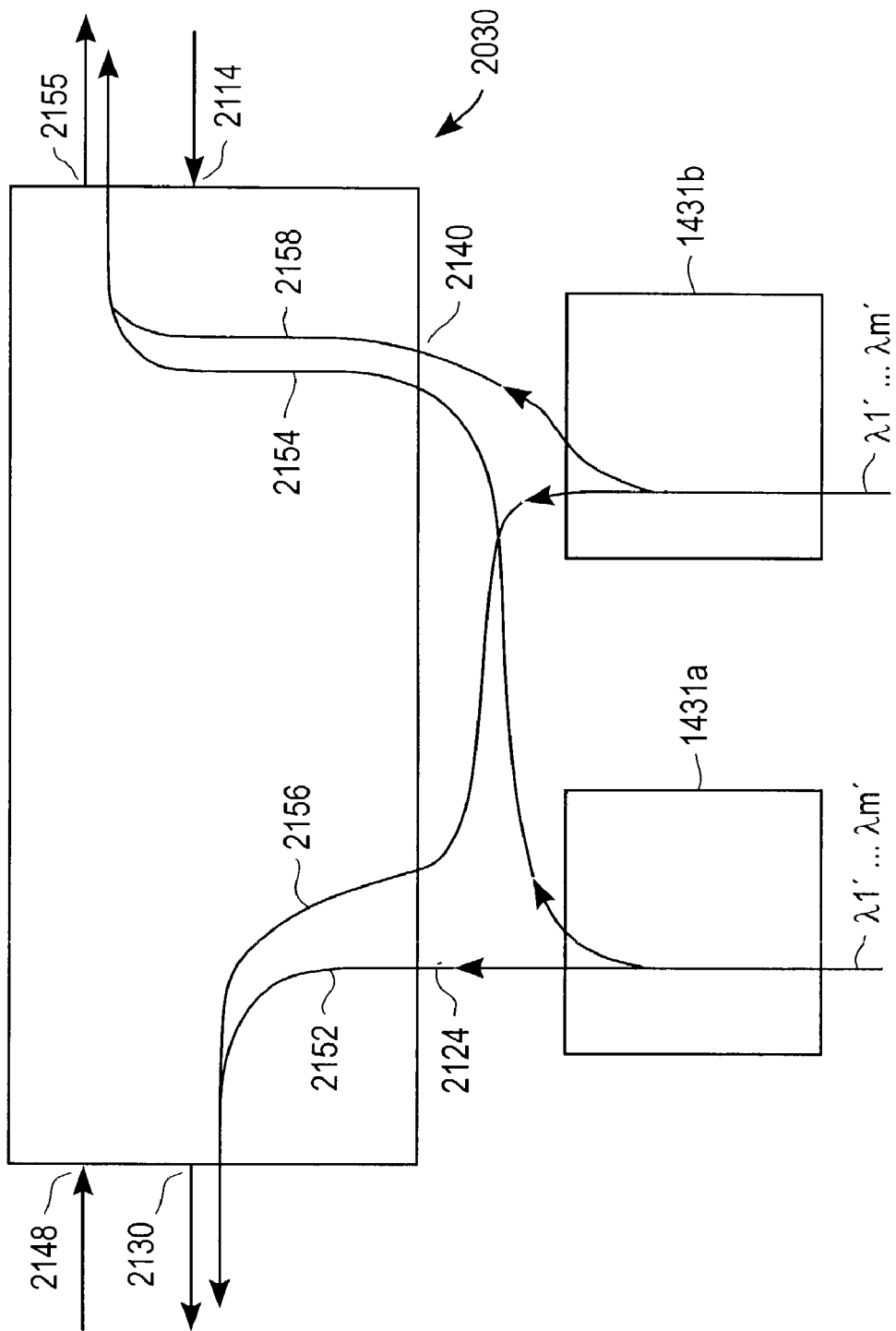

FIGS. 21A and 21B are schematics of OADM 2030 and its associated transponder cards, and show various routing states according to an embodiment of the present invention. FIG. 21A shows various routing states of the OADM and transponder cards include paths 2103, 2106, and 2109. Along paths 2103, and 2106, the optical wavelengths $\lambda 1 \ldots \lambda m$ are received by first input port 2148 and are directed to west demultiplexed output 2165, which includes a plurality of output ports. According to one embodiment of the present invention, west demultiplexed output includes 80 output ports. Along path 2103 a copy of the optical wavelengths is routed from the west demultiplexed output through transponder card 1431*a*. Along path 2106 another copy of the optical wavelengths is routed from the west demultiplexed output 2165 through transponder card 1431*b*. Along path 2109, commonly referred to as an express path, another copy of the optical wavelengths is directed toward output port 2155. The OADM is dynamically configurable to transmit the copy to the output port or to terminate the copy.

Although paths 2103 and 2113 both pass into transponder card 1431*a*, the transponder card selects for transmission optical wavelengths traversing only one of these paths. Transponder card 1431*b* similarly selects for transmission optical wavelengths traversing path 2106 or 2116, but not both.

Other routing states of OADM 2030 and its associated transponder cards include paths 2113, 2116, and 2119. Paths 2113, 2116, and 2119 are approximately symmetric to paths 2103, 2106, and 2109. Along paths 2113, and 2116 the optical wavelengths $\lambda 1 \ldots \lambda m$ are received by second input port 2114 and are directed to east demultiplexed output 2170, which includes a plurality of output ports. According to one embodiment of the present invention west demultiplexed output includes 80 output ports. Along path 2113 a copy of the optical wavelengths is routed from the west demultiplexed output through transponder card 1431*a*. Along path 2116 another copy of the optical wavelengths are routed from the east demultiplexed output 2170 through transponder card 1431*b*. Along path 2119, commonly referred to as an express path, another copy of the optical wavelengths is directed toward output port 2130. The OADM is dynamically configurable to transmit the copy of optical wavelengths to the output port or to terminate the copy.

Additional routing states, as shown in FIG. 21B, include paths 2152, 2154, 2156, and 2158 directed from the transponder cards to OADM 2030. Along paths 2152 and 2154 the optical wavelengths $\lambda 1' \ldots \lambda m'$ are directed through transponder card 1431*a* to west and east demultiplexed inputs 2124 and 2140, respectively. Each of the west and east-demultiplexed inputs include a plurality of input ports. According to one embodiment of the present invention, each of the west and east demultiplexed inputs includes 80 input ports. From the west and east demultiplexed inputs a copy of the optical wavelengths is directed to first and second output ports 2130 and 2155, respectively.

Along paths 2156 and 2158 the optical wavelengths $\lambda 1' \ldots \lambda m'$ are directed through transponder card 1431*b* to west and east demultiplexed inputs 2124 and 2140, respectively. From the west and east demultiplexed inputs a copy of the optical wavelengths is directed to first and second output ports 2130 and 2155, respectively.

To avoid routing copies of optical wavelengths to the same output port, either transponder card 1431*a* or 1431*b*, but not both, transmit optical wavelengths to the OADM. Similarly stated, optical wavelengths are either directed along paths 2152 and 2154, or along paths 2156 and 2158.

Figure 22:
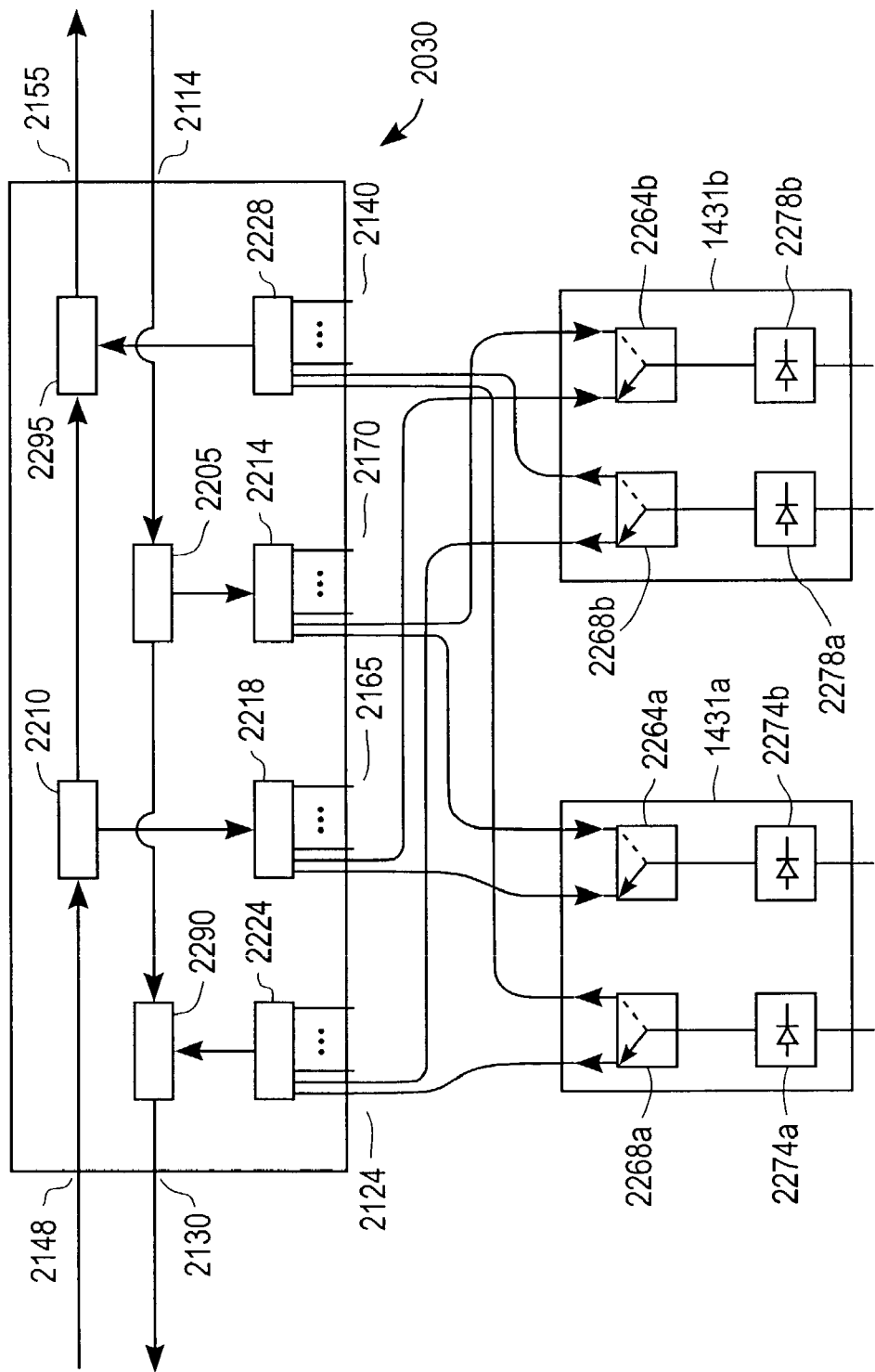
FIG. 22 is a schematic of an OADM according to another embodiment of the present invention.

FIG. 22 is a schematic of OADM 2030 showing the elements comprising the OADM according to an embodiment of the present invention. Similar to OADM 1130 shown in FIG. 13, OADM 2130 includes east and west splitters 2205 and 2210 configured to receive optical wavelengths from input ports 2214 and 2248, respectively. Each splitter splits received optical wavelengths into first and second copies. The east splitter directs a copy of its received optical wavelengths to wavelength-selective two-by-one switch (e.g., WRE) 2290 and another copy to east demultiplexer 2214. The east demultiplexer routes the optical wavelengths to east demultiplexed output 2170, which further routes the wavelengths to transponder cards 1431*a* and 1431*b*. The west splitter directs a copy of its received optical wavelengths to wavelength-selective two-by-one switch (e.g., WRE) 2295 and another copy to west demultiplexer 2218. The west demultiplexer routes the optical wavelengths to west-demultiplexed output 2165, which further routes the wavelengths to transponder cards 1431*a* and 1431*b*.

Transponder cards 1431*a* and 1431*b* include switches 2264*a* and 2264*b*, respectively, for selecting the transmission of optical wavelengths received from the west or east-demultiplexed outputs. Transponder cards 1431*a* and 1431*b* also include switches 2268*a* and 2268*b*, respectively, for selecting the transmission of optical wavelengths directed toward the west or east-demultiplexed inputs. Both transponder cards further include pairs of lasers (e.g., diode lasers). The lasers associated with transponder card 1431*a* are designated 2274*a* and 2274*b* and the lasers associated with transponder card 1431*b* are designated 2278*a* and 2278*b*.

As shown in FIG. 20C, transponder cards 1431*a* and 1431*b* select only one copy of the optical wavelengths received by the transponder cards for to transmission to OADM 2030. For example, transponder card 1431*a* receives the copy of optical wavelengths traversing path 2083*a* and transponder card 1431*b* receives the copy of optical wavelengths traversing path 2083*b*. Either the copy of optical wavelengths traversing path 2083*a* or the copy of optical wavelengths traversing path 2083*b* is transmitted to OADM 2030, but not both copies. Lasers 2274*a* and 2274*b* (FIG. 22) control this selective transmission. More specifically, only one of lasers 2274*a* or 2274*b* is turned on and transmitting at any give time. Such selective transmission prevents wavelengths having the same frequency from being simultaneously transmitted from output port 2130 (FIGS. 21A-21B) onto optical path 1422. Transponder cards 1431*a* and 1431*b* simultaneously transmit optical wavelengths received from OADM 2030. This simultaneous transmission is achieved by lasers 2278*a* and 2278*b* both being turned on and transmitting at the same time.

West and east couplers (i.e., multiplexers) 2224 and 2228 are optically coupled to the west and east demultiplexed inputs 2124 and 2140, respectively. The optical wavelengths received by the west coupler from the west demultiplexed input are routed by the west coupler to wavelength-selective two-by-one switch 2290. The optical wavelengths received by the east coupler from the east demultiplexed input are routed by the east coupler to wavelength-selective two-by-one switch 2295. Each wavelength-selective two-by-one switch is similar to and provides the same wavelength selective termination and transmission functions as WRE 830, described above and shown in FIG. 8.

CONCLUSION

While the above is a complete description of specific embodiments of the invention, various modifications, alternative constructions, and equivalents may be used. For example, while each of optical networks 1400, 1700, and 2000 includes a pair of OADMs 1436 and 1438 coupled to DWDM ring 1415, the pair of OADMs may be appropriately replaced by a single OADM such as those shown in FIGS. 16, 19, and 21.

Therefore, the above description should not be taken as limiting the scope of the invention as defined by the claims.

What is claimed is:

1. An optical network for optical communications, the optical network comprising:
   a first optical ring having at least first, second, and third nodes adjacently positioned, and pairs of optical fibers optically linking the adjacent nodes;
   a second optical ring having at least fourth, fifth, and sixth nodes adjacently positioned, and pairs of optical fibers optically linking the adjacent nodes;
   a point-to-point subnetwork having at least first, second, third, and fourth optical fibers optically coupling the first and second optical rings; wherein:
   the first node is configured to route working bands across the first optical fiber to the fifth node and is configured to route a copy of the working bands to the second node;
   the second node is configured to route either the copy of the working bands or a select subset of the copy of the working bands across the third optical fiber to the fourth node, wherein: i) the first, second, fifth, and fourth nodes include first, second, third, and fourth optical add-drop multiplexers (OADMs), respectively, ii) the first OADM is configured to receive the working bands from one of the optical fiber linking the third node and first OADM, and iii)the fourth OADM is configured to route working bands received from the second OADM to the third OADM,
   a first transponder card optically coupled between the first OADM and the first and second optical fibers;
   a second transponder card optically coupled between the second OADM and the third and fourth optical fibers;
   a third transponder card optically coupled between the third OADM and the first and second optical fibers; and
   a fourth transponder card optically coupled between the fourth OADM and the third and fourth optical fibers; wherein: i) each of the first, second, third, and fourth transponder cards is configured to transmit demultiplexed optical bands to the first, second, third, and fourth OADMs, respectively, ii) each of the first, second, third, and fourth OADMs is configured to transmit demultiplexed optical bands to the first, second, third, and fourth transponder cards respectively, iii) each of the first, second, third, and fourth OADMs has first and second demultiplexed outputs configured to transmit demultiplexed optical bands and has first and second demultiplexed inputs configured to receive demultiplexed optical bands, iv) the first transponder card is optically coupled to the first OADM's first and second demultiplexed outputs and is dynamically configurable to transmit optical bands received from either the first OADM's first or second demultiplexed output, and v) the first transponder card is optically coupled to the first OADM's first and second demultiplexed input and is dynamically configurable to transmit optical bands to either the first OADM's first or second demultiplexed input.

2. The optical network of claim 1 wherein:
   in the event the third OADM no longer receives working bands from the first optical fiber, the third OADM routes working bands received from the fourth OADM to one of the optical fibers linking the third OADM and the sixth node,
   otherwise the third OADM routes working bands received from the first optical fiber to one of the optical fibers linking the third OADM and the sixth node.

3. The optical network of claim 1 wherein:
   the first, second, fifth, and fourth nodes include first, second, third, and fourth optical add-drop multiplexers (OADMs), respectively;
   the second OADM is configured to receive protection bands from one of the optical fiber linking second OADM and the third node in the event that the first OADM fails to route the working bands to the third OADM and the second OADM fails to receive the copy of the working bands from the first OADM; and
   the second node is configured to route either the protection bands or a select subset of the protection bands across the third optical fiber to the fourth node.

4. The optical network of claim 3 wherein:
   the fourth OADM is configured to route the protection bands received from the second OADM to the third OADM; and the third OADM is configured to route the protection bands received from the fourth OADM to one of the optical fibers linking the third OADM and the sixth node.

5. The optical network of claim 1 wherein:
the point-to-point subnetwork includes at least another four optical fibers;
four optical fibers of the subnetwork optically couple the first and third OADMs; and
four optical fibers of the subnetwork optically couple the second and third OADMs.

6. The optical network of claim 1 wherein the first and second optical rings are each optical multiplexed shared protection rings.

7. The optical network of claim 1 wherein the first and second optical rings are each unidirectional path-switched protection rings.

8. The optical network of claim 1 wherein the subnetwork is an ultra-long-haul subnetwork.

9. The optical network of claim 1 wherein:
the first, second, third, and fourth nodes include first, second, third, and fourth optical add-drop multiplexers (OADMs), respectively;
the second OADM is configured to receive protection bands from one of the optical fibers linking the second OADM and the third node and to route the protection bands to the fourth OADM across the second optical fiber;
the fourth OADM is configured to route the protection bands received from the second OADM to one of the optical fibers linking the fourth OADM and sixth node; and
the fourth OADM is configured route the copy of the working bands received from the second OADM to one of the optical fibers linking the fourth OADM and sixth node in the event that the first optical fiber fails to route the working bands to the third OADM and the second OADM fails to receive the protection bands from one of the optical fiber linking the second OADM and the third node.

10. The optical network of claim 1 wherein:
the second transponder card is optically coupled to the second OADM's first and second demultiplexed outputs and is dynamically configurable to transmit optical bands received from either the second OADM's first or second demultiplexed output; and
the second transponder card is optically coupled to the second OADM's first and second demultiplexed inputs and is dynamically configurable to transmit optical bands to either the second OADM's first or second demultiplexed input.

11. The optical network of claim 1 wherein:
the third transponder card is optically coupled to the third OADM's first and second demultiplexed outputs and is dynamically configurable to transmit optical bands received from either the third OADM's first or second demultiplexed output; and
the second transponder cards is optically coupled to the third OADM's first and second demultiplexed inputs and is dynamically configurable to transmit optical bands to either the third OADM's first or second demultiplexed input.

12. The optical network of claim 1 wherein:
the fourth transponder card is optically coupled to the fourth OADM's first and second demultiplexed outputs and is dynamically configurable to transmit optical bands received from either the fourth OADM's first or second demultiplexed output; and
the fourth transponder card is optically coupled to the fourth OADM's first and second demultiplexed inputs and is dynamically configurable to transmit optical bands to either the fourth OADM's first or second demultiplexed input.

13. The optical network of claim 1 wherein:
the fifth node is configured to route another set of working bands across the second optical fiber to the first node and is configured to route a copy of the other set of working bands to the fourth node; and
the fourth node is configured to route either the copy of the other set of working bands or a select subset of the copy of the other working bands across the fourth optical fiber to the second node.

14. The optical network of claim 13 wherein:
the first, second, fifth, and fourth nodes include first, second, third, and fourth optical add-drop multiplexers (OADMs), respectively;
the third OADM is configured to receive the other set of working bands from one of the optical fibers linking the third OADM and the sixth node; and
the second OADM is configured to route the copy of the other set of working bands received from the fourth OADM to the first OADM.

15. The optical network of claim 14 wherein:
in the event the first OADM no longer receives the other set of working bands from the second optical fiber, the first OADM routes the copy of the other set of working bands received from the second OADM to one of the optical fiber linking the first OADM and the third node,
otherwise the first OADM routes the other set of working bands received from the second optical fiber to one of the optical fibers linking the first OADM and the third node.

16. An optical network for optical communications, the optical network comprising:
a first optical ring having at least first and second nodes adjacently positioned, and pairs of optical fibers between the adjacent nodes;
a second optical ring having at least third, fourth, and fifth nodes adjacently positioned, and pairs of optical fibers between the adjacent nodes; and
a point-to-point subnetwork having at least first, second, third, and fourth optical fibers optically coupling the first and second optical rings; wherein: i) the first node is configured to route working bands across the first optical fiber to the third node and is configured to route a copy of the working bands across the third optical fiber to the fourth node, ii) the fourth node is configured to route the copy of working bands to the third node, iii) in the event the third node does not receive the working bands from the first optical fiber due to failure of the first optical fiber, the third node routes the copy of working bands received from the fourth node to one of the optical fibers linking the third and fifth nodes, vi) otherwise the third node routes the working bands received from the first optical fiber to one of the optical fibers linking the third and fifth nodes, v) the first node receives the working bands from one of the optical fibers linking the first and second nodes, and vi) the first, third, and fourth nodes include first, second, and third optical add-drop multiplexers (OADMs), respectively,
a first transponder card optically coupled between the first OADM and the first and second optical fibers;

a second transponder card optically coupled between the first OADM and the third and fourth optical fibers;

a third transponder card optically coupled between the second OADM and the first and second optical fibers; and a fourth transponder card optically coupled between the third OADM and the third and fourth optical fibers, wherein: i) each of the first, second, and third transponder cards is configured to transmit demultiplexed optical bands to the first, second, and third OADMs, respectively, and ii) each of the first, second, and third OADMs is configured to transmit demultiplexed optical bands to the first, second, and third transponder cards respectively, iii) each of the first, second, third, and forth transponder cards has a first and second laser, iv) either the first laser of the first transponder card or first laser of the second transponder cards transmits optical bands to the first OADM, and v) both of the second lasers of the first and second transponder cards transmit optical bands received by the first and second transponder cards from the first OADM.

17. The optical network of claim 16 wherein:

the third node is configured to route another set of working bands across the second optical fiber to the first transponder card and route a copy of the other set of working bands to the fourth node; and the fourth node is configured to route the copy of the other set of working bands across the fourth optical fiber to the second transponder card.

18. The optical network of claim 17 wherein the first optical ring does not have protection switching.

19. The optical network of claim 17 wherein the first optical ring is an optical multiplexed shared protection ring.

20. The optical network of claim 16 wherein each of the first, second, and third OADMs has first and second demultiplexed outputs for transmitting demultiplexed optical bands and has first and second demultiplexed inputs for receiving demultiplexed optical bands.

21. The optical network of claim 20 wherein:

each of the first and second transponder cards is optically coupled to the first OADM's first and second demultiplexed outputs, and each of the first and second transponder cards is dynamically configurable to transmit optical bands received from either the first OADM's first or second demultiplexed output; and each of the first and second transponder cards is optically coupled to the first OADM's first and second demultiplexed inputs, and each of the first and second transponder cards is dynamically configurable to transmit optical bands to either the first OADM's first or second demultiplexed input.

22. The optical network of claim 20 wherein:

the third transponder card is optically coupled to the second OADM's first and second demultiplexed outputs and is dynamically configurable to transmit optical bands received from either the second OADM's first or second demultiplexed output; and the third transponder card is optically coupled to the second OADM's first and second demultiplexed inputs and is dynamically configurable to transmit optical bands to either the second OADM's first or second demultiplexed input.

23. The optical network of claim 20 wherein:

the fourth transponder card is optically coupled to the third OADM's first and second demultiplexed outputs and is dynamically configurable to transmit optical bands received from either the third OADM's first or second demultiplexed output; and the fourth transponder card is optically coupled to the third OADM's first and second demultiplexed input and is dynamically configurable to transmit optical bands to either the third OADM's first or second demultiplexed input.

24. The optical network of claim 16 wherein the first node receives protection bands from one of the optical fibers linking the first and second nodes in the event that the first node does not receive the working bands from one of the optical fibers linking the first and second nodes.

25. The optical network of claim 24 wherein the first, third, and fourth nodes include first, second, and third optical add-drop multiplexers (OADMs), respectively.

26. The optical network of claim 25 and further comprising:

a first transponder card optically coupled between the first OADM and the first and second optical fibers;

a second transponder card optically coupled between the first OADM and the third and fourth optical fibers;

a third transponder card optically coupled between the second OADM and the first and second optical fibers; and a fourth transponder card optically coupled between the third OADM and the third and fourth optical fibers;

wherein:

the first and second transponder cards are configured to transmit to and receive from the first OADM demultiplexed optical bands;

the third transponder card is configured to transmit to and receive from the second OADM demultiplexed optical bands; and the fourth transponder card is configured to transmit to and receive from the third OADM demultiplexed optical bands.

27. The optical network of claim 26 wherein:

each of the first, second, third, and forth transponder cards has a first and second laser;

either the first laser of the first transponder card or the first laser of the second transponder card transmits optical bands to the first OADM; and both of the second lasers of the first and second transponder cards transmit optical bands received by the first and second transponder cards from the first OADM.

28. The optical network of claim 27 wherein:

the third node is configured to route another set of working bands across the second optical fiber to the first transponder card and route a copy of the other set of working bands to the fourth node; and the fourth node is configured to route the copy of the other set of working bands across the fourth optical fiber to the second transponder card.

29. The optical network of claim 28 wherein the first optical ring is an optical multiplexed shared protection ring.

30. The optical network of claim 28 wherein each of the first, second, and third OADMs has first and second demultiplexed outputs for transmitting demultiplexed optical bands and has first and second demultiplexed inputs for receiving demultiplexed optical bands.

31. The optical network of claim 30 wherein each of the first and second transponder cards is optically coupled to the first OADM's first and second demultiplexed outputs and each of the first and second transponder cards is dynamically configurable to transmit optical bands received from either the first OADM's first or second demultiplexed output; and each of the first and second transponder cards is optically coupled to the first OADM's first and second demultiplexed input and each of the first and second transponder cards is dynamically configurable to transmit optical bands to either the first OADM's first or second demultiplexed input.

32. The optical network of claim 30 wherein the third transponder card is optically coupled to the second OADM's first and second demultiplexed outputs and is dynamically configurable to transmit optical bands received from either the second OADM's first or second demultiplexed output; and the third transponder card is optically coupled to the second OADM's first and second demultiplexed input and is dynamically configurable to transmit optical bands to either the second OADM's first or second demultiplexed input.

33. The optical network of claim 30 wherein the fourth transponder card is optically coupled to the third OADM's first and second demultiplexed outputs and is dynamically configurable to transmit optical wavelengths received from either the third OADM's first or second demultiplexed output; and the fourth transponder card is optically coupled to the third OADM's first and second demultiplexed input and is dynamically configurable to transmit optical wavelengths to either the third OADM's first or second demultiplexed input.

34. An optical network for optical communications, the optical network comprising:

a first optical ring having at least first and second nodes adjacently positioned, and pairs of optical fibers between the adjacent nodes;

a second optical ring having at least third, fourth, and fifth nodes adjacently positioned, and pairs of optical fibers between the adjacent nodes; and a point-to-point subnetwork having at least first, second, third, and fourth optical fibers optically coupling the first and second optical rings;

wherein:

the first node is configured to receive working bands from one of the optical fibers linking the first and second nodes and receive protection bands from another of the optical fibers linking the first and second nodes;

the first node is configured to route either the working bands or the protection bands across the first optical fiber to the third node and a copy of the working bands or a copy of the protection bands across the third optical fiber to the fourth node;

the fourth node is configured to route received bands to the third node; and in the event the third node does not receive bands from the first optical fiber due to failure of the first optical fiber, the third node routes bands received from the fourth node to one of the optical fibers linking the third and fifth nodes, otherwise the third node routes bands received from the first optical fiber to one of the optical fibers linking the third and fifth nodes, wherein: i) the first node includes a first OADM and first, second, third, and fourth transponder cards optically coupled to the first OADM, ii) the third node routes another set of working bands to the first and third transponder cards over the second optical fiber, iii) the fourth node routes a copy of the other set of working bands to the second and fourth transponder cards over the fourth optical fiber, iv) the second and fourth transponder cards transmit the copy of the other set of working bands to the first node in the event the second optical fiber fails to transmit the other set of working bands to the first and third transponder cards, and v) otherwise the first and third transponder cards transmit the other set of working bands to the first node.

35. The optical network of claim 34 wherein:

the second and fourth transponder cards transmit the protection bands to the second and fourth optical fibers, respectively, in the event first node fails to receive the working bands from the second node, otherwise the first and third transponder cards transmit the working bands to the first and third optical fibers.

36. The optical network of claim 34 wherein:

each of the first, second, third, and forth transponder cards has a first and second laser;

either the first lasers of the first and third transponder cards transmit optical bands to the first OADM, or the first lasers of the second and fourth transponder cards transmits optical bands to the first OADM; and either the second lasers of the first and third transponder cards transmit optical bands to the first and third optical fibers, or the second lasers of the second and fourth transponder cards transmit optical bands to the first and third optical fibers.

37. The optical network of claim 34 wherein the first optical ring is an optical multiplexed shared protection ring.

38. The optical network of claim 34 wherein each of the first, second, and third OADMs has first and second demultiplexed outputs for transmitting demultiplexed optical bands and has first and second demultiplexed inputs for receiving demultiplexed optical bands.

39. An optical add-drop multiplexer (OADM) comprising:

first, second, third, fourth, fifth, and sixth input ports for receiving optical wavelengths;

first, second, third, and fourth output ports for routing optical wavelengths from the OADM;

a first switch configured to receive optical wavelengths from the first and second input ports, each optical wavelength received by the first switch being either selectively terminated, or selectively directed to the first and second output ports, or selectively directed to the first output port, or selectively directed to the second output port, so that optical wavelengths having the same frequency are not coincidentally directed to the same output port;

a second switch configured to receive optical wavelengths from first, third, and fourth input ports, each optical wavelength received by the second switch being either selectively terminated or directed to the third output port, so that optical wavelengths having the same frequency are not coincidentally directed to the third output port;

a third switch configured to receive optical wavelengths from the second, fifth, and sixth input ports, each optical wavelength received by the second switch being either selectively terminated or directed to the fourth output port, so that optical wavelengths having the same frequency are not coincidentally directed to the fourth output port;

a first splitter coupled between the first input port and the first and second switches, the first splitter configured to receive optical wavelengths from the first input port and to direct copies of the optical wavelengths to the first and second switches;

a second splitter coupled between the second input port and the first and third switches, the second splitter configured to receive optical wavelengths from the second input port and to direct copies of the optical wavelengths to the first and third switches;

a fifth output port coupled to the first splitter configured to direct from the OADM a copy of optical wavelengths from the first input port;

a sixth output port coupled to the second splitter configured to direct from the OADM a copy of optical wavelengths from the second input port;

the first switch is a two-by-two switch; and the second and third switches are three-by-one switches.

40. The OADM of claim 39 wherein the two-by-two switch includes:
   a first splitter configured to receive optical wavelengths and splitting the optical wavelengths into two copies;
   a second splitter configured to receive optical wavelengths and splitting the optical wavelengths into two copies;
   a first wavelength routing element configured to receive copies of optical wavelengths from the first and second splitters and selectively transmitting subsets the of optical wavelengths; and
   a second wavelength routing element configure to receive copies of optical wavelengths from the first and second splitters and selectively transmitting subsets the of optical wavelengths.

41. The OADM of claim 39 wherein:
   each of the first and second three-by-one switches includes a first and second wavelength routing element; and
   the first and second wavelength routing elements are optically coupled.

42. An optical interconnect for optical communication rings, the interconnect comprising:
   first and second OADMs according to claim 39, the first and second output ports of the first OADM being in optical communication with the third and fourth input ports, respectively, of the second OADM;
   third and fourth OADMs according to claim 39, the first and second output ports of the third OADM being in optical communication with the third and fourth input ports, respectively, of the fourth OADM;
   the third output port and second input port of the first OADM being in optical communication with the first input port and the fourth output port, respectively, of the third OADM; and
   the third output port and second input port of the second OADM being in optical communication with the first input port and the fourth output port, respectively, of the fourth OADM.

43. An optical network having subnetwork protection, the network comprising:
   first and second optical multiplexed section shared protection rings (OMS-SPRING);
   first, second, third, and fourth OADMs according to the OADM of claim 39, the first and third OADMs being in optical communication with the first OMS-SPRING; the second and fourth OADMs being in optical communication with the second OMS-SPRING; and
   first and second ultra-long-haul (ULH) spans, the first ULH span being in optical communication with the first and second output of the first OADM and the third and fourth inputs of the second OADMs, the first ULH span being in optical communication with the first and second output of the first OADM and the first ULH span being in optical communication with the third and fourth inputs of the third OADM.

44. An optical add-drop multiplexer (OADM) comprising:
   a first input port for receiving light having a first plurality of optical wavelengths;
   a first optical splitter disposed to receive and split the first plurality of optical wavelengths into first, second, and third copies of the wavelengths;
   a second input port for receiving light having a second plurality of optical wavelengths;
   a second optical splitter disposed to receive and split the second plurality of optical wavelengths into first, second, and third copies of the wavelengths;
   a third input port for receiving light having a third plurality of optical wavelengths;
   a fourth input port for receiving light having a fourth plurality of optical wavelengths;
   first, second, third, and fourth output ports;
   a two-by-two switch configured to receive the first copy of the first and second pluralities of optical wavelengths, wherein each wavelength received by the two-by-two switch is either selectively terminated, or selectively directed to the first and second output ports, or selectively directed to the first output port, or selectively directed to the second output port;
   a first add port for receiving light having a fifth plurality of optical wavelengths;
   a second add port for receiving light having a sixth plurality of optical wavelengths;
   a first three-by-one switch configured to receive the second copy of the first plurality of optical wavelengths, the third plurality of optical wavelengths, and the fifth plurality of optical wavelengths, wherein each optical wavelength received by the first three-by-one switch is either selectively terminated or directed to the third output port; and
   a second three-by-one switch configured to receive the second copy of the second plurality of optical wavelengths, the fourth plurality of optical wavelengths, and the sixth plurality of optical wavelengths, wherein each optical wavelength received by the second three-by-one switch is either selectively terminated or directed to the fourth output port.

45. The OADM of claim 44 and further comprising:
   a first drop port for diverting from the OADM the third copy of the first plurality of optical wavelengths; and
   a second drop port for diverting from the OADM the third copy of the second plurality of optical wavelengths.

46. The OADM of claim 44 wherein the two-by-two switch includes:
   a first splitter configured to receive and splitting the first copy of the first plurality of optical wavelengths into fifth and sixth copies;
   a second splitter configured to receive and splitting the first copy of the second plurality of optical wavelengths into fifth and sixth copies;
   a first wavelength routing element configured to receive and selectively routing subsets the fifth copy of the first and second pluralities of optical wavelengths; and
   a second wavelength routing element configured to receive and selectively routing subsets of the sixth copy of the first and second pluralities of optical wavelengths.

47. The OADM of claim 44 wherein each of the first and second dynamically configurable three-by-one switches includes a first and second wavelength routing element; wherein the first and second wavelength routing elements are optically coupled.

48. An optical add-drop multiplexer (OADM) comprising:
- a first input port for receiving light having a first plurality of optical wavelengths;
- a first optical splitter disposed to receive and split the first plurality of optical wavelengths into first, second, and third copies of the wavelengths;
- a second input port for receiving light having a second plurality of optical wavelengths;
- a second optical splitter disposed to receive and split the second plurality of optical wavelengths into first, second, and third copies of the wavelengths;
- first, second, and third output ports;
- a two-by-one switch for receiving the first copy of the first and second pluralities of optical wavelengths, each optical wavelength received by the two-by-one switch being either selectively terminated or selectively directed to the first output port;
- a third input port for receiving light having a third plurality of optical wavelengths;
- a third splitter for receiving and splitting the third plurality of optical wavelengths into first and second copies of the wavelengths;
- a first add port for receiving light having a fourth plurality of optical wavelengths;
- a second add port for receiving light having a fifth plurality of optical wavelengths;
- a first three-by-one switch for receiving the second copy of the first plurality of optical wavelengths, the first copy of the third plurality of optical wavelengths, and the fourth plurality of optical wavelengths; wherein each optical wavelength received by the first three-by-one switch is either selectively terminated or directed to the second output port; and
- a second three-by-one switch for receiving the second copy of the second plurality of optical wavelengths, the second copy of the third plurality of optical wavelengths, and the fifth plurality of optical wavelengths; wherein each optical wavelength received by the second three-by-one switch is either selectively terminated or directed to the third output port.

49. The OADM of claim 48 and further comprising:
- a first drop port for diverting from the OADM the third copy of the first plurality of optical wavelengths; and
- a second drop port for diverting from the OADM the third copy of the second plurality of optical wavelengths.

50. An optical interconnect for optical communication rings, the interconnect comprising:
- first, second, third, and forth OADMs including:
  - first, second, third, fourth, and fifth input ports for receiving optical wavelengths;
  - first, second, and third output ports for routing optical wavelengths from the OADM;
  - a first switch for receiving optical wavelengths from the first and second input ports, each optical wavelength received by the first switch being either selectively terminated, or selectively directed to the first output port, so that optical wavelengths having the same frequency are not coincidentally directed to the first output port;
  - a second switch for receiving optical wavelengths from first and fourth input ports, each optical wavelength received by the second switch being either selectively terminated or directed to the second output port, so that optical wavelengths having the same frequency are not coincidentally directed to the second output port;
  - a third switch for receiving optical wavelengths from the second, third, and fifth input ports, each optical wavelength received by the third switch being either selectively terminated or directed to the third output port, so that optical wavelengths having the same frequency are not coincidentally directed to the third output port;
  - a first splitter coupled between the first input port and the first and second switches, the first splitter configured to receive optical wavelengths from the first input port and to direct copies of the optical wavelengths to the first and second switches; and
  - a second splitter coupled between the second input port and the first and third switches, the second splitter configured to receive optical wavelengths from the second input port and to direct copies of the optical wavelengths to the first and third switches;
- wherein:
  - the first output port of the first OADM being in optical communication with the third input port of the second OADM;
  - the first output port of the third OADM being in optical communication with the third input port of the fourth OADM;
  - the second output port and second input port of the first OADM being in optical communication with the first input port and the third output port, respectively, of the third OADM; and
  - the second output port and second input port of the second OADM being in optical communication with the first input port and the third output port, respectively, of the fourth OADM.

51. The optical interconnect of claim 50 wherein only one of a given optical wavelength or a copy of the given optical wavelength is switched to the first output port.

52. An optical interconnect for optical communication rings, the interconnect comprising:
- first and second OADMs according to the OADM of claim 50, the first output port of the first OADM being in optical communication with the third input port of the second OADM, the first output port of the second OADM being in optical communication with the third input port of the first OADM;
- third and fourth OADMs according to the OADM of claim 50, the first output port of the third OADM being in optical communication with the third input port of the fourth OADM, the first output port of the fourth OADM being in optical communication with the third input port of the third OADM;
- the second output port of the first OADM being in optical communication with the first input port of the third OADM;
- the third output port of the third OADM being in optical communication with the second input port of the first OADM;
- the second output port of the second OADM being in optical communication with the first input port of the fourth OADM;
- the third output port of the fourth OADM being in optical communication with the second input port of the second OADM.

53. An optical add-drop multiplexer (OADM) comprising:

a first input port for receiving light having a first plurality of optical wavelengths;

a first optical splitter disposed to receive and split the first plurality of optical wavelengths into first, second, and third copies of the wavelengths;

a second input port for receiving a copy of the light having a second plurality of optical wavelengths;

a third input port for receiving light having a third plurality of optical wavelengths;

a second optical splitter disposed to receive and split the second plurality of optical wavelengths into first, second, and third copies of the wavelengths;

first, second, and third output ports;

a first two-by-one switch for receiving the first copy of the first and second pluralities of optical wavelengths, each optical wavelength received by the first two-by-one switch being either selectively terminated or selectively directed to the first output port;

a first add port for receiving light having a fourth plurality of optical wavelengths;

a second add port for receiving light having a fifth plurality of optical wavelengths;

a second two-by-one switch for receiving the second copy of the first plurality optical wavelengths and fourth plurality of optical wavelengths, each optical wavelength received by the second two-by-one switch being selectively terminated or selectively directed to the second output port;

a three-by-one switch for receiving the second copy of the second plurality of optical wavelengths, the third plurality of optical wavelengths, and fifth plurality of optical wavelengths, each optical wavelength received by the three-by-one switch is being either selectively terminated or directed to the third output port.

54. The OADM of claim 53 and further comprising:

a first drop port for diverting from the OADM the third copy of the first plurality of optical wavelengths; and a second drop port for diverting from the OADM the third copy of the second plurality of optical wavelengths.

55. An optical routing device for optical networking, the device comprising:

first and second input ports for receiving optical wavelengths;

a first splitter for receiving optical wavelengths from the first input port;

a second splitter for receiving optical wavelengths from the second input port;

first and second demultiplexed inputs for receiving optical wavelengths;

a first coupler for receiving optical wavelengths from the first demultiplexed input;

a second coupler for receiving optical wavelengths from the second demultiplexed input;

first and second output ports for transmitting optical wavelengths;

first and second wavelength-selective two-by-one switches, the first wavelength selective two-by-one switch being configured to receive optical wavelengths from the second splitter and the first coupler, and the switch being configured to route selected optical wavelengths to the first output port, the second wavelength-selective two-by-one switch being configured to receive optical wavelengths from the second splitter and the second coupler, and the switch being configured to route selected optical wavelengths to the second output port;

first and second demultiplexed outputs for transmitting optical wavelengths;

a first demultiplexer for receiving optical wavelengths from the first splitter and routing the optical wavelengths to the first demultiplexed output; and a second demultiplexer for receiving optical wavelengths from the second splitter and routing the optical wavelengths to the second demultiplexed output.

56. The optical routing device of claim 55 and further including first and second transponder cards;

wherein:

each transponder card is optically coupled to the first and second demultiplexed inputs and to the first and second demultiplexed outputs;

each transponder card is dynamically configurable to transmit optical wavelengths received from either the first or second demultiplexed outputs; and either the first or second transponder cards transmits optical wavelengths to the first or second coupler.

57. The optical routing device of claim 56 and further including third and fourth transponder cards;

wherein:

the third and fourth transponder cards are optically coupled to the first and second demultiplexed inputs and to the first and second demultiplexed outputs;

the third and fourth transponder cards are dynamically configurable to transmit optical wavelengths received from either the first or second demultiplexed outputs; and either the first or second transponder cards transmits optical wavelengths to the first or second coupler.

58. The optical routing device of claim 57 and further including:

a first coupler for transmitting optical wavelengths received from the first and third transponder cards;

a second coupler for transmitting optical wavelengths received from the second and fourth transponder cards;

a first splitter for transmitting copies of the optical wavelengths to the first and third transponder cards; and a second splitter for transmitting copies of the optical wavelengths to the second and fourth transponder cards.

59. An optical network having first and second optical rings, the optical network comprising:

an optical add-drop multiplexer (OADM) optically coupled to the first optical ring and including:

a first input port for receiving a first set of optical wavelengths;

a second input port for receiving a second set of optical wavelengths;

a third input port for receiving a third set of optical wavelengths;

a fourth input port for receiving a fourth set of optical wavelengths;

a first output port for transmitting optical wavelengths;

a second output port for transmitting optical wavelengths;

means for routing either the first set of optical wavelengths, the second set of optical wavelengths, or a combination of the first and second sets of optical wavelengths to the first output port; and means for routing either the third set of optical wavelengths, the fourth set of optical wavelengths, or a combination of the third and fourth sets of optical wavelengths to the first output port;

first and second optical routing devices according to the optical routing device claim 56 optically coupled to the second optical ring; and a point-to-point subnetwork having at least first, second, third, and fourth optical fibers; wherein the first and second optical fibers optically couple the-OADM and first optical routing devices, and the third and fourth optical fibers optically couple the-OADM and second optical routing devices.

60. The optical network of claim 59 wherein:

the OADM is configured to route first and second copies of optical wavelengths across the first and third optical fibers;

the first copy of optical wavelengths is received by the first optical routing device;

the second copy of optical wavelengths is received by the second optical routing device, which routes the second copy of optical wavelengths to the first optical routing device; and the first optical routing device routes either the first or second copy of the optical wavelengths to the second optical ring's working fiber.

\* \* \* \* \*